(12) United States Patent
Ma et al.

(10) Patent No.: US 11,895,713 B2
(45) Date of Patent: Feb. 6, 2024

(54) DATA SHARING AND INSTRUCTION OPERATION CONTROL METHOD AND SYSTEM

(71) Applicant: HUAWEI TECHNOLOGIES CO., LTD., Shenzhen (CN)

(72) Inventors: Yuchi Ma, Shenzhen (CN); Fei Wang, Wuhan (CN); Bifeng Tong, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 17/953,070

(22) Filed: Sep. 26, 2022

(65) Prior Publication Data

US 2023/0016178 A1 Jan. 19, 2023

Related U.S. Application Data

(63) Continuation of application No. PCT/CN2021/083190, filed on Mar. 26, 2021.

(30) Foreign Application Priority Data

Mar. 26, 2020 (CN) .......................... 202010225382.3

(51) Int. Cl.
*G06F 3/048* (2013.01)
*H04W 76/10* (2018.01)
*H04L 41/22* (2022.01)

(52) U.S. Cl.
CPC ............. *H04W 76/10* (2018.02); *H04L 41/22* (2013.01)

(58) Field of Classification Search
CPC ....... H04W 76/10; H04W 76/14; H04W 4/80; H04W 76/11; H04L 41/22; H04N 23/60;
(Continued)

(56) References Cited

U.S. PATENT DOCUMENTS 9,906,703 B2 * 2/2018 Anderson .......... H04N 1/00148
10,007,476 B1 * 6/2018 Glikmann ............. H04L 67/125
(Continued)

FOREIGN PATENT DOCUMENTS

CN 102130995 A 7/2011
CN 103873885 A * 6/2014
(Continued)

*Primary Examiner* — Rashawn N Tillery
(74) *Attorney, Agent, or Firm* — Leydig, Voit & Mayer, Ltd.

(57) ABSTRACT

A data sharing and instruction operation control method, and a system are provided. The method includes: a first terminal establishes a communication connection to a second terminal; the second terminal displays a user interface of a camera application, wherein the user interface includes a photographing parameter adjustment option; the second terminal sends the user interface including the photographing parameter adjustment option to the first terminal; the first terminal may tap the photographing parameter adjustment option on the user interface, and send a control instruction to the second terminal; and the second terminal adjusts a photographing parameter of the camera application based on the control instruction, and displays a user interface obtained after the parameter adjustment.

20 Claims, 42 Drawing Sheets

(58) Field of Classification Search
CPC .... H04N 23/62; H04N 23/631; H04N 23/632; H04N 23/661; H04N 23/66
See application file for complete search history.

(56) References Cited

U.S. PATENT DOCUMENTS

| | | | |
|---|---|---|---|
| 11,409,493 B2* | 8/2022 | Lu | H04N 23/631 |
| 11,435,975 B2* | 9/2022 | Lu | H04W 76/10 |
| 2013/0195090 A1* | 8/2013 | Hiramatsu | H04W 8/22 |
| | | | 370/338 |
| 2014/0165088 A1* | 6/2014 | Le May | H04N 21/8153 |
| | | | 725/25 |
| 2017/0168770 A1 | 6/2017 | Zhao | |
| 2017/0302499 A1* | 10/2017 | Ding | H04L 65/00 |
| 2018/0213585 A1* | 7/2018 | Moritomo | H04W 76/15 |
| 2018/0242215 A1* | 8/2018 | Ohshima | H04L 69/40 |
| 2018/0367752 A1* | 12/2018 | Donsbach | G06F 18/22 |
| 2020/0236274 A1* | 7/2020 | Cowell | H04N 23/661 |
| 2022/0199267 A1* | 6/2022 | Subramanian | G16H 40/20 |
| 2022/0350563 A1* | 11/2022 | Lu | H04N 23/632 |

FOREIGN PATENT DOCUMENTS

| | | | |
|---|---|---|---|
| CN | 104461290 A | | 3/2015 |
| CN | 104640060 A | | 5/2015 |
| CN | 104735524 A | | 6/2015 |
| CN | 104796610 A | * | 7/2015 |
| CN | 105338245 A | | 2/2016 |
| CN | 105338245 A | * | 2/2016 |
| CN | 105450848 A | | 3/2016 |
| CN | 105516598 A | * | 4/2016 |
| CN | 105635563 A | * | 6/2016 |
| CN | 105635591 A | * | 6/2016 |
| CN | 105872361 A | * | 8/2016 |
| CN | 105872361 A | | 8/2016 |
| CN | 106412443 A | | 2/2017 |
| CN | 106506838 A | | 3/2017 |
| CN | 109600549 A | * | 4/2019 |
| CN | 109600549 A | | 4/2019 |
| CN | 110110107 A | | 8/2019 |
| CN | 110191286 A | | 8/2019 |
| EP | 1101338 B1 | | 9/2005 |
| JP | 2009118474 A | | 5/2009 |
| WO | 2015071220 A1 | | 5/2015 |

* cited by examiner

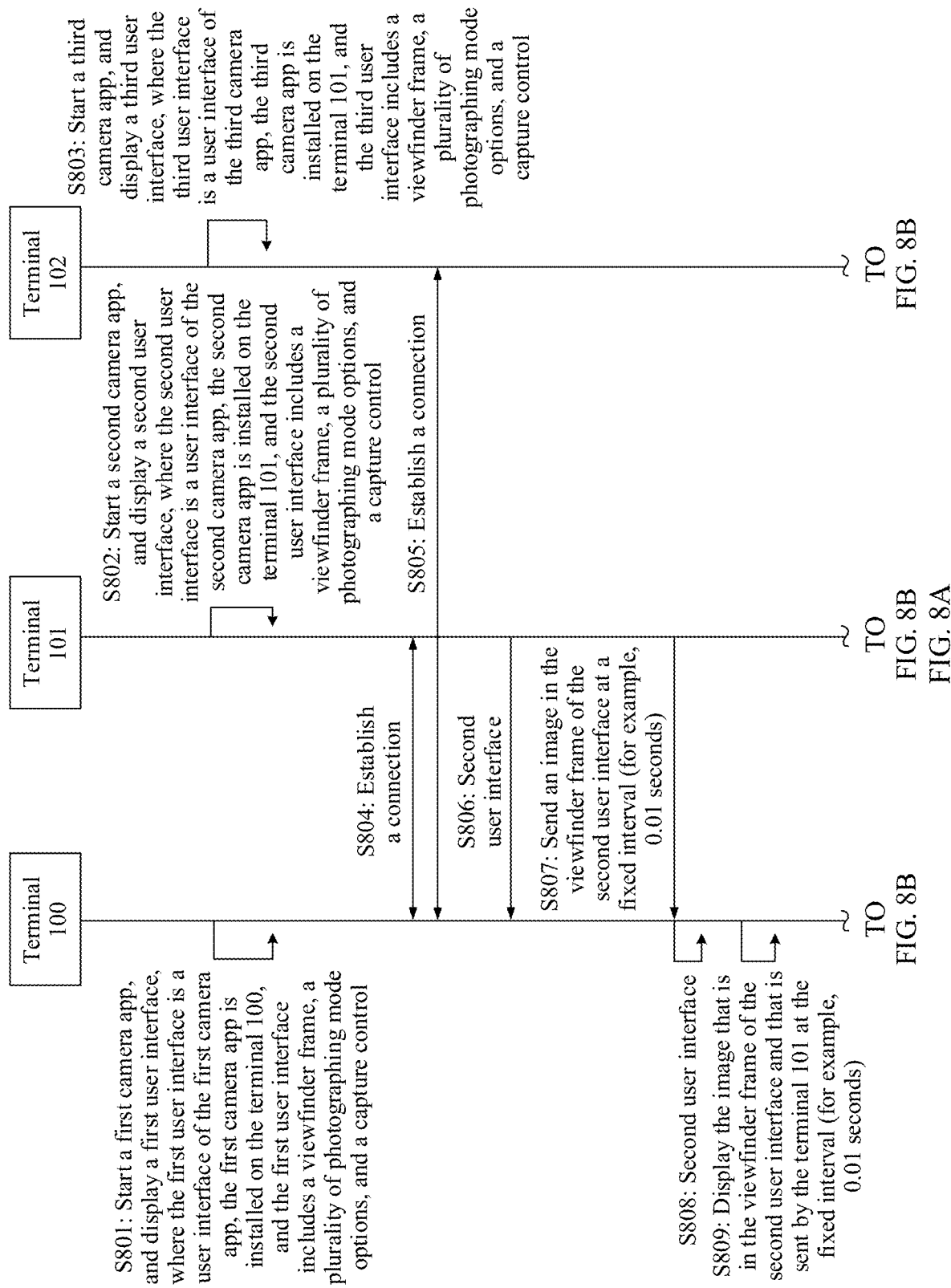

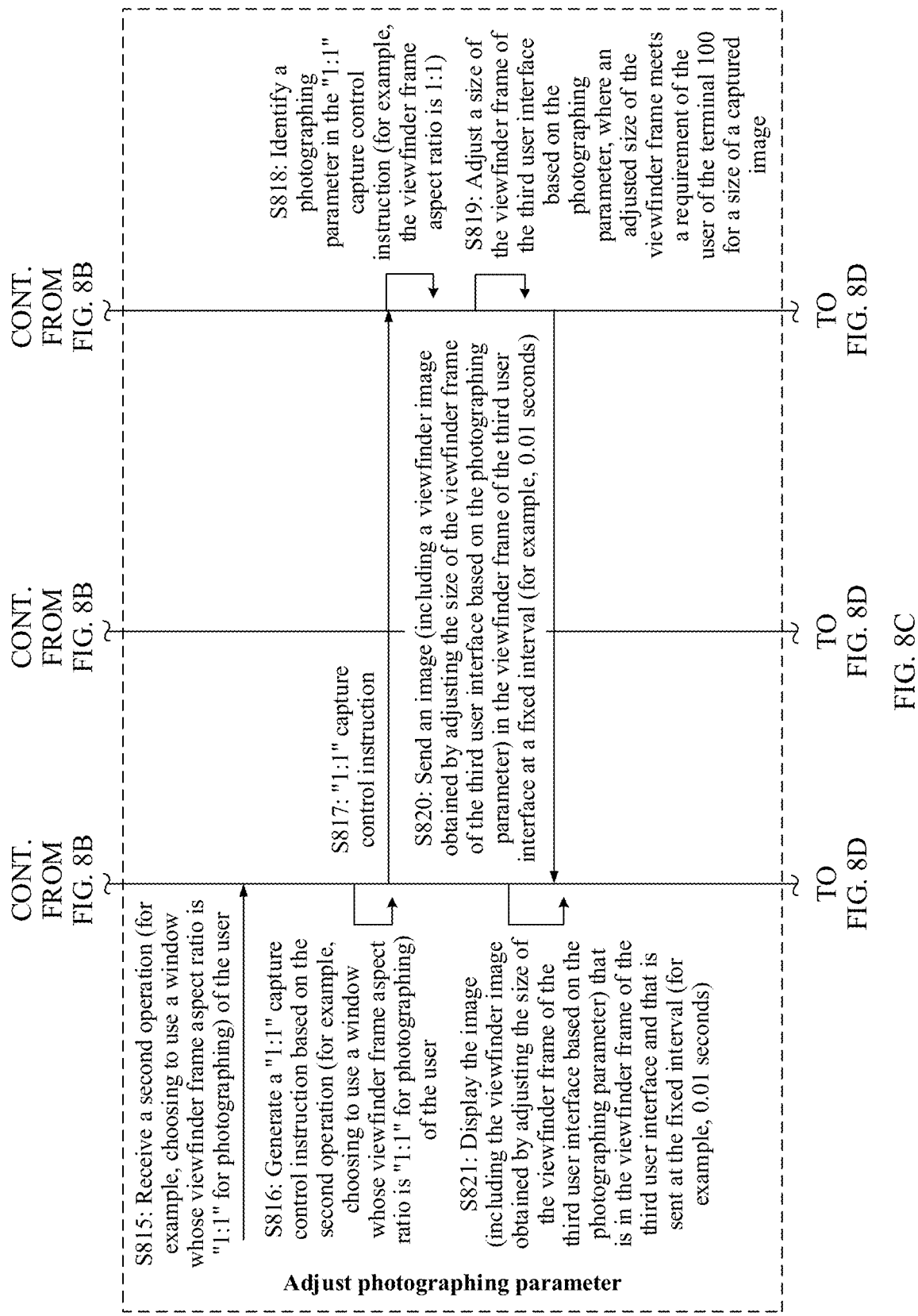

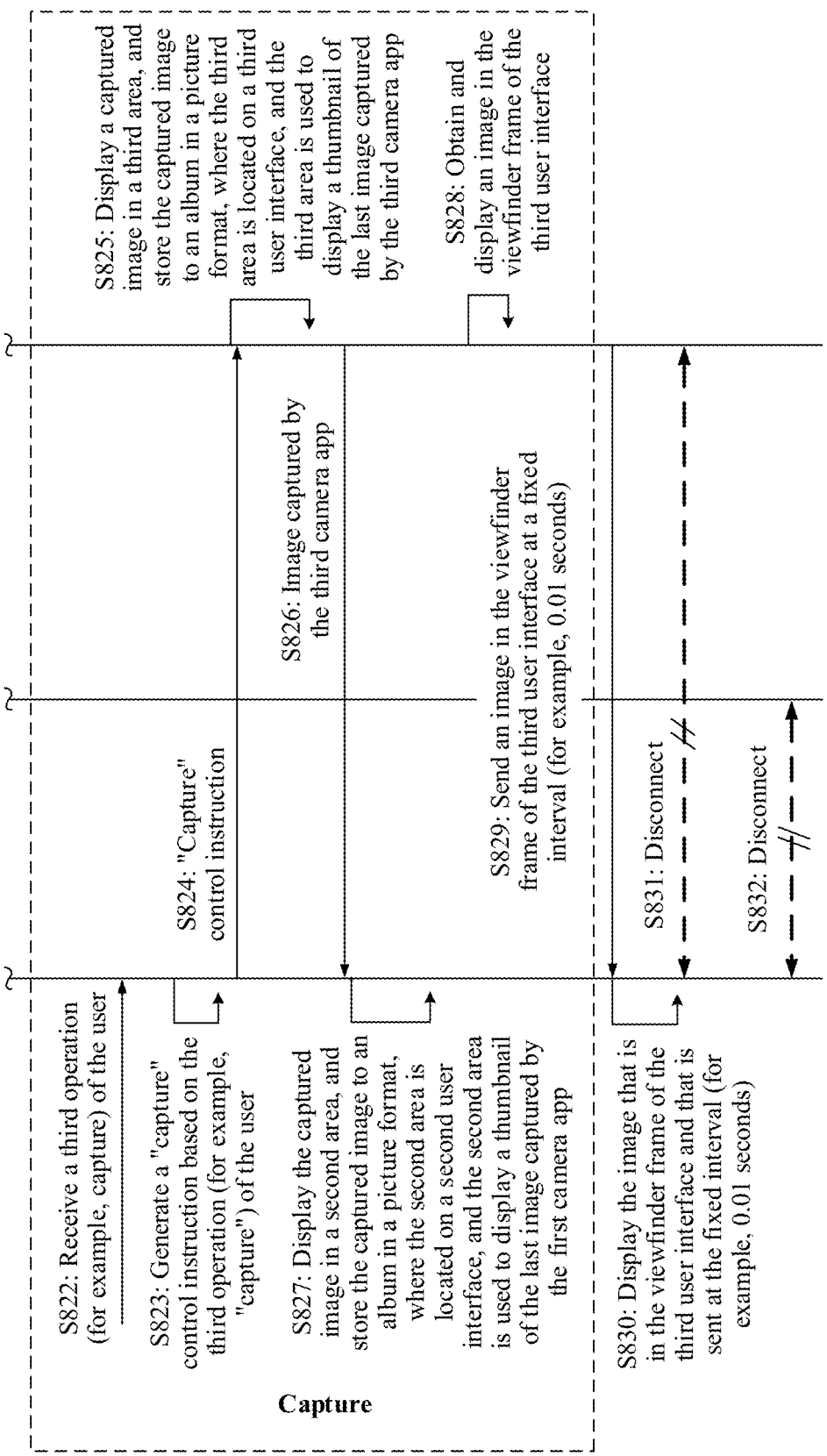

DATA SHARING AND INSTRUCTION OPERATION CONTROL METHOD AND SYSTEM

CROSS-REFERENCE TO RELATED APPLICATIONS

This application is a continuation of International Application No. PCT/CN2021/083190, filed on Mar. 26, 2021, which claims priority to Chinese Patent Application No. 202010225382.3, filed on Mar. 26, 2020. The disclosures of the aforementioned applications are hereby incorporated by reference in their entireties.

TECHNICAL FIELD

Embodiments of this application relate to the field of short-range communication technologies, and in particular, to a data sharing and instruction operation control method and a system.

BACKGROUND

With development of wireless communication technologies, terminals such as smartphones and tablet computers begin to allow users to share data such as pictures and documents, thereby improving office efficiency and office experience of the users. For example, a user can share a picture, a document, or other data on a portable terminal, for example, a smartphone, to another device without using a data line.

In a conventional technology, if a user wants to share data of a portable terminal, for example, a smartphone, the user can usually achieve the objective of data sharing in the following two manners. Manner 1: The user needs to enable a wireless communication technology (for example, Bluetooth, Wi-Fi, or NFC), and after finding and connecting to a surrounding device, may share the data to the connected device. Manner 2: A same cloud account may log in on two devices, so that the two devices transmit data to and control each other through the Internet.

It can be learned that, in the manner 1, the wireless communication technology can implement only data sharing, but the two connected devices cannot control each other; and in the manner 2, the account needs to log in on the two devices for data sharing and instruction control between the two devices, and therefore operations are complicated. This does not meet people's current expectation for a quick sharing operation.

SUMMARY

This application provides a data sharing and instruction operation control method and a system, to provide a method for quickly establishing a connection between devices at a short distance and performing data sharing and instruction operation control without using any account or the Internet, thereby improving real-time performance of data transmission and facilitating interaction between people.

According to a first aspect, this application provides a data sharing and instruction operation control method, including: A first terminal displays a first user interface of a first application, where the first user interface includes a first operation option. The first terminal sends a connection request to a second terminal in response to tapping on the first operation option. The second terminal starts the first application. The second terminal receives the connection request, and the second terminal establishes a communication connection to the first terminal. The second terminal displays a second user interface of the first application, where the second user interface includes a second operation option. The second terminal sends the second user interface to the first terminal. The first terminal displays the second user interface. The first terminal sends a control instruction to the second terminal in response to tapping on the second operation option on the second user interface displayed on the first terminal. The second terminal receives the control instruction sent by the first terminal, and the second terminal displays a third user interface of the first application.

With the method in the first aspect, a method for quickly establishing a connection between devices at a short distance and performing data sharing and instruction operation control without using any account or the Internet is provided, thereby improving real-time performance of data transmission and facilitating interaction between people.

With the method in the first aspect, in some embodiments, the method further includes: The second terminal sends the third user interface to the first terminal, and the first terminal displays the third user interface.

With the method in the first aspect, in some embodiments, that the second terminal receives the connection request, and the second terminal establishes a communication connection to the first terminal includes: The second terminal receives the connection request. The second terminal displays a verification code input box in response to the received connection request. The second terminal establishes a communication connection to the first terminal when a verification code entered in the verification code input box is the same as a verification code preset on the first terminal. In this way, the first terminal can establish a connection to the second terminal to which the first terminal wants to establish a connection, thereby ensuring accuracy and security of a device connection.

In the foregoing embodiment, if the first terminal has established a connection to the second terminal before, when the first terminal initiates the connection request to the second terminal again, the second terminal no longer displays the verification code input box.

With the method in the first aspect, in some embodiments, the method further includes: The second terminal displays first prompt information in response to tapping on the second operation option on the second user interface displayed on the first terminal. In this way, when the operation option is tapped by a user of another terminal, a user of the second terminal can receive the prompt information.

With the method in the first aspect, in some embodiments, the first application is a camera application, and the second operation option includes a photographing parameter adjustment option and a capture option.

With the method in the first aspect, in some embodiments, the photographing parameter adjustment option includes a flash adjustment option, a focal length adjustment option, or a shutter speed adjustment option.

In the foregoing embodiment, the photographing parameter adjustment option may further include a "thinning" effect selection option, and the first terminal sends a "thinning" instruction to the second terminal in response to tapping on the "thinning" effect selection option; the second terminal receives and identifies a "thinning" parameter in the "thinning" control instruction, where the thinning parameter includes a "thinning" degree and a "thinning" part; and the second terminal performs image processing on a viewfinder image on the second user interface based on the "thinning" parameter, where a body shape of a photographing object displayed on a processed viewfinder image meets a "thinning" requirement corresponding to the "thinning" user operation on the first terminal.

With the method in the first aspect, in some embodiments, that the first terminal sends a control instruction to the second terminal in response to tapping on the second operation option on the second user interface displayed on the first terminal includes: The first terminal sends a capture instruction to the second terminal in response to tapping on the capture option, where the capture instruction carries first time information.

With the method in the first aspect, in some embodiments, the method further includes: The second terminal receives the capture instruction. The second terminal performs a capture operation at a predetermined moment based on the first time information, to obtain a first photo. The second terminal sends the first photo to the first terminal. The first terminal receives the first photo and stores the first photo to a first folder, where a name of the first folder includes an identifier of the second terminal. In this way, after a user touches a capture control on the terminal 100, there is sufficient time to place the terminal 100 at a location that does not affect a photographing effect. For example, photographing is performed after the terminal 100 is placed in a pocket of clothes. In addition, a photo taken by the first terminal by using a camera and a photo taken by the second terminal under the control of the first terminal are stored in different files, so that a user can easily view the photos.

In some embodiments, when the first terminal determines that a photographing preview effect has met a user expectation, the user of the first terminal may indicate the user of the second terminal to perform a capture operation. In this case, the second terminal may receive a user operation (for example, touching a capture control), and the second terminal takes a photo and stores a captured image to an album of the terminal 101 in a picture format. The second terminal sends the captured image to the first terminal. The first terminal receives the image and stores the captured image to an album of the first terminal in a picture format.

With the method in the first aspect, in some embodiments, the method further includes: Within a preset time, the first terminal receives a first operation of a user, and the second terminal receives a second operation of a user. In this case, the first terminal responds to the first operation.

In the foregoing embodiment, within the preset time, the first terminal receives the first operation of the user, and the second terminal receives the second operation of the user. An operation conflict occurs between the first operation and the second operation. The operation conflict includes a conflict between same operations and a conflict between different operations. The operation conflict may be resolved in any one of the following manners.

Manner 1: The first operation and the second operation are same operations, and a time of the first operation is earlier than that of the second operation. In this case, the first terminal responds to the first operation.

Manner 2: The first operation and the second operation are different operations, and a priority of the first operation is higher than that of the second operation. In this case, the first terminal responds to the first operation.

Manner 3: The first terminal may further receive a third operation of a user. With respect to operation reasonableness, if operation intentions of the first operation, the second operation, and the third operation conflict, the second operation should be discarded.

With the method in the first aspect, in some embodiments, that the second terminal sends the second user interface to the first terminal, and the first terminal displays the second user interface specifically includes: The second terminal converts the second user interface into a data stream. The second terminal encapsulates the data stream into a distributed stream. The second terminal sends the distributed stream to the first terminal through a socket channel. The first terminal restores the distributed stream to the data stream. The first terminal converts the data stream into the second user interface. The first terminal displays the second user interface.

With the method in the first aspect, in some embodiments, that the first terminal sends a control instruction to the second terminal, and the second terminal receives the control instruction sent by the first terminal specifically includes: The first terminal converts the control instruction into a binder command. The first terminal encapsulates the binder command into a distributed binder. The first terminal sends the distributed binder to the second terminal through a socket channel. The second terminal restores the distributed binder to the binder command. The second terminal converts the binder command into the control instruction. The second terminal receives the control instruction sent by the first terminal.

With the method in the first aspect, in some embodiments, the method further includes: The first terminal is disconnected from the second terminal when the first terminal closes the first application.

In the foregoing embodiment, the first terminal may alternatively be disconnected from the second terminal in any one of the following manners.

Manner 1: The first terminal is disconnected from the second terminal when the second terminal closes the first application.

Manner 2: The first terminal disables a device search and discovery on/off option in the second operation option on the displayed second user interface, and/or the second terminal disables a device search and discovery on/off option in the second operation option on the second user interface.

Manner 3: The first terminal disables a wireless communication function, and/or the second terminal disables a wireless communication function.

According to a second aspect, this application provides a system. The system includes a first terminal and a second terminal.

The first terminal is configured to display a first user interface of a first application, where the first user interface includes a first operation option. The first terminal is further configured to send a connection request to a second terminal in response to tapping on the first operation option. The second terminal is configured to start the first application. The second terminal is further configured to receive the connection request, and the second terminal establishes a communication connection to the first terminal. The second terminal is further configured to display a second user interface of the first application, where the second user interface includes a second operation option. The second terminal is further configured to send the second user interface to the first terminal. The first terminal is further configured to display the second user interface. The first terminal is further configured to send a control instruction to the second terminal in response to tapping on the second operation option on the second user interface displayed on the first terminal. The second terminal is further configured to receive the control instruction sent by the first terminal, and the second terminal displays a third user interface of the first application.

It can be understood that, based on a same inventive concept, for the steps performed by the first terminal and the second terminal in the system in the second aspect, refer to related descriptions of steps performed by the first terminal and the second terminal when implementing corresponding functions in the data sharing and instruction operation control method in the first aspect.

With reference to the system in the second aspect, in some embodiments, the system further includes: The second terminal is further configured to send the third user interface to the first terminal, and the first terminal is further configured to display the third user interface.

With reference to the system in the second aspect, in some embodiments, the second terminal is further configured to receive the connection request, the second terminal is further configured to display a verification code input box in response to the received connection request, and the second terminal is further configured to establish a communication connection to the first terminal when a verification code entered in the verification code input box is the same as a verification code preset on the first terminal.

With reference to the system in the second aspect, in some embodiments, the system further includes: The second terminal is further configured to display first prompt information in response to tapping on the second operation option on the second user interface displayed on the first terminal.

With reference to the system in the second aspect, in some embodiments, the first application is a camera application, and the second operation option includes a photographing parameter adjustment option and a capture option.

With reference to the system in the second aspect, in some embodiments, the photographing parameter adjustment option includes a flash adjustment option, a focal length adjustment option, or a shutter speed adjustment option.

With reference to the system in the second aspect, in some embodiments, that the first terminal sends a control instruction to the second terminal in response to tapping on the second operation option on the second user interface displayed on the first terminal includes: The first terminal is further configured to send a capture instruction to the second terminal in response to tapping on the capture option, where the capture instruction carries first time information.

With reference to the system in the second aspect, in some embodiments, the system further includes: The second terminal is further configured to receive the capture instruction. The second terminal is further configured to perform a capture operation at a predetermined moment based on the first time information, to obtain a first photo. The second terminal is further configured to send the first photo to the first terminal. The first terminal is further configured to receive the first photo and store the first photo to a first folder, where a name of the first folder includes an identifier of the second terminal.

With reference to the system in the second aspect, in some embodiments, the system further includes: Within a preset time, the first terminal receives a first operation of a user, and the second terminal receives a second operation of a user. In this case, the first terminal responds to the first operation.

With reference to the system in the second aspect, in some embodiments, that the second terminal sends the second user interface to the first terminal, and the first terminal displays the second user interface specifically includes: The second terminal is further configured to convert the second user interface into a data stream. The second terminal is further configured to encapsulate the data stream into a distributed stream. The second terminal is further configured to send the distributed stream to the first terminal through a socket channel. The first terminal is further configured to restore the distributed stream to the data stream. The first terminal is further configured to convert the data stream into the second user interface. The first terminal is further configured to display the second user interface.

With reference to the system in the second aspect, in some embodiments, that the first terminal sends a control instruction to the second terminal, and the second terminal receives the control instruction sent by the first terminal specifically includes: The first terminal is further configured to convert the control instruction into a binder command. The first terminal is further configured to encapsulate the binder command into a distributed binder.

The first terminal is further configured to send the distributed binder to the second terminal through a socket channel. The second terminal is further configured to restore the distributed binder to the binder command. The second terminal is further configured to convert the binder command into the control instruction. The second terminal is further configured to receive the control instruction sent by the first terminal.

With reference to the system in the second aspect, in some embodiments, the system further includes: The first terminal is disconnected from the second terminal when the first terminal closes the first application.

According to a third aspect, an embodiment of this application provides a terminal. The terminal includes one or more processors and a memory. The memory is coupled to the one or more processors, and the memory is configured to store computer program code, where the computer program code includes computer instructions. The one or more processors invoke the computer instructions, so that the terminal performs the data sharing and instruction operation control method in any one of the implementations of the first aspect or the second aspect.

According to a fourth aspect, an embodiment of this application provides a computer storage medium, including computer instructions. When the computer instructions are run on an electronic device, the electronic device is enabled to perform the data sharing and instruction operation control method in any one of the possible implementations of any one of the foregoing aspects.

According to a fifth aspect, an embodiment of this application provides a computer program product. When the computer program product is run on a computer, the computer is enabled to perform the data sharing and instruction operation control method in any one of the possible implementations of any one of the foregoing aspects.

BRIEF DESCRIPTION OF DRAWINGS

FIG. 8A, FIG. 8B, FIG. 8C, and FIG. 8D are a flowchart of a data sharing and instruction operation control method according to Embodiment 2 of this application;

DESCRIPTION OF EMBODIMENTS

The technical solutions according to embodiments of this application are clearly and completely described in the following with reference to the accompanying drawings. In descriptions of embodiments of this application, "/" indicates "or", unless otherwise specified. For example, A/B may indicate A or B. In this specification, "and/or" describes only an association relationship for describing associated objects and indicates that three relationships may exist. For example, A and/or B may indicate the following three cases: Only A exists, both A and B exist, and only B exists. In addition, in descriptions of embodiments of this application, "plurality" means at least two.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In descriptions of embodiments of this application, "plurality" means at least two, unless otherwise specified.

This application provides a data sharing and instruction operation control method and a system. Based on a cross-process capability of a system native mechanism, this application provides a method for quickly establishing a connection between devices at a short distance and performing data sharing and instruction operation control without using any account or the Internet.

The method may include the following steps.

Step 1: A terminal 100 searches for and discovers a nearby device.

Figure 1A:
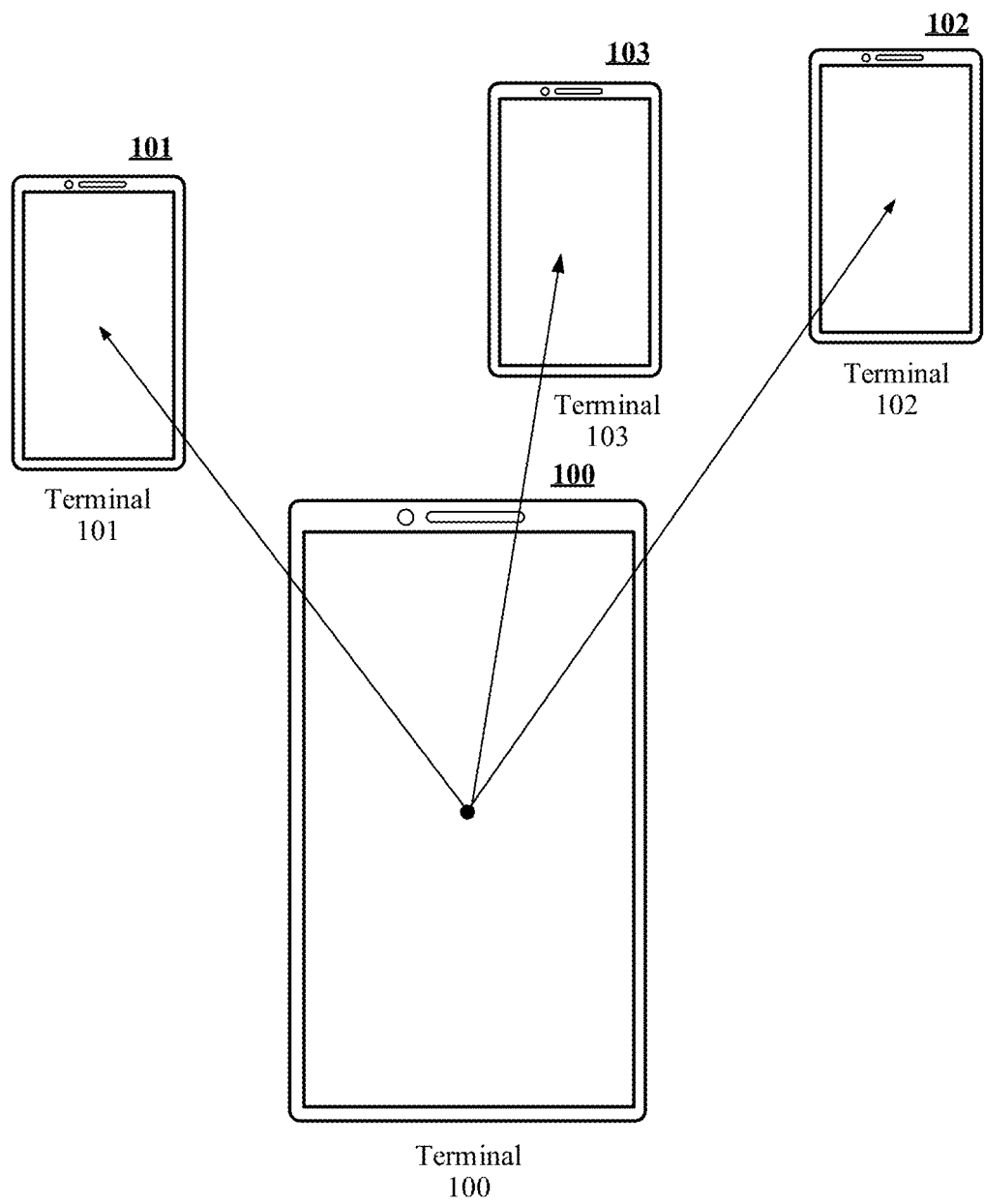
FIG. 1A is a diagram of a terminal 100 and nearby devices (a terminal 101, a terminal 102, and a terminal 103) according to an embodiment of this application.

As shown in FIG. 1A, the terminal 100 searches for and discovers a nearby device, and the nearby device may include a terminal 101, a terminal 102, and a terminal 103. The nearby device of the terminal 100 shown in FIG. 1A may not be limited to the three nearby devices (the terminal 101, the terminal 102, and the terminal 103) in FIG. 1A, and there may alternatively be more or fewer nearby devices. FIG. 1A shows the three nearby devices merely as an example for describing this application, and should not be construed as a limitation.

For example, the terminal 100 is a Bluetooth communication device. The terminal 100 enables a Bluetooth function and starts to search for a nearby device (the terminal 101, the terminal 102, and the terminal 103), and the terminal 100 sends a broadcast packet to a nearby device (the terminal 101, the terminal 102, and the terminal 103). A nearby device (the terminal 101, the terminal 102, and the terminal 103) on which a Bluetooth function is enabled receives and responds to the broadcast packet sent by the terminal 100. A device name of the nearby device (the terminal 101, the terminal 102, and the terminal 103) on which the Bluetooth function is enabled is displayed in a list of nearby devices discovered by the terminal 100.

Figure 1B:
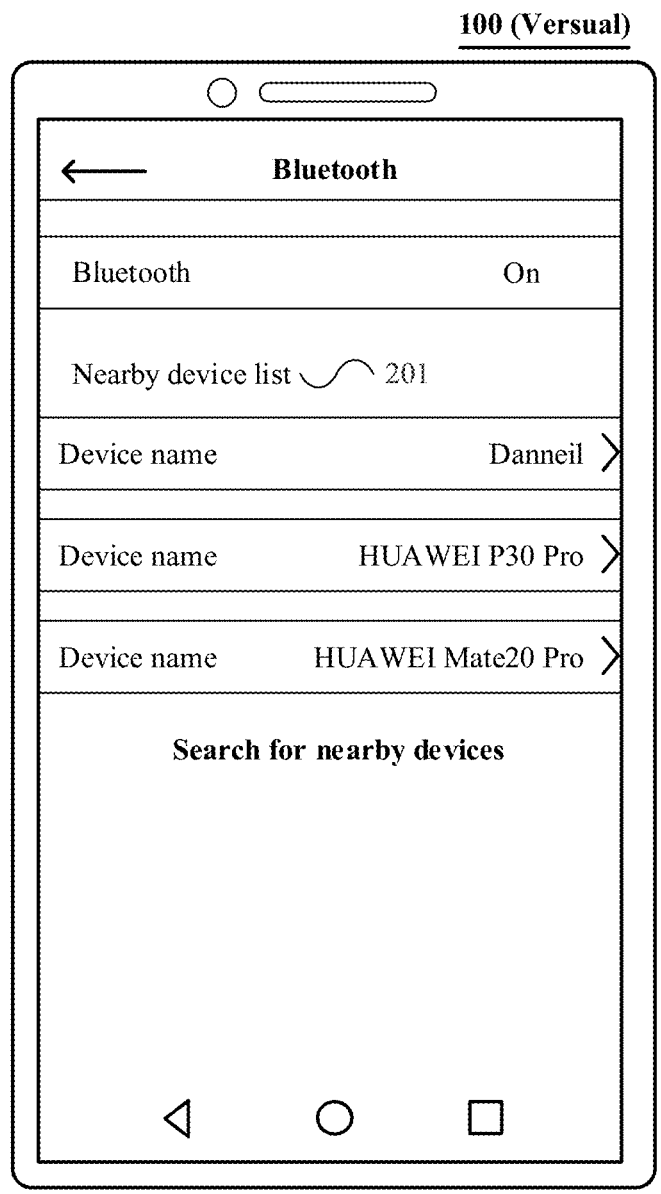
FIG. 1B is a diagram of a list of nearby devices discovered by a terminal 100 and displayed on the terminal 100 according to an embodiment of this application.

As shown in FIG. 1B, the list 201 of nearby devices discovered by the terminal 100 is displayed on the terminal 100, and device names of nearby devices (the terminal 101, the terminal 102, and the terminal 103) discovered by the terminal 100 are displayed in the list 201, for example, "HUAWEI P30 Pro" (a device name of the terminal 101), "Danneil" (a device name of the terminal 102), and "HUAWEI Mate20 Pro" (a device name of the terminal 103).

In addition to the manner of searching for and discovering a nearby device by the terminal 100 in FIG. 1B, a method described in an embodiment of FIG. 3C to FIG. 3I in the following Embodiment 1 may alternatively be used.

In addition to Bluetooth communication, the terminal 100 may alternatively use another wireless communication mode, for example, a wireless local area network (wireless local area networks, WLAN), Wi-Fi peer-to-peer (wireless fidelity peer to peer, Wi-Fi P2P), a Wi-Fi softAP, ultra-wideband (ultra-wideband, UWB), a near field communication (near field communication, NFC) technology, or another wireless communication mode, to search for and discover a nearby device.

It can be understood that the foregoing listed wireless communication modes are merely used to describe the searching for and discovering a nearby device by the terminal 100 in this application. This is not limited herein in this application.

Step 2: The terminal 100 chooses to establish a connection to a nearby device.

The terminal 100 detects that a device name in the nearby device list 201 is selected (for example, tapped) by a user, and the terminal 100 establishes a connection to a device corresponding to the device name selected by the user. For example, the terminal 100 detects that the device name "HUAWEI P30 Pro" (the device name of the terminal 101) in the list 201 is tapped, and the terminal 100 establishes a connection to the terminal 101.

For example, data sharing and operation control may be performed between the terminal 100 and the terminal 101 that are connected through Bluetooth communication.

Step 3: The terminal 101 and the terminal 100 that are communicatively connected may perform data sharing and operation control.

The terminal 101 displays a user interface of one or more application programs (for example, a camera user interface), and the terminal 101 sends the user interface to the terminal 100. The terminal 100 receives and displays the user interface (the user interface of the terminal 101 that is displayed on the terminal 100 is zoomed in or zoomed out in proportion, or remains unchanged in size). The user interface of the terminal 101 that is displayed on the terminal 100 and the user interface displayed on the terminal 101 have a same layout. In this way, the user of the terminal 100 can control the terminal 101 by using the user interface.

For example, in a photographing application scenario, the terminal 101 sends the camera user interface of the terminal 101 to the terminal 100, and the terminal 100 receives and displays the camera user interface. The camera user interface may be a photographing preview interface collected by a camera of the terminal 101. It should be noted that the terminal 100 displays the camera user interface of the terminal 101 by zooming in or zooming out the camera user interface in proportion, and the camera user interface of the terminal 101 that is displayed on the terminal 100 and the camera user interface displayed on the terminal 101 have a same layout. In addition, the terminal 101 sends a viewfinder image in a viewfinder frame of the camera user interface to the terminal 100 at a fixed interval (for example, 0.01 seconds), and the terminal 100 receives and displays the viewfinder image.

For another example, in a music play application scenario, a music play interface of the terminal 101 continuously changes with play progress of a song, and the music play interface includes a name of currently played music, a play progress bar, lyrics of the currently played music, and the like. The terminal 101 sends the music play interface of the terminal 101 to the terminal 100 at a fixed interval (for example, 0.01 seconds), and the terminal 100 receives and displays the music play interface (the music play interface of the terminal 101 that is displayed on the terminal 100 is zoomed in or zoomed out in proportion).

In addition, the user interface of the terminal 101 that is displayed on the terminal 100 may respond to a user operation (for example, tapping). The terminal 100 generates a control instruction based on the user operation (for example, tapping), where the control instruction carries user operation information (which may be referred to as parameter information). The terminal 100 sends the control instruction to the terminal 101. The terminal 101 receives the control instruction and identifies parameter information in the control instruction. The terminal 101 performs a preset function corresponding to the control instruction.

For example, in the photographing application scenario, the camera user interface of the terminal 101 that is displayed on the terminal 100 receives an operation of tapping a "thinning" control by the user, and the terminal 100 generates a "thinning" control instruction based on the operation of tapping the "thinning" control by the user, where the "thinning" control instruction carries a "thinning" parameter (for example, a "thinning" part and a "thinning" degree). The terminal 100 sends the "thinning" control instruction to the terminal 101. The terminal 101 receives the capture control instruction and identifies the "thinning" parameter in the "thinning" control instruction. The terminal 101 performs a preset function for the "thinning" control instruction. The user interface of the terminal 101 displays an image obtained through controlling by the "thinning" parameter. The terminal 101 sends the image obtained through controlling by the "thinning" parameter to the terminal 100. The terminal 100 displays the image obtained through controlling by the "thinning" parameter.

With this method, cross-device data sharing and operation control can be implemented. This method improves real-time performance of data transmission and facilitates interaction between people.

The following describes a hardware architecture of a device described in this application.

The device may be the terminal 100, the terminal 101, the terminal 102, the terminal 103, or the like.

The device may be a smartphone, a tablet computer, or another device. Herein, embodiments of this application are described in detail by using a smartphone as an example.

Figure 2:
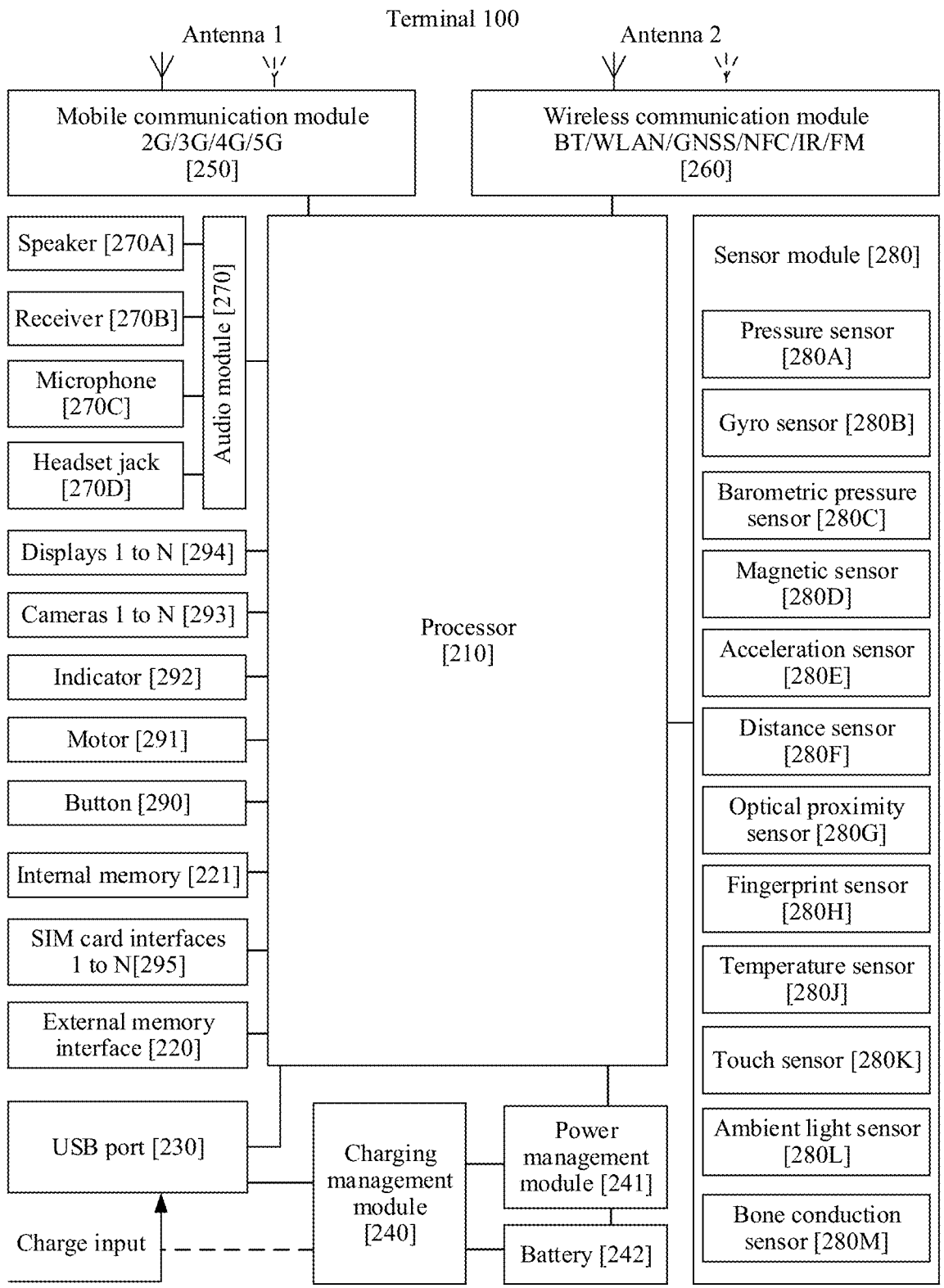
FIG. 2 is a schematic diagram of a hardware architecture of a device according to an embodiment of this application.

FIG. 2 is a schematic diagram of a hardware architecture of a device.

It should be understood that the device shown in FIG. 2 is merely an example, and the device may have more or fewer components than those shown in FIG. 2, or two or more components may be combined, or there may be a different component configuration. The components shown in the figure may be implemented in hardware, software, or a combination of hardware and software, including one or more signal processing circuits or application-specific integrated circuits.

The device may include a processor 210, an external memory interface 220, an internal memory 221, a universal serial bus (USB) port 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (SIM) card interface 295, and the like. The sensor module 280 may include a pressure sensor 280A, a gyro sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment of the present invention does not constitute a specific limitation on the device. In some other embodiments of this application, the device may include more or fewer components than those shown in the figure, combine some components, split some components, or have different component arrangements. The components shown in the figure may be implemented by using hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a neural center and a command center of the device. The controller may generate an operation control signal based on an instruction operation code and a time sequence signal, to complete control of instruction fetching and instruction execution. A memory may be further disposed in the processor 210, and is configured to store instructions and data. In some embodiments, the memory in the processor 210 is a cache. The memory may store instructions or data that has been used or is cyclically used by the processor 210. If the processor 210 needs to use the instructions or the data again, the processor may directly invoke the instructions or the data from the memory.

In this embodiment of this application, the processor 210 may run the instructions stored in the memory 221 to perform a data sharing and instruction operation control method of this application.

A wireless communication function of the device may be implemented by the antenna 1, the antenna 2, the mobile communication module 250, the wireless communication module 260, the modem processor, the baseband processor, or the like.

The antenna 1 and the antenna 2 are configured to transmit and receive an electromagnetic wave signal. Each antenna in the device may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 250 may provide a solution that is applied to the device and that includes a wireless communication technology, for example, 2G, 3G, 4G, or 5G. The mobile communication module 250 may include at least one filter, a switch, a power amplifier, a low noise amplifier (LNA), and the like. The mobile communication module 250 may receive an electromagnetic wave through the antenna 1, perform processing such as filtering or amplification on the received electromagnetic wave, and transmit the electromagnetic wave to the modem processor for demodulation. The mobile communication module 250 may further amplify a signal modulated by the modem processor, and convert the signal into an electromagnetic wave for radiation through the antenna 1. In some embodiments, at least some functional modules of the mobile communication module 250 may be disposed in the processor 210. In some embodiments, at least some functional modules of the mobile communication module 250 may be disposed in a same device as at least some modules of the processor 210.

The wireless communication module 260 may provide a wireless communication solution that is applied to the device, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 260 may be one or more components integrating at least one communication processor module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

In some embodiments, the antenna 1 and the mobile communication module 250 in the device are coupled, and the antenna 2 and the wireless communication module 260 in the device are coupled, so that the device can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

In this embodiment of this application, the wireless communication module 260 is configured to establish a connection between devices, for example, transmit data such as a picture, a video, or a document between the terminal 101 and the terminal 100, and transmit a control instruction between the terminal 101 and the terminal 100.

The display 294 is configured to display a received user interface of an application program of another device, or the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the device may include one or N displays 294, where N is a positive integer greater than 1.

The terminal 100 can implement a photographing function by using the ISP, the camera 293, the video codec, the GPU, the display 294, the application processor, and the like.

The ISP is configured to process data fed back by the camera 293. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the device may include one or N cameras 293, where N is a positive integer greater than 1.

The following describes a real-time data sharing and instruction operation control method provided in this application by using a photographing application scenario as an example and with reference to a plurality of embodiments.

Embodiment 1

In Embodiment 1, a controlling entity may control a controlled entity to take a photo. The controlling entity may be the terminal 100, and the controlled entity may be the terminal 101. In this way, when the user using the terminal 100 asks another person to take a photo of the user, the user may view, in real time, a collected image, a camera image composition mode, camera zoom information, a camera effect, and the like on a terminal of the another person (namely, the terminal 101), and may further directly control the terminal 101 to modify a photographing parameter, so that a finally obtained photo can better meet an expectation of the user using the terminal 100.

For ease of description of this embodiment, a user interface of a camera app of the terminal 100 is referred to as a first user interface, and a user interface of a camera app of the terminal 101 is referred to as a second user interface.

The terminal 100 and the terminal 101 each start the camera app, and the terminal 100 searches for, discovers, and connects to a nearby device: the terminal 101.

In some possible embodiments, the terminal 100 may search for, discover, and connect to the nearby device, namely, the terminal 101, in the manner shown in FIG. 1B.

After the terminal 100 establishes a connection to the terminal 101, the terminal 100 and the terminal 101 each start the camera app. This is not limited herein in this application.

In some possible embodiments, the terminal 101 may search for a nearby device, and after the terminal 101 discovers the nearby terminal 100, the terminal 101 sends a connection request to the terminal 100. This is not limited herein in this application.

The terminal 101 transmits the second user interface to the terminal 100. In addition, the terminal 101 transmits an image in a viewfinder frame of the second user interface to the terminal 100 at a fixed interval (for example, 0.01 seconds). The camera app of the terminal 100 receives and displays the second user interface of the terminal 101 and the image that is in the viewfinder frame of the second user interface and that is transmitted by the terminal 101 at the fixed interval (for example, 0.01 seconds).

In some possible embodiments, after the terminal 100 searches for, discovers, and connects to the nearby device, namely, the terminal 101, the terminal 100 is configured only to display the second user interface and the image in the viewfinder frame of the second user interface, and the terminal 100 does not need to start the camera app. This is not limited herein in this application.

The terminal 100 may control photographing performed by the terminal 101, for example, add an effect that the user of the terminal 100 likes, to look thin and white. The first user interface of the terminal 100 receives a first operation (for example, selecting a "thinning" effect) of a user, and the terminal 100 generates a "thinning" control instruction based on the first operation (for example, selecting the "thinning" effect) of the user. The terminal 100 transmits the "thinning" control instruction to the terminal 101. The terminal 101 receives and responds to the "thinning" control instruction. The terminal 101 identifies a "thinning" parameter (for example, a "thinning" degree and a "thinning" part) in the "thinning" control instruction. The camera app of the terminal 101 performs, based on the "thinning" parameter, image processing on an image in the viewfinder frame of the second user interface of the terminal 101, and a body shape of a photographing object displayed on a processed image meets a "thinning" requirement corresponding to the "thinning" user operation on the terminal 100. The terminal 101 sends, to the terminal 100 at a fixed interval (for example, 0.01 seconds), an image in the viewfinder frame of the second user interface of the terminal 101 (including an image obtained by performing image processing on the image in the viewfinder frame of the user interface of the camera app of the terminal 101 based on the "thinning" parameter). The camera app of the terminal 100 displays the image that is in the viewfinder frame of the second user interface and that is sent by the terminal 101 at the fixed interval (for example, 0.01 seconds) (including the image obtained by performing image processing on the image in the viewfinder frame of the second user interface based on the "thinning" parameter).

The terminal 100 receives a second operation (for example, touching a capture control) of the user, and the terminal 100 generates a capture control instruction based on the second operation (for example, touching the capture control) of the user. The terminal 100 waits several seconds (for example, 3 seconds) and then sends the capture control instruction to the terminal 101. The terminal 101 receives and responds to the capture control instruction. The terminal 101 stores a captured image to an album of the terminal 101 in a picture format. The terminal 101 sends the captured image to the terminal 100. In addition, the terminal 100 receives and stores the captured image to an album of the terminal 100 in a picture format.

In some possible embodiments, the terminal 100 may generate the capture control instruction based on the second operation of the user, and send the capture control instruction to the terminal 101; the terminal 101 receives the capture control instruction, waits a period of time (for example, 5 seconds), and then gives a response; and the terminal 101 performs a capture operation. In other words, the terminal 100 may generate the capture control instruction and wait a period of time before sending the capture control instruction to the terminal 101; or after receiving the capture control instruction, the terminal 101 may wait a period of time before performing the capture operation. In this way, after the user touches the capture control on the terminal 100, there is sufficient time to place the terminal 100 at a location that does not affect a photographing effect. For example, photographing is performed after the terminal 100 is placed in a pocket of clothes.

In some possible embodiments, when the terminal 100 determines that a photographing preview effect has met a user expectation, the user of the terminal 100 may indicate a user of the terminal 101 to perform a capture operation. In this case, the terminal 101 may receive a user operation (for example, touching a capture control), and the terminal 101 takes a photo and stores a captured image to the album of the terminal 101 in a picture format. The terminal 101 sends the captured image to the terminal 100. The terminal 100 receives the image and stores the captured image to the album of the terminal 100 in a picture format. This is not limited herein in this application.

First, human-computer interaction included in Embodiment 1 is described.

Figure 3A:
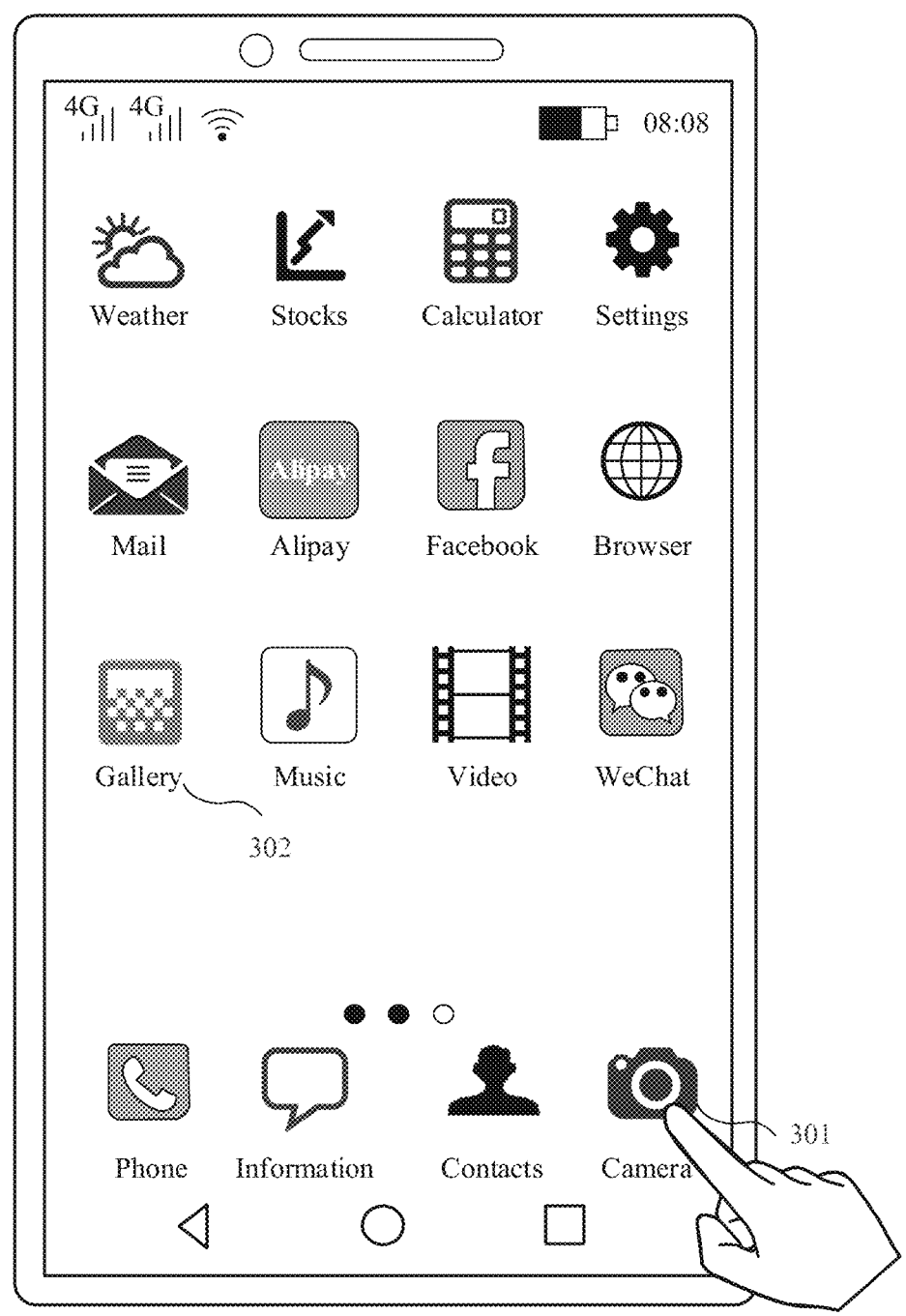
FIG. 3A to FIG. 3L are schematic diagrams of a group of UIs according to Embodiment 1.

FIG. 3A shows a user interface of a home screen of the terminal 100, and the user interface displays a plurality of application icons (including a camera application icon 301, a gallery application gallery 302).

Figure 3B:
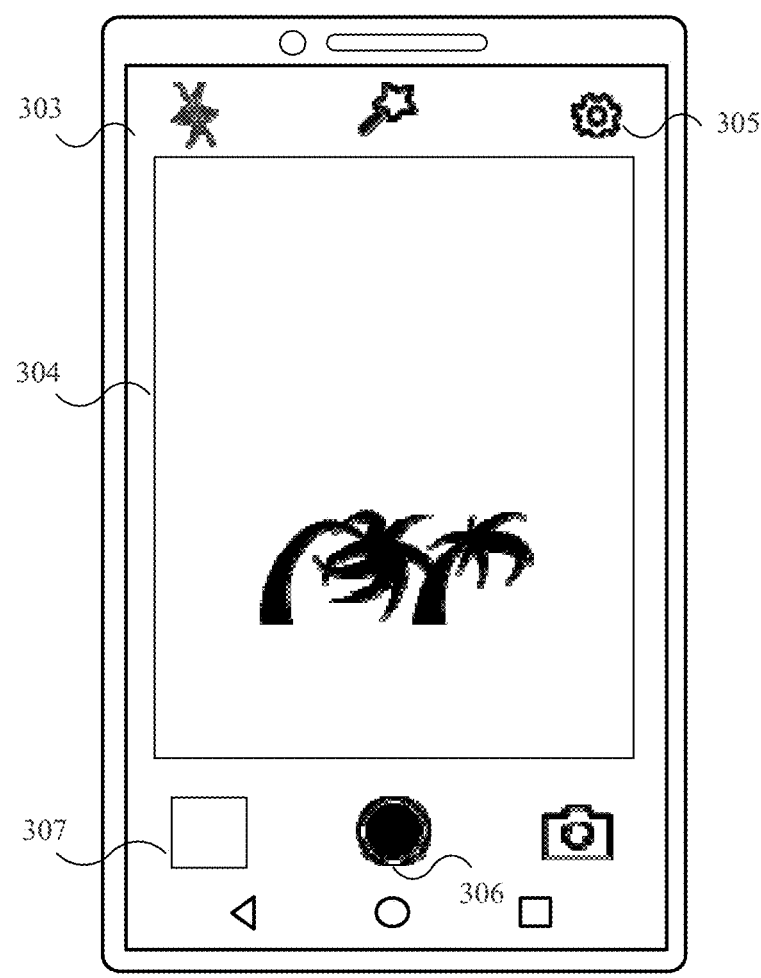

The camera application icon 301 in FIG. 3A may receive a user operation (for example, tapping), and in response to the operation, the terminal 100 may display a first user interface 303 shown in FIG. 3B.

In some embodiments, the camera app of the terminal 100 is configured only to display the second user interface of the terminal 101 and the image in the viewfinder frame of the second user interface of the terminal 101, and control photographing performed by the terminal 101, and the terminal 100 does not perform photographing behavior. Therefore, a camera hardware device of the terminal 100 may not be started, to reduce consumption. This is not limited herein in this application.

FIG. 3B is a diagram of a UI on which the terminal 100 displays a user interface 303 of the camera app of the terminal 100 and a viewfinder image. The user interface 303 may also be referred to as the first user interface 303. The first user interface 303 includes a preview frame 304, a plurality of photographing mode options, a capture control 306, an area 307 displaying a thumbnail of the last captured picture, and a photographing direction reversing control.

The plurality of photographing mode options include a flash control, an effect control, and a settings control 305.

The preview frame 304 displays a current viewfinder image of the camera app of the terminal 100. The settings control 305 in FIG. 3B may receive a user operation (for example, tapping), and in response to the operation, the terminal 100 displays a settings interface 308 shown in FIG. 3C.

The photographing direction reversing control is a control for switching between a front-facing camera and a rear-facing camera.

FIG. 3C to FIG. 3F are diagrams of UIs on which the terminal 100 searches for and discovers a nearby device (for example, the terminal 101).

Figure 3C:
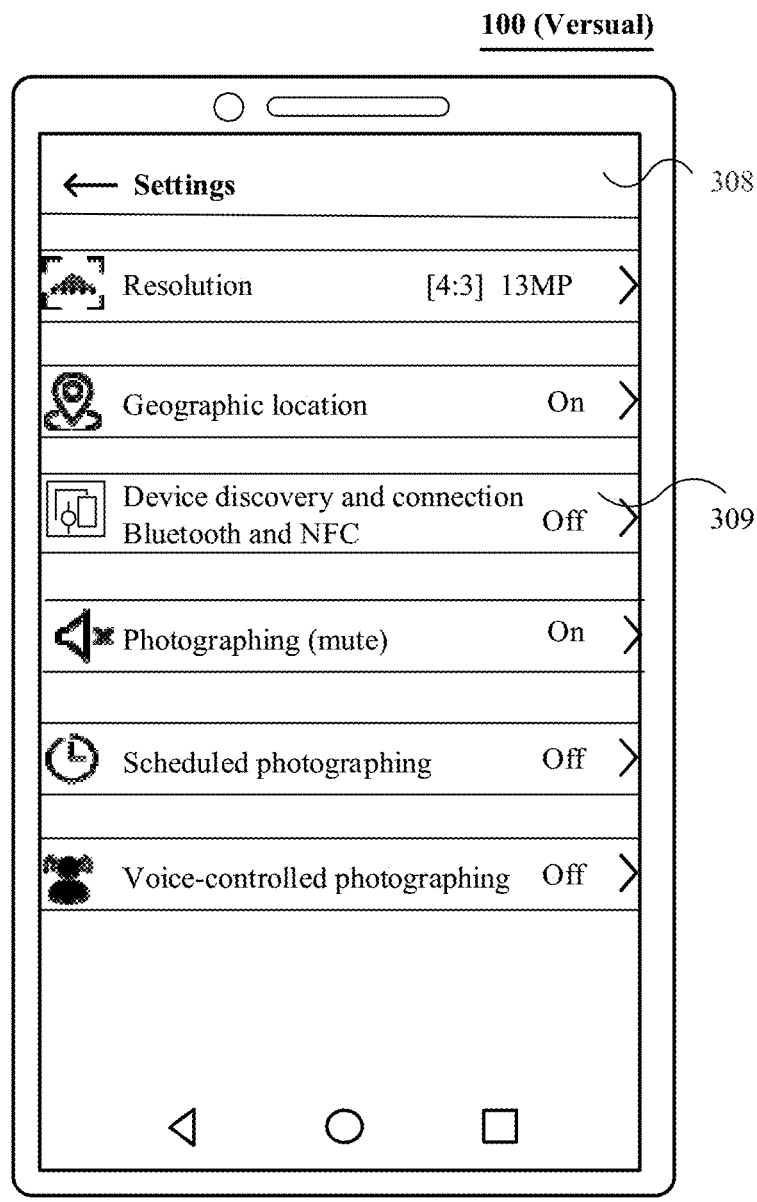

The settings interface 308 shown in FIG. 3C includes: a resolution control, where a resolution is "[4:3] 13MP"; a geographical location on/off control, where a geographical location is enabled; a device discovery and connection control 309, where a device discovery and connection option is currently in an off state; a photographing mute on/off control, where photographing mute is on; a scheduled photographing on/off control, where scheduled photographing is off; and a voice-controlled photographing on/off control, where voice-controlled photographing is off. The device discovery and connection control 309 may receive a user operation (for example, tapping), and in response to the operation, the terminal 100 enables a device discovery and connection function.

Figure 3D:
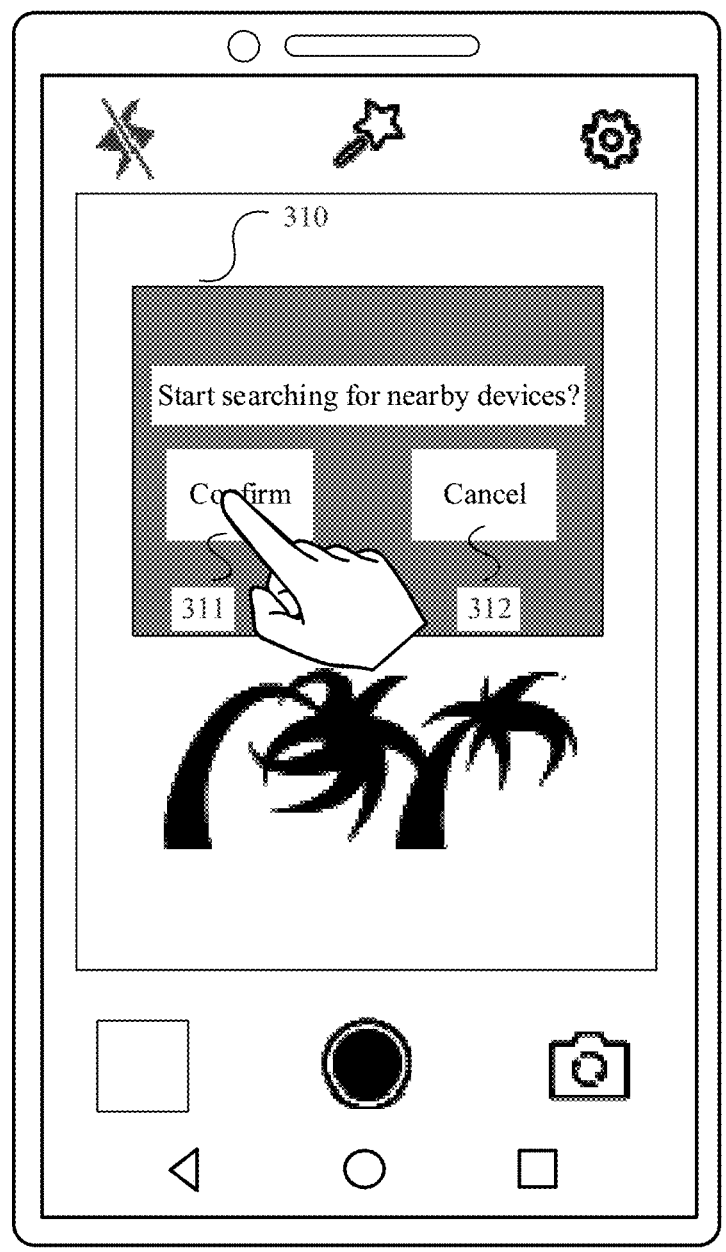

In response to that the device discovery and connection switch 309 is displayed in an on state, the user interface of the camera app of the terminal 100 displays a prompt box 310 shown in FIG. 3D. The prompt box 310 is configured to prompt the user of the terminal 100 whether to start to search for and discover a nearby device. The prompt box 310 includes a confirm control 311 and a cancel control 312.

Figure 3E:
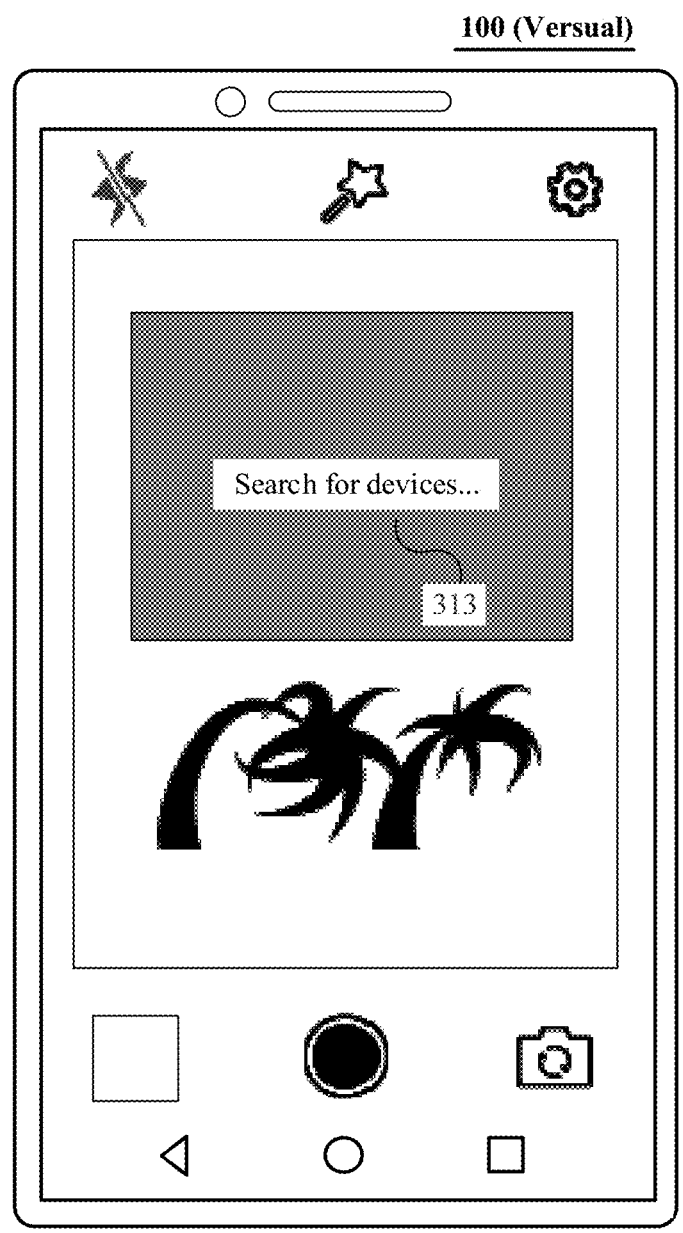

The confirm control 311 may receive a user operation (for example, tapping), and in response to the operation, the user interface of the camera app of the terminal 100 displays a prompt box 313 shown in FIG. 3E. The prompt box 313 includes prompt information: "Searching for a nearby device . . . ". The prompt information in the prompt box 313 is used to inform the user that the terminal 100 is searching for a nearby device.

Figure 3F:
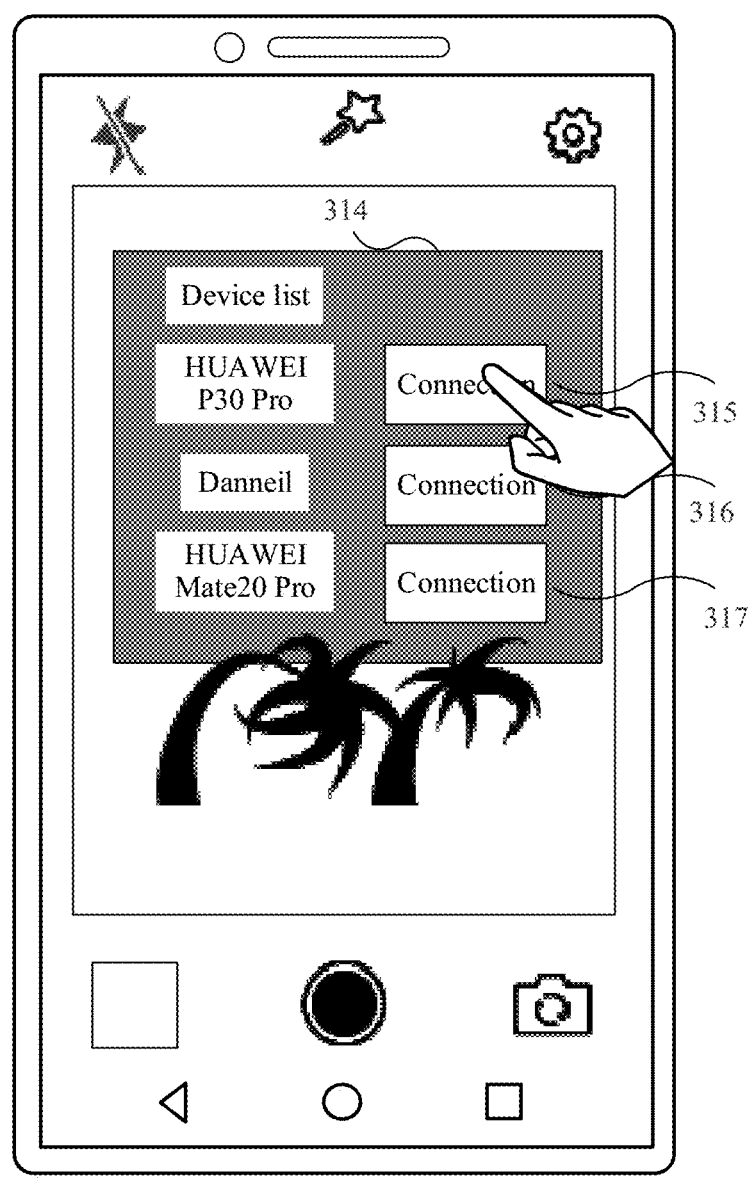

In response to the operation of searching for and discovering a nearby device by the terminal 100, the user interface of the camera app of the terminal 100 displays a nearby device list 314 shown in FIG. 3F. The list 314 is configured to display a device name of a nearby device searched for and discovered by the terminal 100. The list 314 includes device names of the nearby devices: "HUAWEI P30 Pro", "Danneil", and "HUAWEI Mate20 Pro"; and further includes a connection control 315, a connection control 316, and a connection control 317. The connection control 315, the connection control 316, and the connection control 317 each may receive a user operation (for example, tapping), to establish a connection to a device corresponding to a device name in the list 314.

For example, the connection control 315 receives a user operation (for example, tapping), and the terminal 100 may establish a connection to the terminal 101 (device name: "HUAWEI P30 Pro"); the connection control 316 receives a user operation (for example, tapping), and the terminal 100 may establish a connection to the terminal 102 (device name: "Danneil"); and the connection control 317 receives a user operation (for example, tapping), and the terminal 100 may establish a connection to the terminal 103 (device name: "HUAWEI Mate20 Pro"). For example, the connection control 315 receives a user operation (for example, tapping), and in response to the operation, the terminal 100 (device name: "Versual") sends a connection establishment request to the terminal 101 (device name: "HUAWEI P30 Pro").

Figure 3G:
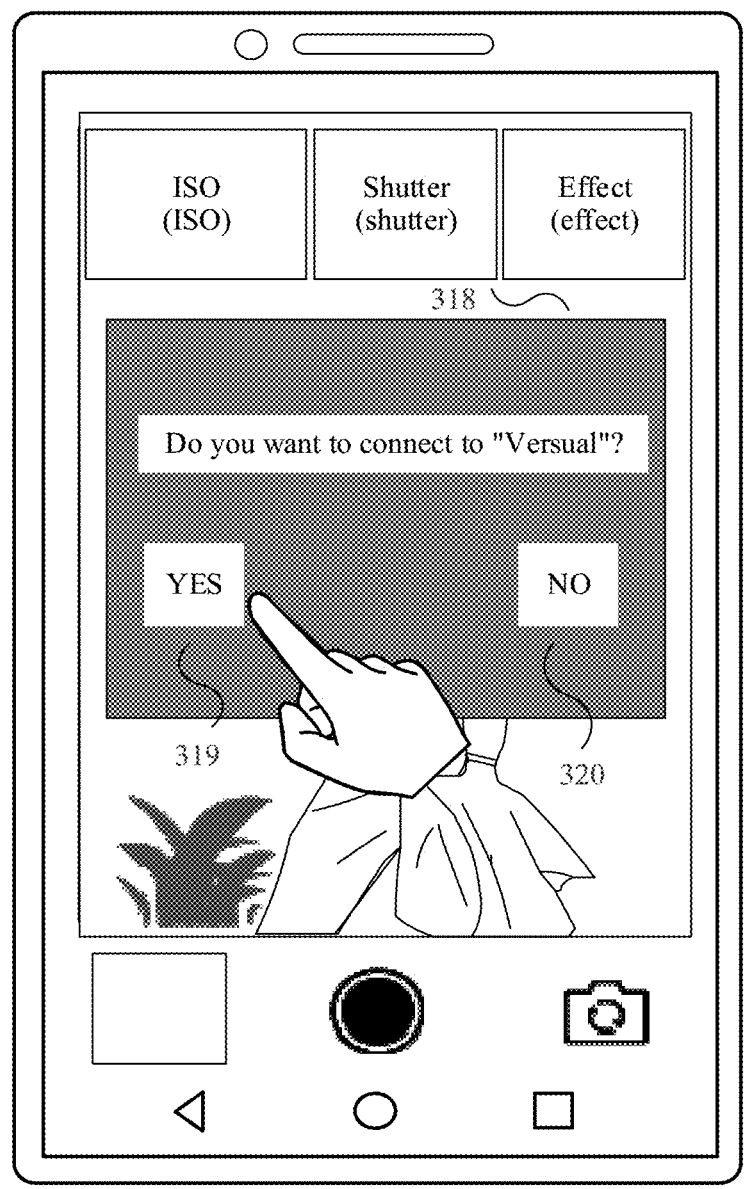
Figure 3H:
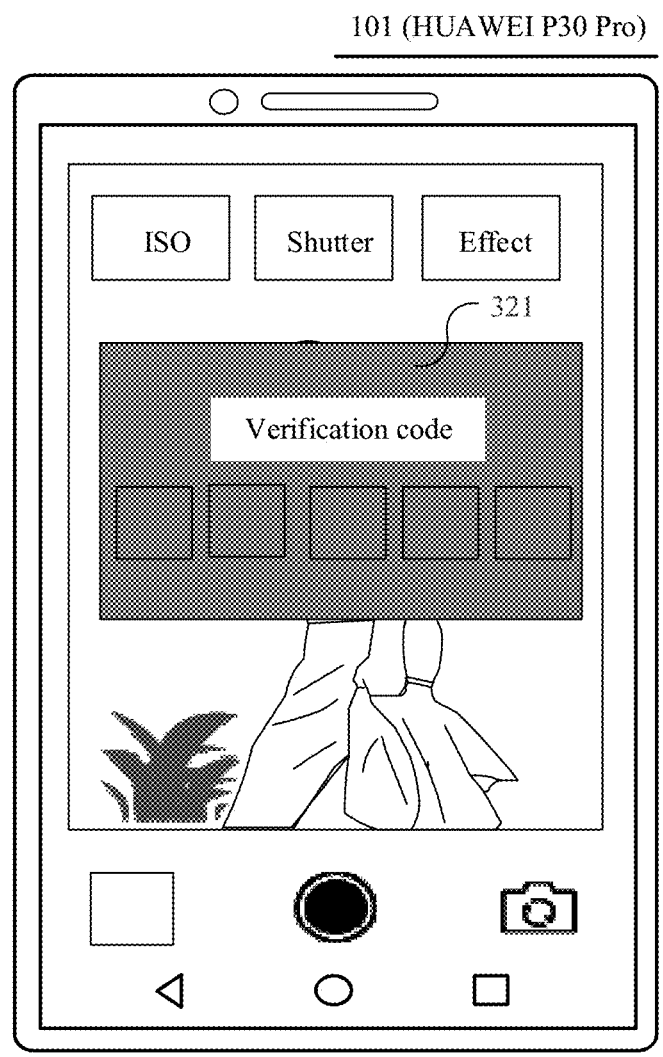
Figure 3I:
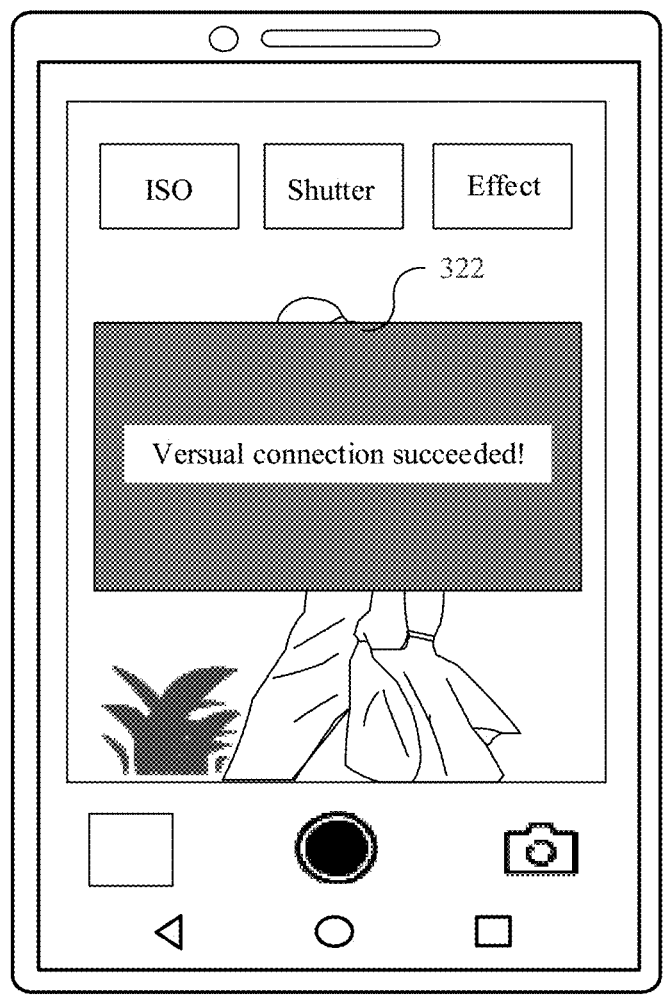

FIG. 3G to FIG. 3I are diagrams of UIs on which the terminal 101 responds to a connection establishment request of the terminal 100 and establishes a connection to the terminal 101.

In response to the connection establishment request of the terminal 100, the user interface of the camera app of the terminal 101 displays a prompt box 318 shown in FIG. 3G. The prompt box 318 includes prompt information: "Do you want to connect to "Versual"?"; a YES control 319; and a NO control 320. The prompt information in the prompt box 318 is used to prompt the user of the terminal 101 to determine whether to agree to establishing a connection to the terminal 100 (device name: "Versual").

The YES control 319 in the prompt box 318 may receive a user operation (for example, tapping), and in response to the operation, the user interface of the camera app of the terminal 100 displays a verification code prompt box. A verification code in the verification code prompt box is a verification code preset on the terminal 100. For example, the verification code in the verification code prompt box may be "12345". The user of the terminal 100 may inform the user operating the terminal 101 of the verification code "12345" displayed in the verification code prompt box.

In some embodiments, after the YES control 319 in the prompt box 318 receives a user operation, the terminal 100 may alternatively not display the verification code. The user of the terminal 100 may view the preset verification code used for connection, and inform the user operating the terminal 101 of the preset verification code.

In some other embodiments, after the terminal 100 sends the connection establishment request to the terminal 101, the user operating the terminal 100 may alternatively enter, on the terminal 100, a two-dimensional code used to establish a connection. This is not limited in this application.

The user interface of the camera app of the terminal 101 displays a prompt box 321 shown in FIG. 3H. The prompt box 321 is configured to prompt the user to enter a verification code. The prompt box 321 may receive a verification code entered by the user through tapping operations. For example, the verification code may be "12345". The terminal 101 responds to the verification code entered by the user, and the terminal 101 sends the verification code "12345" to the terminal 100. The terminal 100 receives the verification code "12345" sent by the terminal 101. If the verification code "12345" is the same as the verification code preset on the terminal 100, the user interface of the camera app of the terminal 101 displays a prompt box 322 shown in FIG. 3I. The prompt box 322 includes prompt information: "Successfully connected to Versual." The prompt information in the prompt box 322 is used to indicate that the terminal 101 is successfully connected to the terminal 100.

The camera app of the terminal 100 also displays prompt information, and the prompt information is used to indicate that the terminal 100 is successfully connected to the terminal 101.

In some embodiments, if the terminal 101 has established a connection to the terminal 100 before, when the terminal 100 initiates a connection establishment request to the terminal 101 again, the terminal 101 may omit a step of receiving a verification code entered by the user, and directly establish a connection to the terminal 100, thereby simplifying a user operation. This is not limited herein in this application.

After the terminal 100 establishes a connection to the terminal 101, the terminal 101 transmits the second user interface to the terminal 100, and the terminal 101 transmits a viewfinder image in the viewfinder frame of the second user interface to the terminal 100 at a fixed interval (for example, 0.01 seconds). The camera app of the terminal 100 displays the second user interface and displays the viewfinder image that is in the viewfinder frame of the second user interface and that is sent by the terminal 101 at the fixed interval (for example, 0.01 seconds).

Figure 3J:
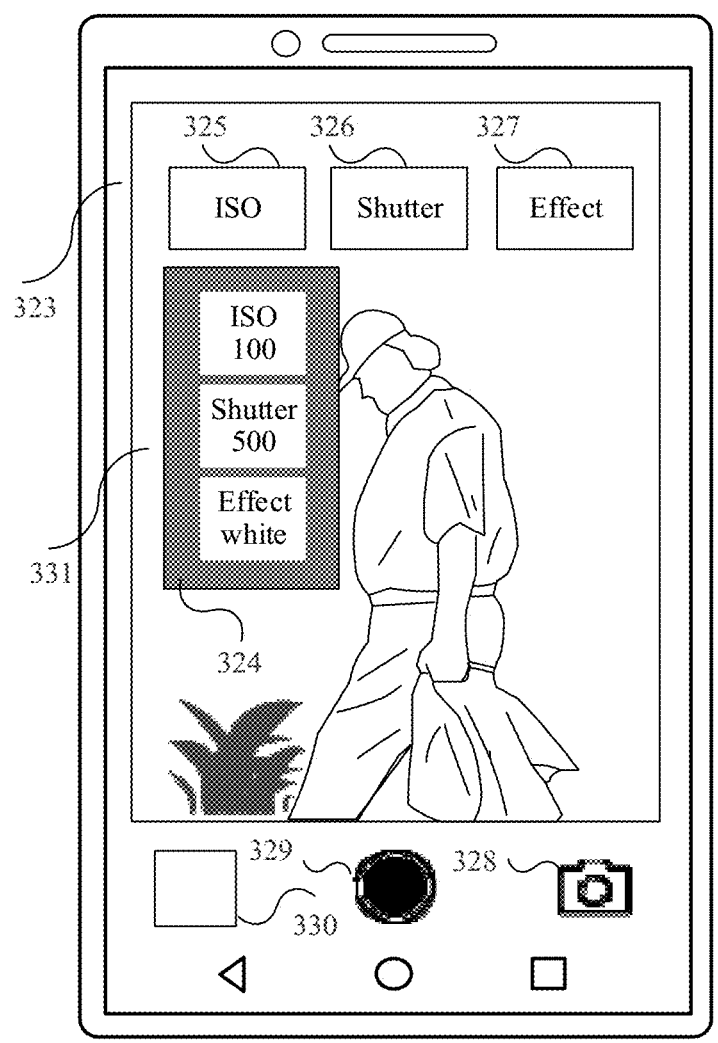

A camera user interface 323 shown in FIG. 3J is the user interface, displayed on the terminal 101, of the camera app of the terminal 101. The camera user interface 323 may also be referred to as a second user interface 323. The second user interface 323 includes a viewfinder frame 331, a plurality of photographing mode options, a capture control 329, an area 330 displaying a thumbnail of the last captured picture, and a photographing direction reversing control 328.

The plurality of photographing mode options include an International Standards Organization (ISO) control 325, a shutter control 326, and an effect control 327.

The viewfinder frame 331 displays a viewfinder image of the camera app of the terminal 101. It can be understood that the camera app of the terminal 101 obtains a current viewfinder image of the camera app of the terminal 101 at a fixed interval (for example, 0.01 seconds), and displays the viewfinder image in the viewfinder frame 331. A figure displayed in the viewfinder frame 331 is an image of the user operating the terminal 100.

The photographing direction reversing control 328 is a control for switching between a front-facing camera and a rear-facing camera.

In some embodiments, as shown in FIG. 3J, the second user interface 323 further includes a photographing parameter list 324 of the camera app of the terminal 101. The photographing parameter list 324 includes: a photographing parameter ISO, where an ISO value is 100; a photographing parameter shutter, where a shutter value is 500; and a photographing parameter effect, where the effect is whitening (White). This is not limited herein in this application.

It can be understood that, if the terminal 101 receives a user operation of modifying a photographing parameter, a value of the corresponding photographing parameter in the photographing parameter list 324 is displayed as a value, of the photographing parameter, that is obtained through modification by the user operation. For example, if the user modifies the photographing parameter ISO and changes the ISO value to 110, a value of the photographing parameter ISO in the photographing parameter list 324 is displayed as 110.

Figure 3K:
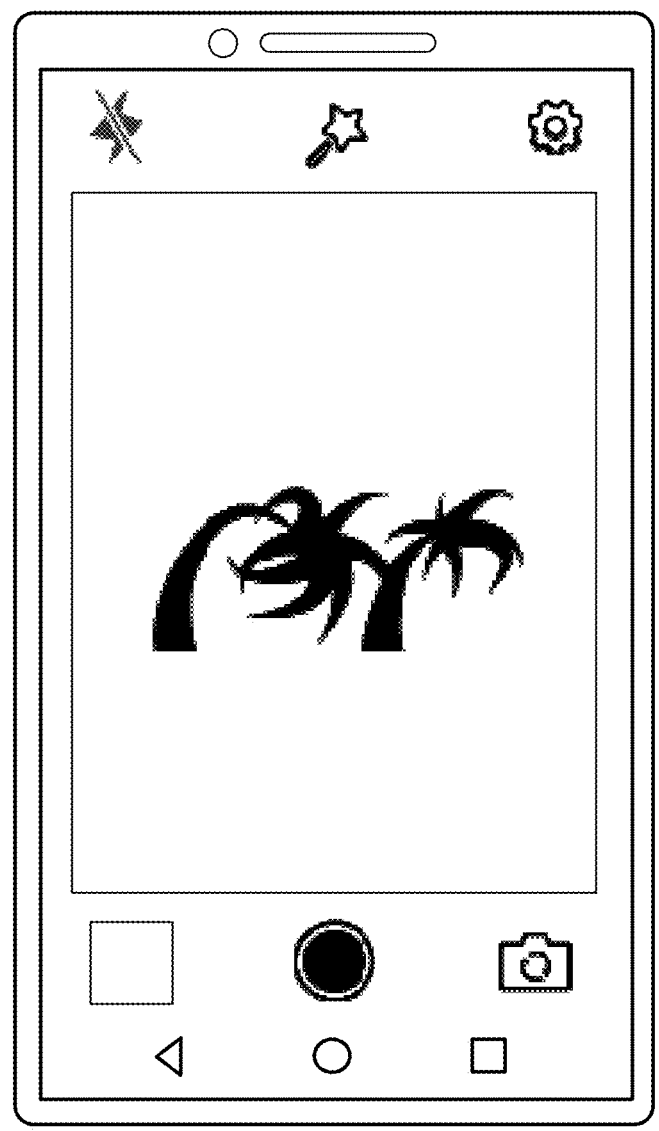
Figure 3L:
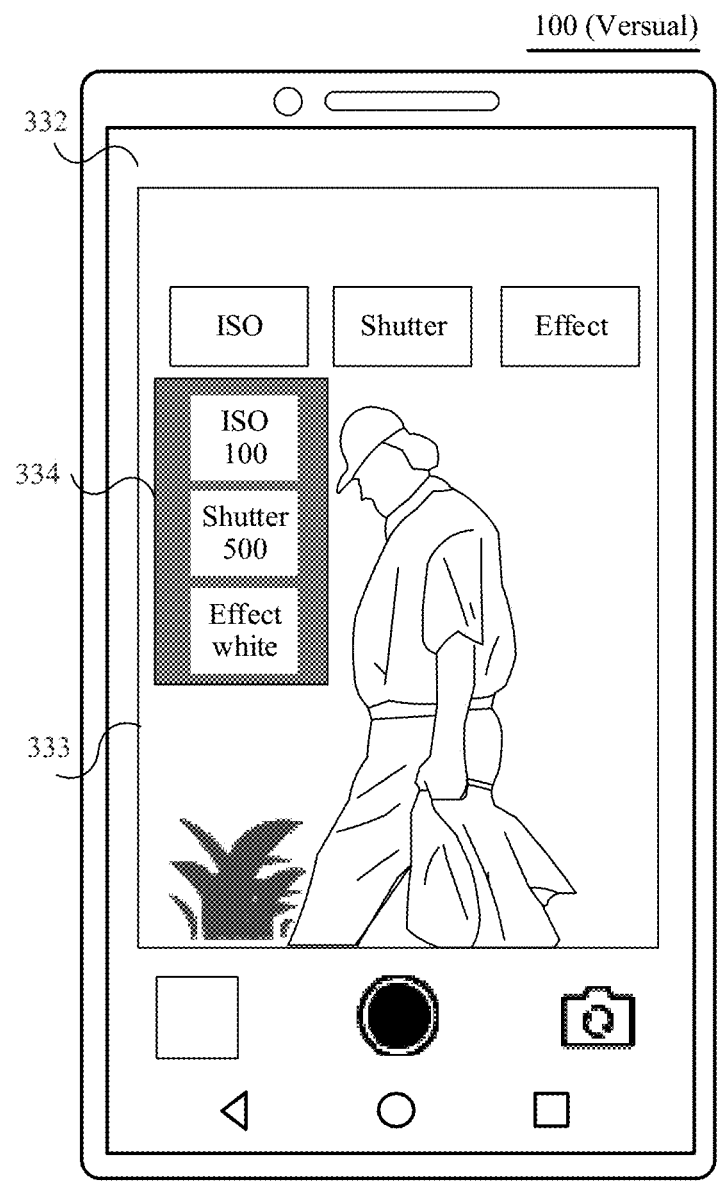

FIG. 3K and FIG. 3L are diagrams of UIs on which the camera app of the terminal 100 switches from displaying a viewfinder image of the camera app of the terminal 100 and the first user interface of the terminal 100 to displaying the second user interface of the terminal 101 and an image that is in the viewfinder frame of the second user interface and that is sent by the terminal 101 at a fixed interval (for example, 0.01 seconds).

In FIG. 3K, the user interface of the camera app of the terminal 100 displays the viewfinder image of the camera app of the terminal 100 and the first user interface of the terminal 100. For descriptions of FIG. 3K, refer to the UI diagram FIG. 3B. Details are not described herein again.

In FIG. 3L, the camera app of the terminal 100 displays the second user interface of the terminal 101 and the image that is in the viewfinder frame of the second user interface and that is sent by the terminal 101 at the fixed interval (for example, 0.01 seconds). FIG. 3L includes a user interface 332, a photographing parameter list 334, and a viewfinder image in a viewfinder frame 333.

The user interface 332 is the second user interface transmitted by the terminal 101 to the terminal 100. For descriptions of the user interface 332, refer to the descriptions of the second user interface 323 in the embodiment of the UI diagram FIG. 3J. Details are not described herein again.

The viewfinder image in the viewfinder frame 333 is the image that is in the viewfinder frame of the second user interface and that is sent by the terminal 101 to the terminal 101 at the fixed interval (for example, 0.01 seconds).

A photographing parameter in the photographing parameter list 334 is a photographing parameter that is in a photographing parameter list of the camera app of the terminal 101 and that is transmitted by the terminal 101 to the terminal 100. For details, refer to the descriptions of the photographing parameter list 324 of the camera app of the terminal 101 in the embodiment of the UI diagram FIG. 3J. Details are not described herein again.

In some embodiments, a display of the terminal 100 and a display of the terminal 101 have different sizes. Therefore, after the terminal 101 sends the second user interface of the terminal 101 to the terminal 100, the second user interface of the terminal 101 that is displayed on the terminal 100 is zoomed in or zoomed out in proportion. This is not limited herein in this application.

In some embodiments, the terminal 100 and the terminal 101 may not be terminal devices of a same model. Therefore, shapes and display locations of the photographing parameter list 331 and the photographing parameter list 334 may be different. The shapes and the display locations of the photographing parameter list 331 and the photographing parameter list 334 are not limited herein.

In some embodiments, the first user interface of the terminal 100 may not display the photographing parameter list 334. This is not limited herein in this application.

FIG. 4A to FIG. 4E are diagrams of UIs on which the terminal 100 receives a first operation (for example, selecting a "thinning" effect) of the user. The terminal 100 generates a "thinning" control instruction based on the first operation (for example, selecting the "thinning" effect) of the user. The terminal 100 transmits the "thinning" control instruction to the terminal 101. The terminal 101 receives and responds to the "thinning" control instruction. The terminal 101 identifies a "thinning" parameter (for example, a "thinning" degree and a "thinning" part) in the "thinning" control instruction. The camera app of the terminal 101 performs, based on the "thinning" parameter, image processing on an image in the viewfinder frame of the second user interface of the terminal 101, and a body shape of a photographing object displayed on a processed image meets a "thinning" requirement corresponding to the "thinning" user operation on the terminal 100. The terminal 101 sends, to the terminal 100 at a fixed interval (for example, seconds), an image in the viewfinder frame of the second user interface of the terminal 101 (including an image obtained by performing image processing on the image in the viewfinder frame of the user interface of the camera app of the terminal 101 based on the "thinning" parameter). The camera app of the terminal 100 displays the image that is in the viewfinder frame of the second user interface and that is sent by the terminal 101 at the fixed interval (for example, 0.01 seconds) (including the image obtained by performing image processing on the image in the viewfinder frame of the second user interface based on the "thinning" parameter).

Figure 4A:
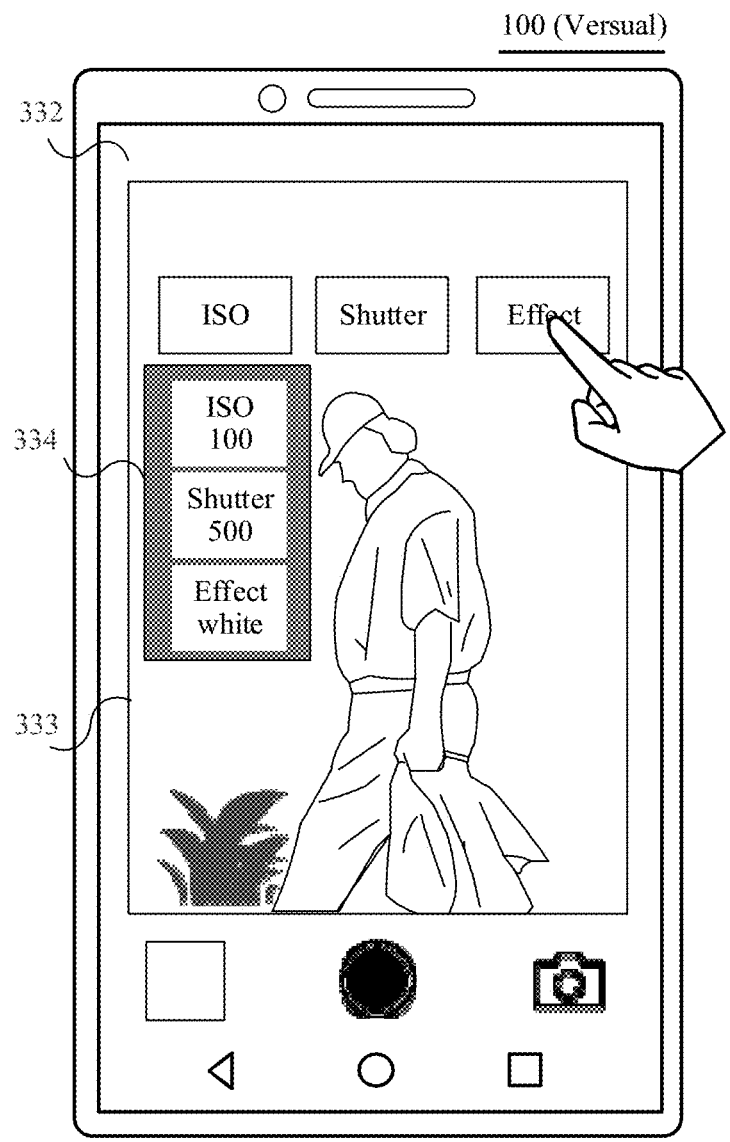
FIG. 4A to FIG. 4E are schematic diagrams of a group of UIs according to Embodiment 1.
Figure 4B:
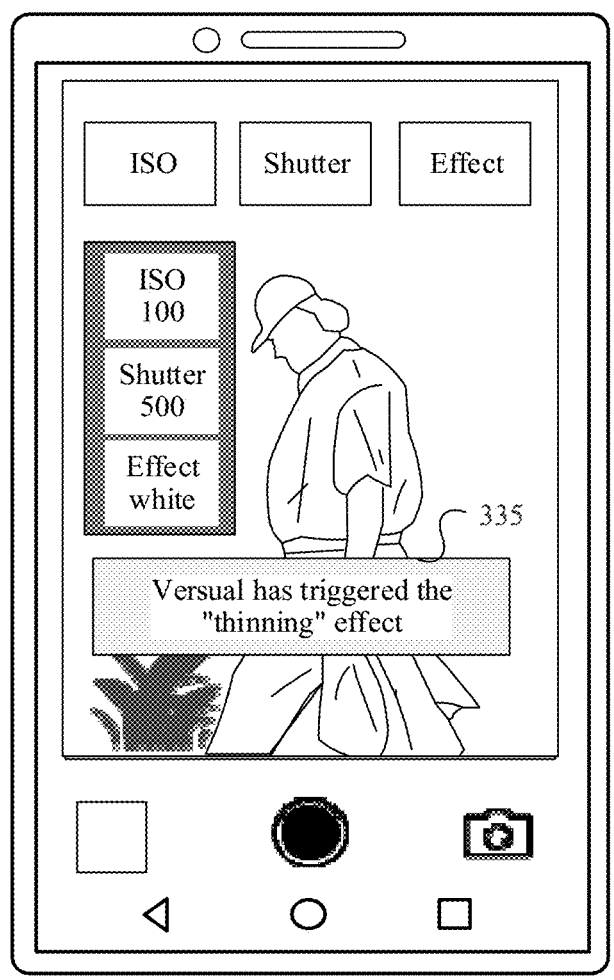

As shown in FIG. 4A, a plurality of photographing mode options (for example, effect) on the user interface 332 of the camera app of the terminal 100 may receive a user operation (for example, tapping), and in response to the operation, the second user interface of the terminal 101 displays an effect selection prompt box. The effect selection prompt box includes a plurality of effect instruction controls, for example, a "whitening" control, a "buffing" control, a "thinning" control, and a "long leg" control.

In some embodiments, the effect selection prompt box is not limited to the foregoing listed effect instruction controls, and may receive a user operation of swiping left with three fingers. The operation is not limited to three-finger swiping, and may alternatively be double-finger swiping or single-finger swiping; and the operation is not limited to the leftward swiping operation, and may alternatively be a rightward swiping operation, or a floating leftward or rightward swiping operation. This is not limited herein in this application. The terminal 100 responds to the three-finger leftward swiping operation acting on the effect selection prompt box, and the effect selection prompt box displays a hidden effect instruction control, for example, a focus control or a photographing speed adjustment control. This is not limited herein in this application.

For example, the "thinning" control may receive a user operation (for example, tapping). The terminal 100 generates a "thinning" control instruction based on a "thinning" effect selected by the user. The terminal 100 transmits the "thinning" control instruction to the terminal 101. The terminal 101 receives and responds to the "thinning" control instruction. The second user interface of the terminal 101 displays a prompt box 335 shown in FIG. 4B. The prompt box 335 includes prompt information: "Versual has triggered the "thinning" effect." The prompt information in the prompt box 335 is used to notify the user of the terminal 101 that the user of the terminal 100 has triggered the "thinning" effect.

The terminal 101 identifies a "thinning" parameter (for example, a "thinning" degree and a "thinning" part) in the "thinning" control instruction. The camera app of the terminal 101 performs image processing on an image in the viewfinder frame of the second user interface of the terminal 101 based on the "thinning" parameter. A body shape of a photographing object displayed on a processed image meets a "thinning" requirement corresponding to the "thinning" user operation on the terminal 100.

Figure 4C:
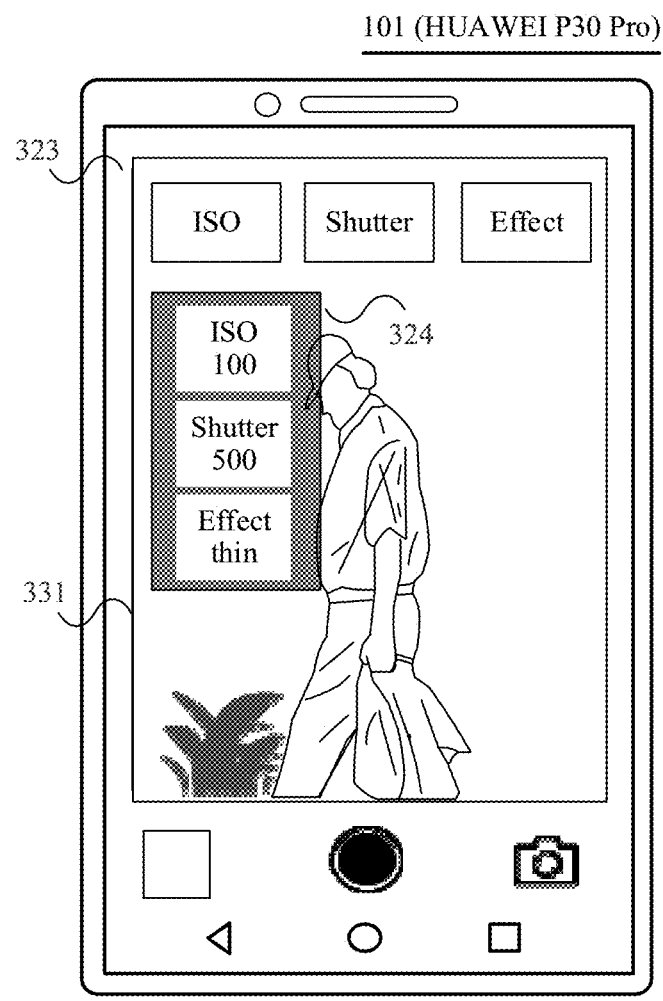

As shown in FIG. 4C, the viewfinder frame of the second user interface of the terminal 101 displays the image obtained by the terminal 101 by performing image processing on the image in the viewfinder frame of the second user interface based on the "thinning" parameter.

FIG. 4C is a diagram of a UI on which the camera app of the terminal 101 displays the second user interface of the terminal 101 and the image obtained by the terminal 101 by performing image processing on the image in the viewfinder frame of the second user interface based on the "thinning" parameter. FIG. 4C includes the second user interface 323, the photographing parameter list 324, and the image that is in the viewfinder frame 331 and that is obtained by the terminal 101 by performing image processing on the image in the viewfinder frame of the second user interface based on the "thinning" parameter.

The terminal 101 responds to the "thinning" effect triggered by the terminal 100. A value of a corresponding photographing parameter in the photographing parameter list 324 shown in FIG. 4C is displayed as a value, of the photographing parameter, that is obtained through modification by the user operation on the terminal 100.

Photographing parameters and photographing parameter values in the photographing parameter list 324 in FIG. 4C include: a photographing parameter ISO, where an ISO value is 100; a photographing parameter shutter, where a shutter value is 500; and a photographing parameter effect, where the effect is "thin".

Figure 4D:
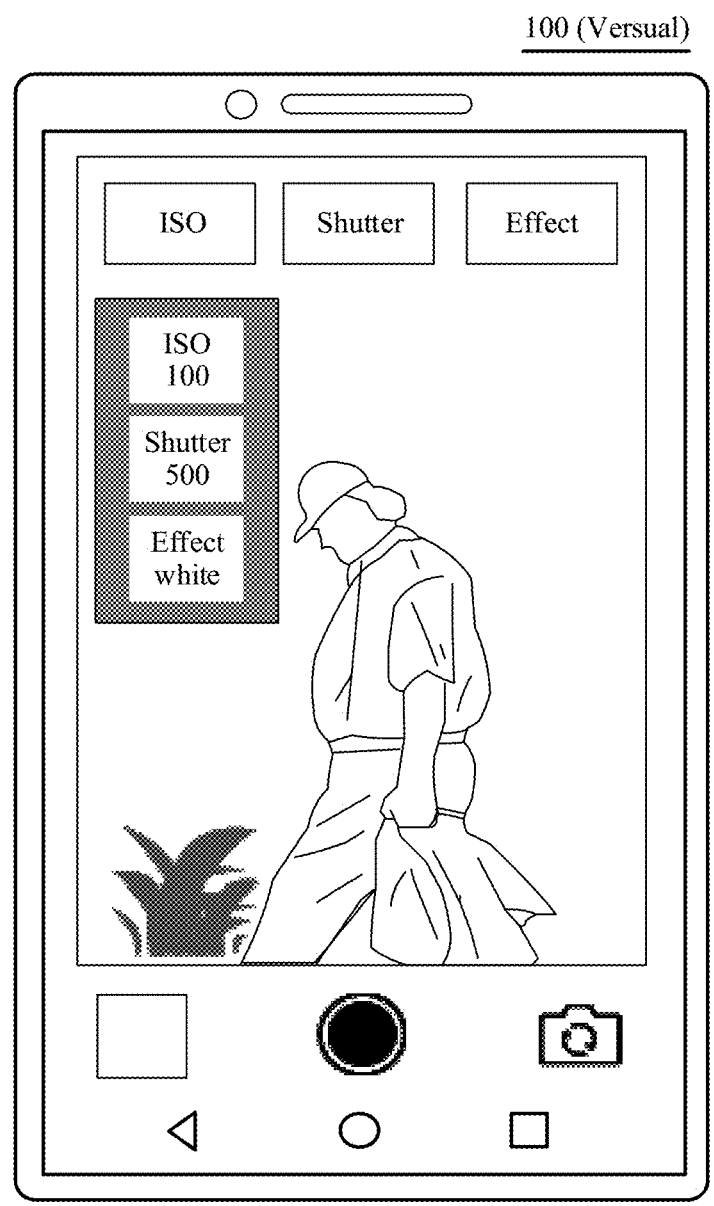
Figure 4E:
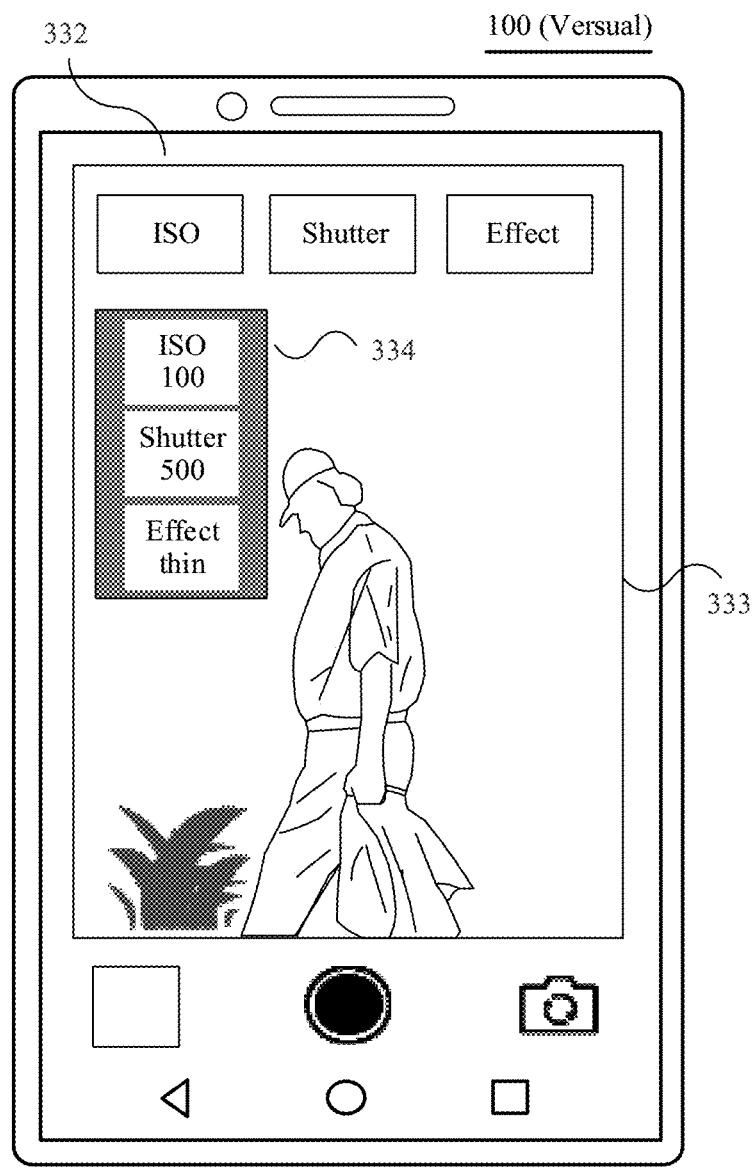

FIG. 4D to FIG. 4E are diagrams of UIs on which the camera app of the terminal 100 switches from displaying an image that is in the viewfinder frame of the second user interface and that is sent by the terminal 101 at a fixed interval (for example, 0.01 seconds) to displaying an image that is in the viewfinder frame of the second user interface, that is obtained by performing image processing on the image in the viewfinder frame of the second user interface based on the "thinning" parameter, and that is sent by the terminal 101 at a fixed interval (for example, 0.01 seconds).

FIG. 4D is a diagram of a UI on which the camera app of the terminal 100 displays the image that is in the viewfinder frame of the second user interface and that is sent by the terminal 101 at the fixed interval (for example, 0.01 seconds). For descriptions of the user interface, refer to the UI diagram FIG. 3L. Details are not described herein again.

FIG. 4E is a diagram of a UI on which the camera app of the terminal 100 displays the image that is in the viewfinder frame of the second user interface, that is obtained by performing image processing on the image in the viewfinder frame of the second user interface based on the "thinning" parameter, and that is sent by the terminal 101 at the fixed interval (for example, 0.01 seconds). FIG. 4E includes the user interface 332, the photographing parameter list 334, and a viewfinder image in the viewfinder frame 333 (the image obtained by performing image processing on the image in the viewfinder frame of the second user interface based on the "thinning" parameter).

A photographing parameter in the photographing parameter list 344 is a photographing parameter, of the camera app of the terminal 101, that is transmitted by the terminal 101 to the terminal 100 in response to the "thinning" control instruction triggered by the terminal 100.

Photographing parameters and photographing parameter values in the photographing parameter list 334 in FIG. 4C include: a photographing parameter ISO, where an ISO value is 100; a photographing parameter shutter, where a shutter value is 500; and a photographing parameter effect, where the effect is "thin".

As shown in FIG. 5A to FIG. 5D, the terminal 100 receives a second operation (for example, touching a capture control) of the user, and the terminal 100 generates a capture control instruction based on the second operation (for example, touching the capture control) of the user. The terminal 100 waits several seconds (for example, 3 seconds) and then sends the capture control instruction to the terminal 101. The terminal 101 receives and responds to the capture control instruction. The camera app of the terminal 101 displays a captured image in a first area, and stores the captured image to the album of the terminal 101, where the first area is used to display a thumbnail of the last image captured by a second camera app. The terminal 101 sends the captured image to the terminal 100. In addition, the terminal 100 displays the captured image in a second area, and stores the captured image to the album of the terminal 100, where the second area is used to display a thumbnail of the last image captured by a first camera app.

Figure 5A:
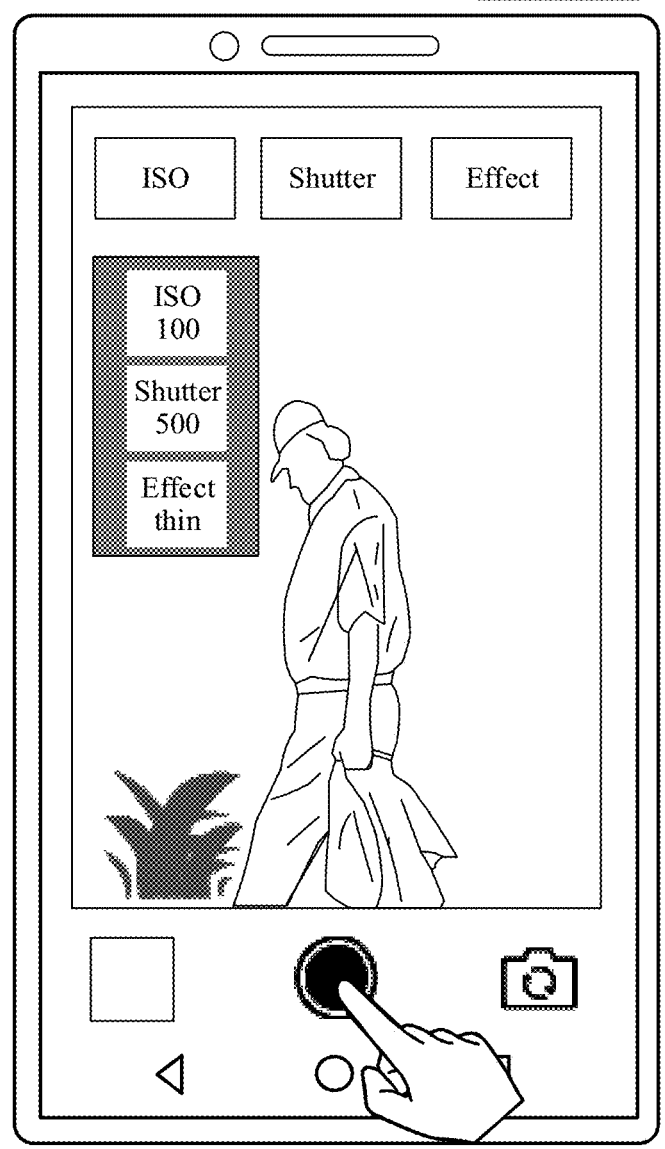
FIG. 5A to FIG. 5D are schematic diagrams of a group of UIs according to Embodiment 1.

As shown in FIG. 5A, the capture control of the terminal 100 may receive a user operation (for example, tapping). The terminal 100 generates a capture control instruction based on the user operation. The terminal 100 waits several seconds (for example, 3 seconds), and then the terminal 100 transmits the capture control instruction to the terminal 101. In this way, the user of the terminal 100 can have time to place the terminal 100, operated in hand by the user of the terminal 100, at a location that does not affect photographing. In addition, the second user interface of the terminal 101 displays prompt information. The prompt information is used to notify the user of the terminal 101 that the user of the terminal 100 has triggered the capture control instruction and the terminal 101 is to start capturing 3 seconds later.

Figure 5B:
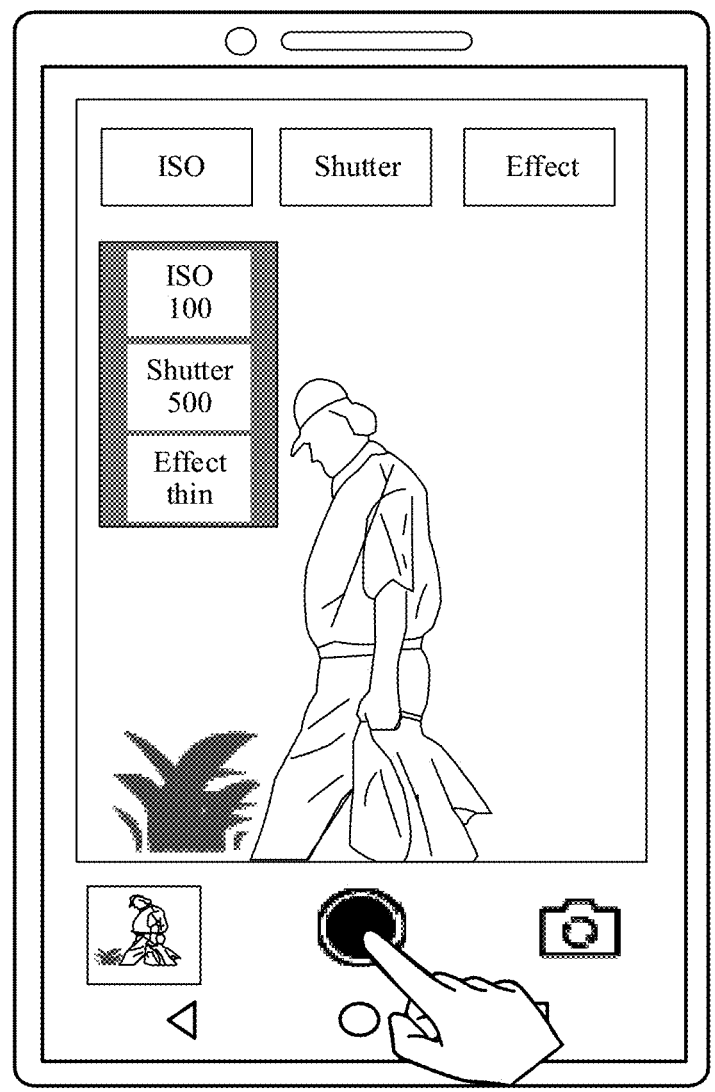

As shown in FIG. 5B, the terminal 101 receives and responds to the capture control instruction, and the camera app of the terminal 101 displays, in a first area 335, a captured viewfinder image in the viewfinder frame of the second user interface of the terminal 101, and stores the captured viewfinder image in the viewfinder frame of the second user interface of the terminal 101 to the album of the terminal 101 in a picture format, where the first area 335 is used to display a thumbnail of the last image captured by the camera app of the terminal 101.

The terminal 101 sends the captured viewfinder image in the viewfinder frame of the second user interface of the terminal 101 to the terminal 100. In addition, the terminal 100 displays, in a second area, the captured viewfinder image in the viewfinder frame of the second user interface of the terminal 101, and stores the captured viewfinder image in the viewfinder frame of the second user interface of the terminal 101 to the album of the terminal 100 in a picture format, where the second area is used to display a thumbnail of the last image captured by the camera app of the terminal 100.

The terminal 100 may receive a user operation (for example, tapping) acting on the gallery application icon 312. In response to the operation, the terminal 100 may display a gallery user interface 336 shown in FIG. 5C.

Figure 5C:
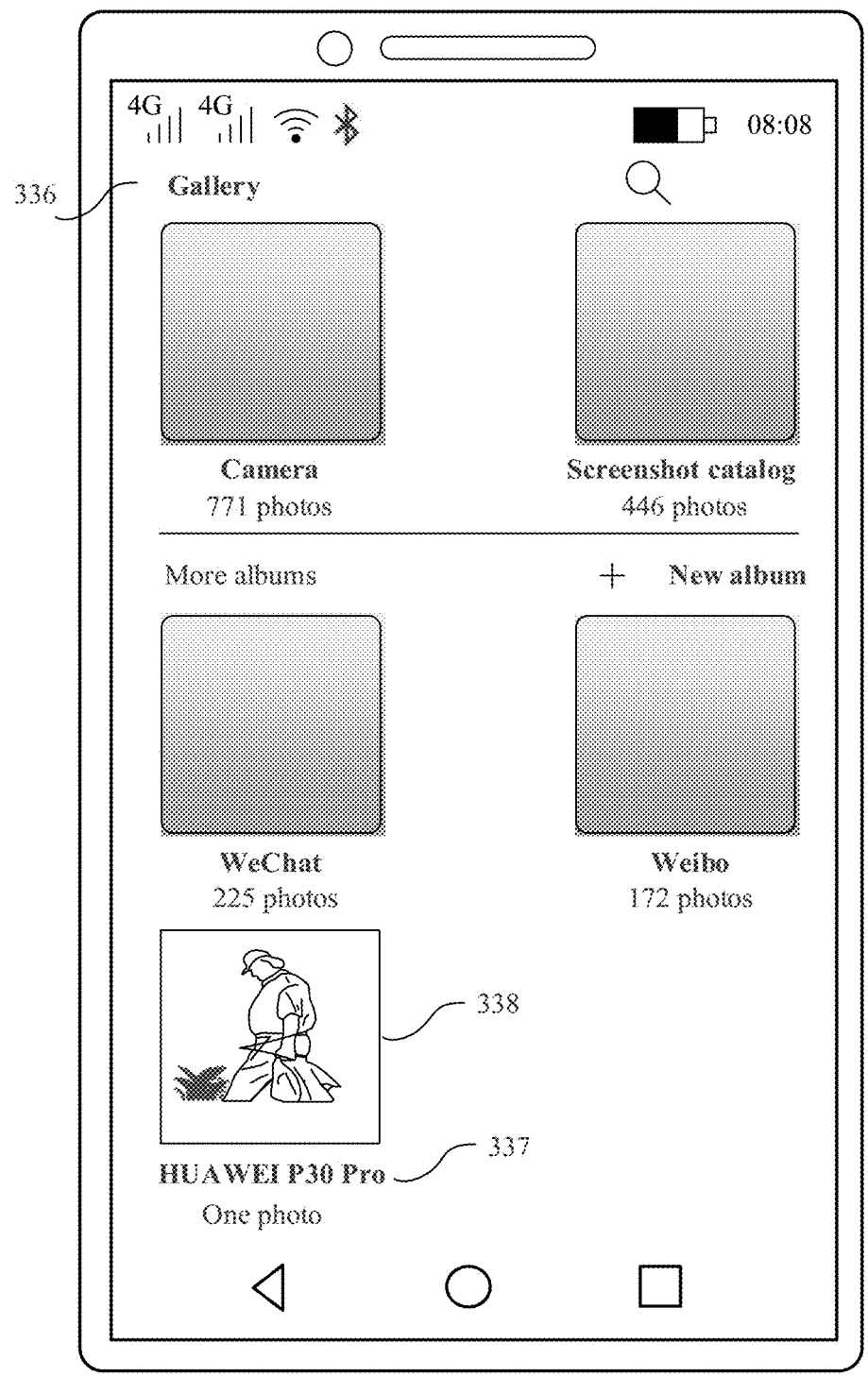

As shown in FIG. 5C, the gallery user interface 336 includes one or more album options (for example, a camera album, a screenshot catalog album, a WeChat album, a Weibo album, and a HUAWEI P30 Pro album 337). Under each album option, a name of the album and a quantity of photos and/or videos in the album are displayed. Each album includes a thumbnail (for example, a thumbnail 338) of one or more pictures. For example, the camera album includes 771 photos, the screenshot catalog album includes 446 photos, the WeChat album includes 225 photos, the Weibo album includes 172 photos, and the HUAWEI P30 Pro album 337 includes one photo. The gallery user interface 336 further includes a new-album control. The new-album control may be configured to trigger creation of a new album on the gallery user interface 336.

A name of the HUAWEI P30 Pro album is the device name of the terminal 101. After the terminal 100 is connected to the terminal 101, an image captured by the terminal 101 under the control of the terminal 100 is stored in the album of the terminal 100. A name of the album, of the terminal 100, in which the captured image is stored is the device name of the terminal 101.

The terminal 100 may receive a user operation (for example, tapping) acting on the thumbnail 338. In response to the operation, the terminal 100 may display a picture display interface 339 shown in FIG. 5D.

Figure 5D:
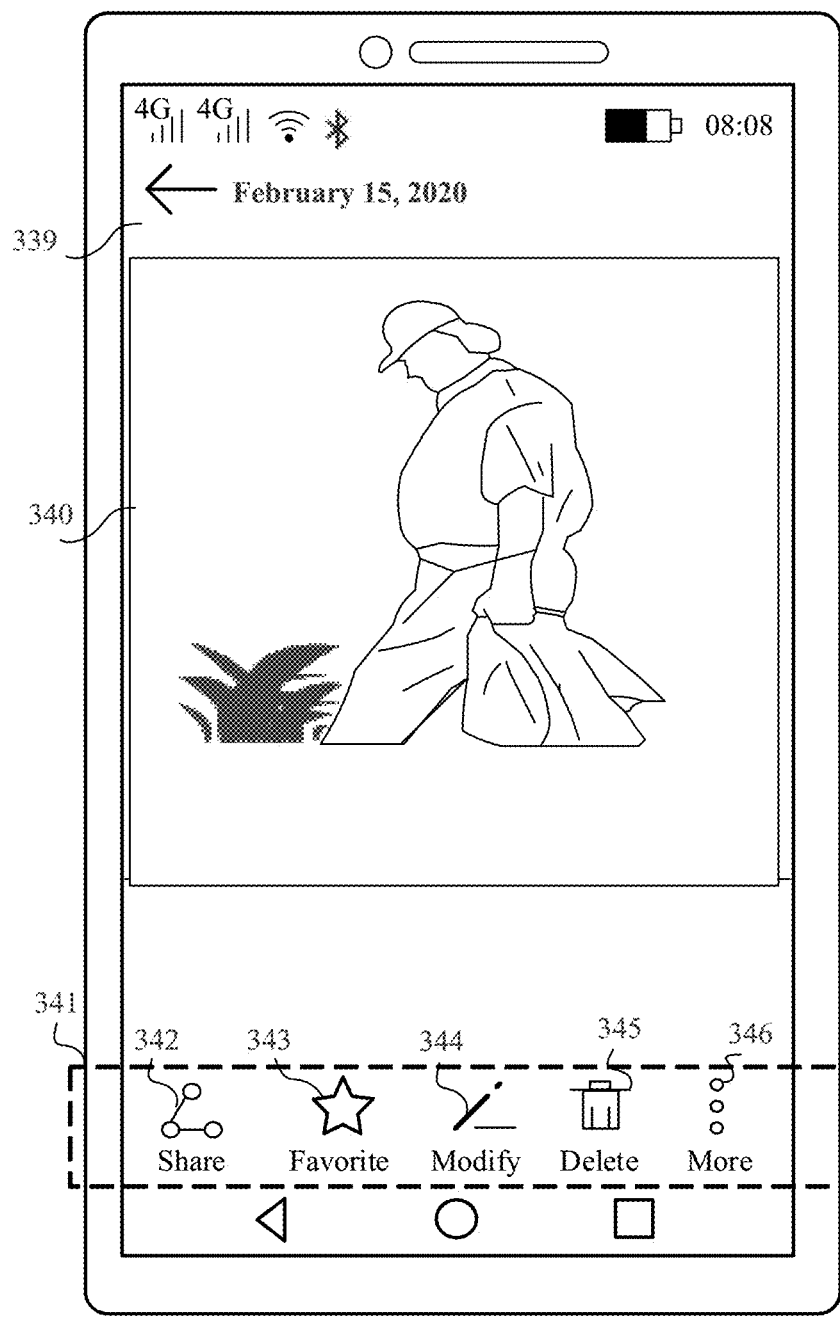

As shown in FIG. 5D, a title of the picture display interface 339 may be "Feb. 15, 2020." The picture display interface 339 displays and includes a picture 340 and a menu 341. The menu 341 includes a share button 342, a favorites button 343, an edit button 344, a delete button 345, and a more button 346. The share button 342 may be configured to trigger opening of a file sharing interface. The favorites button 343 may be configured to trigger adding of the picture 340 to a picture favorites folder. The edit button 344 may be configured to trigger an editing function, for example, rotation, cropping, adding a filter, or blurting, on the picture 340. The delete button 345 may be configured to trigger deletion of the picture 340. The more button 346 may be configured to trigger enabling of more functions related to the picture 340.

In some embodiments, the menu 341 is optional. The menu 341 may be hidden in the picture display interface 339. For example, the user may tap the picture 340 to hide the menu 341, and tap the picture 340 again to show the menu 341. This is not limited in this application.

When the terminal 100 controls the terminal 101 to perform photographing, the terminal 100 may receive a user operation, and the terminal 101 may also receive a user operation. An operation conflict may occur between the user operation received by the terminal 100 and the user operation received by the terminal 101. The operation conflict may be a conflict between same operations. For example, the terminal 100 receives an operation used to adjust a shutter speed, and the terminal 101 also receives an operation used to adjust a shutter speed. In this case, a device whose received user operation is to be preferentially responded to needs to be determined. Alternatively, the operation conflict may be a conflict between different operations. For example, the terminal 100 receives an operation used to adjust a focal length, and the terminal 101 receives an operation used to capture an image. In this case, a device whose received user operation is to be responded to also needs to be determined. The operation conflict may be resolved in any one of the following four manners.

Manner 1: time priorities. Within a preset time interval (for example, 0.2 seconds), a time at which the terminal 100 receives a user operation is earlier than a time at which the terminal 101 receives a user operation. In this case, the terminal 100 responds to the user operation, and the terminal 101 no longer responds to the user operation. That is, a priority of a first operation is higher than that of a second operation.

Manner 2: user priorities. Within a preset time interval (for example, 0.2 seconds), the terminal 100 receives a user operation, where the terminal 100 is a controlling entity; and the terminal 101 receives a user operation, where the terminal 101 is a controlled entity. In this case, the terminal 100 responds to the user operation, and the terminal 101 no longer responds to the user operation. That is, an operation priority of the controlling entity is higher than that of the controlled entity.

In some embodiments, whether a controlling entity or a controlled entity has a higher priority may be set. This is not limited herein in this application.

Manner 3: operation priorities. Within a preset time interval (for example, 0.2 seconds), the terminal 100 receives a user operation (for example, adjusting a focal length), and the terminal 101 receives a user operation (for example, touching a capture button). In this case, the terminal 101 responds to the user operation (for example, touching the capture button). That is, a priority of the capture operation is higher than that of the focal length adjustment operation. For example, a relationship between operation priorities is as follows: a priority of a capture action>a priority of a zoom action, a priority of a focusing action>the priority of the zoom action, the priority of the capture action>the priority of the focusing action, and the priority of the capture action>a priority of an effect adjustment operation.

Manner 4: operation reasonableness. Within a preset time interval (for example, 0.2 seconds), the terminal 100 first receives a user operation (adjusting a focal length to 2.0×), then the terminal 101 receives a user operation (adjusting a focal length to 1.0), and the terminal 100 continues to receive a user operation (adjusting the focal length to 3.0). In this scenario, operation intentions of the controlling entity and the controlled entity conflict. The controlling entity 100 expects the focal length to be increased: from 2.0 to 3.0. In a process of increasing the focal length by the controlling entity 100, the operation of decreasing the focal length is input to the controlled entity. In this case, the operation of adjusting the focal length to 1.0 needs to be discarded. That is, the operation received by the terminal 101 is discarded.

It should be noted that the foregoing four manners of resolving an operation conflict are merely used to describe this application, and should not be construed as a limitation.

It should be noted that the foregoing preset time interval (for example, 0.2 seconds) is merely used to describe this application, and should not be construed as a limitation. After photographing is completed, the terminal 100 may be disconnected from the terminal 101 in any one of the following three manners.

Manner 1: If either the terminal 100 or the terminal 101 exits a camera app, the terminal 100 is disconnected from the terminal 101.

Manner 2: If a wireless communication function, for example, a Bluetooth function or Wi-Fi peer-to-peer, is disabled on either the terminal 100 or the terminal 101, the terminal 100 is disconnected from the terminal 101.

Manner 3: If a device discovery and connection function is disabled on a settings interface of a user interface of the camera app of either the terminal 100 or the terminal 101, the terminal 100 is disconnected from the terminal 101. The manner 3 is similar to the method for searching for and discovering a nearby device. Details are not described herein again.

It should be noted that the foregoing three manners are merely used to describe this application, and should not be construed as a limitation.

Based on the human-computer interaction in Embodiment 1, a method procedure in Embodiment 1 of this application is described.

Figure 6A:
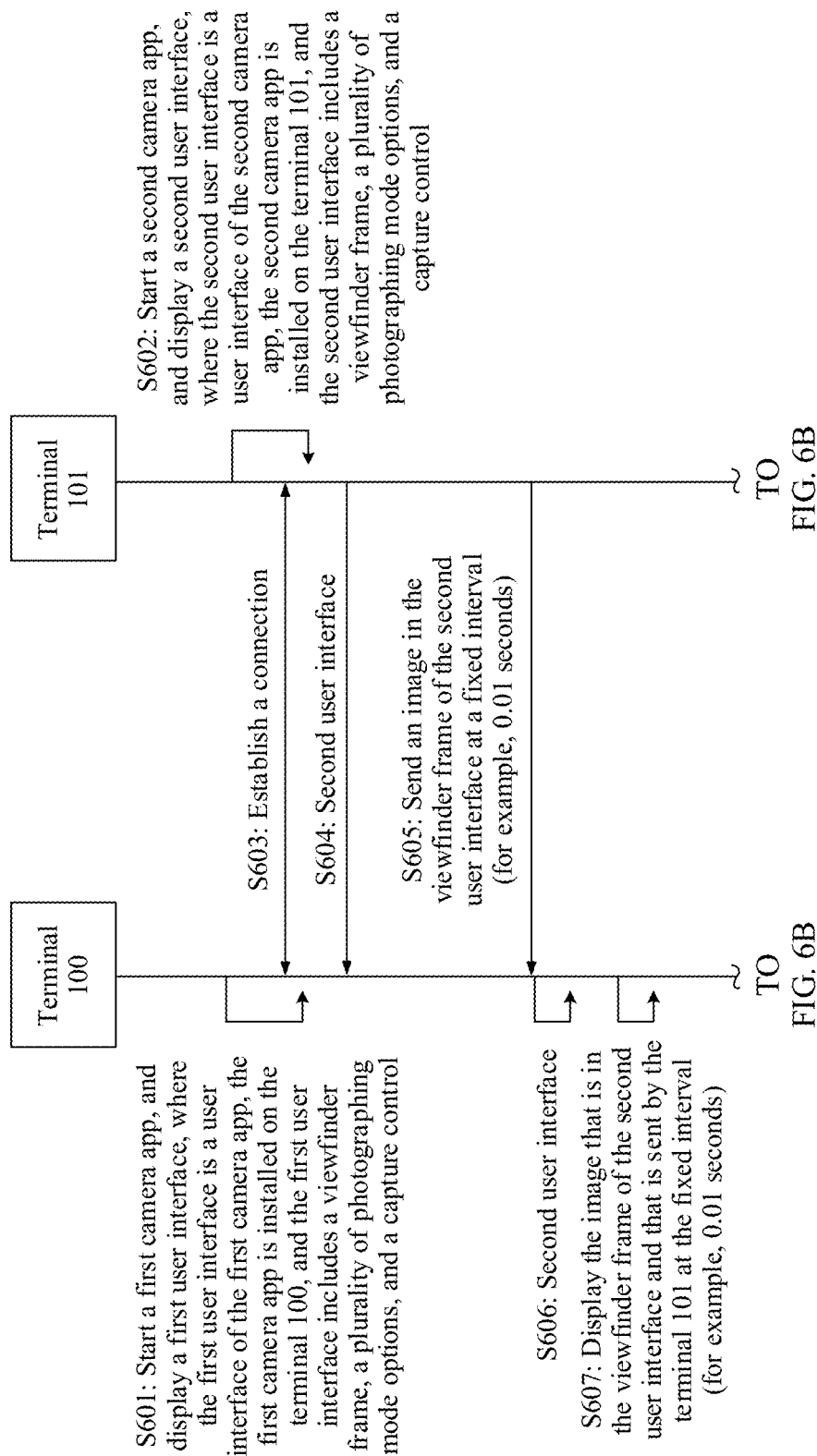
FIG. 6A, FIG. 6B, and FIG. 6C are a flowchart of a method according to Embodiment 1 of this application.
Figure 6B:
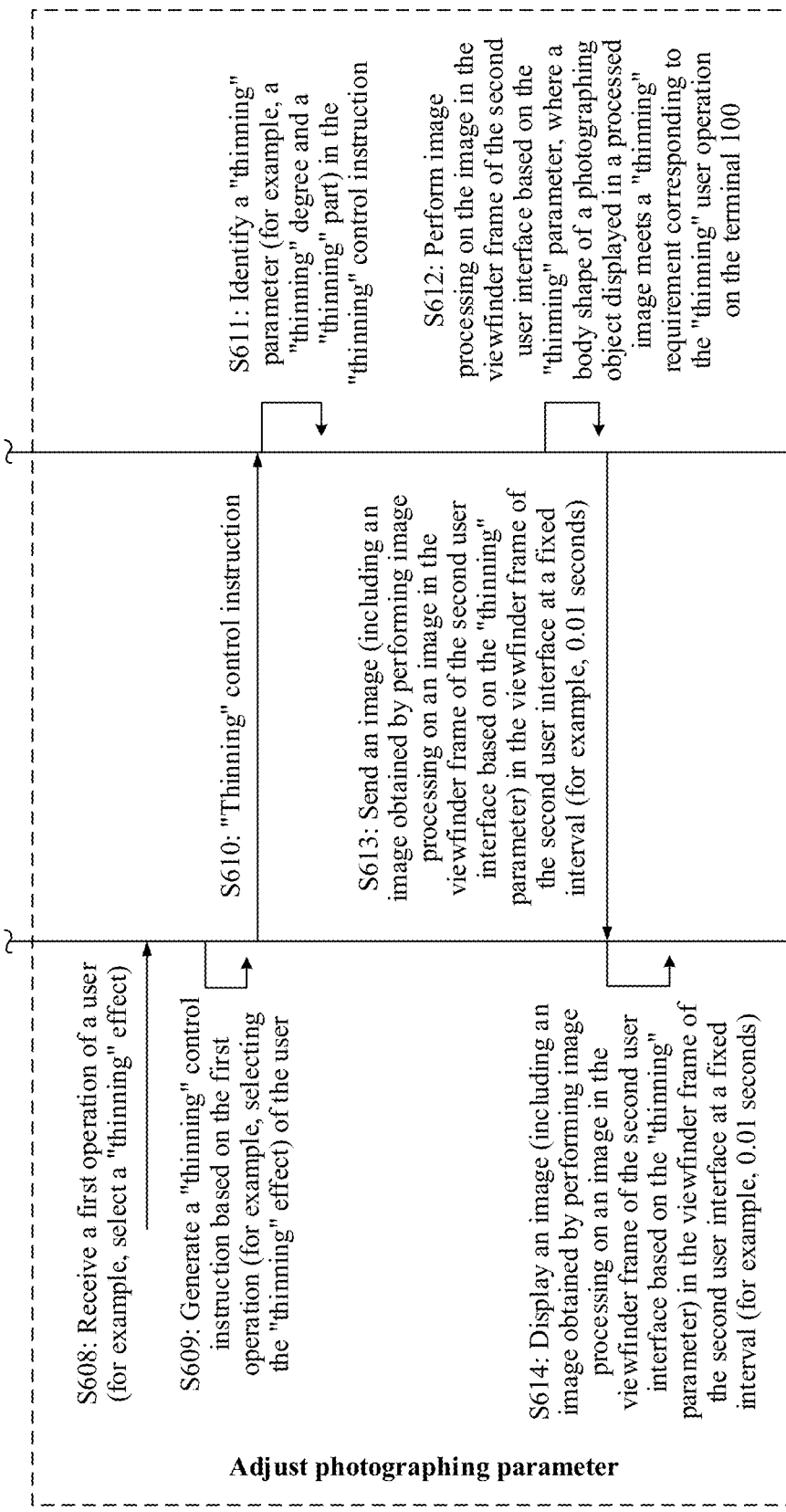
Figure 6C:
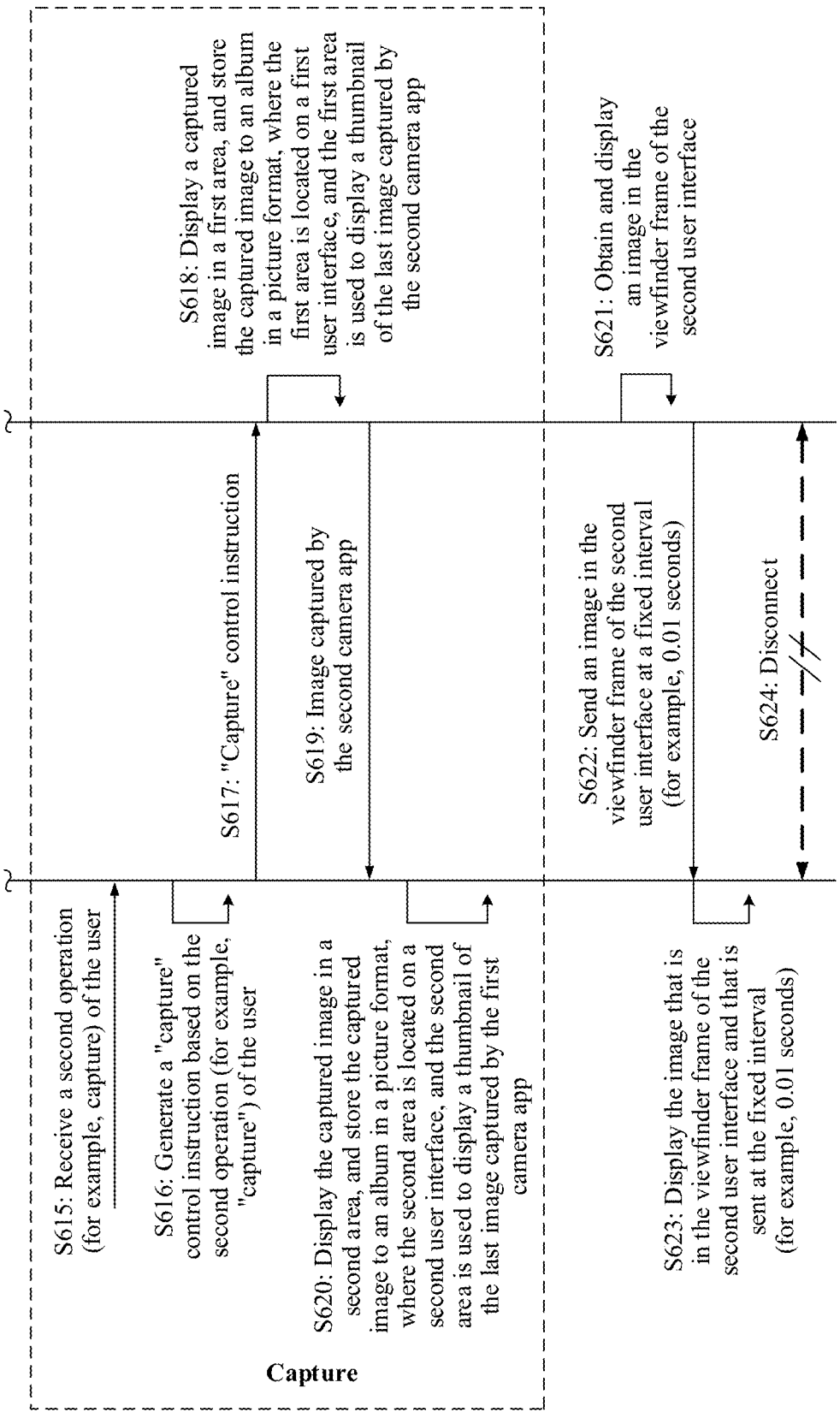

FIG. 6A, FIG. 6B, and FIG. 6C show a procedure of a data sharing and instruction operation control method provided in Embodiment 1. Devices included in the method flowchart include the terminal 100 and the terminal 101.

As shown in FIG. 6A, FIG. 6B, and FIG. 6C, the method includes the following steps.

S601: The terminal 100 starts a first camera app, and displays a first user interface, where the first user interface is a user interface of the first camera app, the first camera app is installed on the terminal 100, and the first user interface includes a viewfinder frame, a plurality of photographing mode options, and a capture control.

The viewfinder frame of the first user interface displays a viewfinder image obtained by the first camera app.

The plurality of photographing mode options of the first user interface include a flash control, an effect control, and a settings control.

S602: The terminal 101 starts a second camera app, and displays a second user interface, where the second user interface is a user interface of the second camera app, the second camera app is installed on the terminal 101, and the second user interface includes a viewfinder frame, a plurality of photographing mode options, and a capture control.

The viewfinder frame of the second user interface displays a viewfinder image obtained by the second camera app.

The plurality of photographing mode options of the second user interface include an ISO control 325, a shutter control 326, and an effect control 327.

S603: The terminal 100 establishes a connection to the terminal 101.

The terminal 100 initiates a connection establishment request to the terminal 101, and the second user interface of the terminal 101 displays a prompt box 318. The prompt box 318 is used to notify a user of the terminal 101 that the terminal 100 has triggered the connection establishment request.

The terminal 101 receives a connection confirmation operation of the user, and the second user interface of the terminal 101 displays a prompt box 321. The prompt box 321 is used to prompt the user of the terminal 101 to enter a verification code.

The terminal 100 receives a verification code entered by the user of the terminal 101, and the terminal 100 verifies that the verification code entered by the user of the terminal 101 is the same as a verification code preset on the terminal 100. In this case, the terminal 100 establishes a connection to the terminal 101.

Specifically, for a method and steps for establishing a connection by the terminal 100 to the terminal 101, refer to the embodiments shown in FIG. 3B to FIG. 3I. Details are not described herein again.

S604: The terminal 101 sends the second user interface to the terminal 100.

In some embodiments, the terminal 101 needs to perform the operation of transmitting the second user interface to the terminal 100 only once.

S605: The terminal 101 sends an image in the viewfinder frame of the second user interface to the terminal 100 at a fixed interval (for example, 0.01 seconds).

The second camera app of the terminal 101 obtains a viewfinder image in the viewfinder frame of the second interface at a fixed interval (for example, 0.01 seconds), and displays the viewfinder image in the viewfinder frame of the second interface.

The terminal 101 sends, to the terminal 100, the viewfinder image that is in the viewfinder frame of the second interface and that is obtained by the second camera app at the fixed interval (for example, 0.01 seconds).

S606: The terminal 100 displays the second user interface.

The terminal 100 receives and displays the second user interface. To be specific, the first camera app of the terminal 100 displays the second user interface.

In some embodiments, a display of the terminal 100 and a display of the terminal 101 have different sizes. Therefore, after the terminal 101 sends the second user interface of the terminal 101 to the terminal 100, the second user interface of the terminal 101 that is displayed in the first camera app of the terminal 100 is zoomed in or zoomed out in proportion. This is not limited herein in this application.

In some embodiments, the terminal 100 receives and displays a photographing parameter and a photographing parameter value that are in the photographing parameter list 324 and that are sent by the terminal 101. This is not limited herein in this application.

S607: The terminal 100 responds to the image that is in the viewfinder frame of the second user interface and that is sent by the terminal 101 at the fixed interval (for example, seconds), and the terminal 100 displays the image that is in the viewfinder frame of the second user interface and that is sent by the terminal 101 at the fixed interval (for example, seconds).

The terminal 100 receives the image that is in the viewfinder frame of the second user interface and that is sent by the terminal 101 at the fixed interval (for example, 0.01 seconds), and displays the image in the viewfinder frame of the second user interface of the terminal 100.

S608: The second user interface of the terminal 100 receives a first operation (for example, selecting a photographing parameter) of a user.

For example, the first operation may be: selecting a "thinning" effect.

The selecting the "thinning" effect may include selecting a "thinning" part, for example, thinning a face, thinning legs, thinning a belly, or thinning another part.

The selecting the "thinning" effect may further include selecting a "thinning" degree, for example, thinning a face by 30%, thinning legs by 20%, or thinning a belly by 50%.

In addition to selecting the "thinning" effect, a photographing parameter, for example, a zoom parameter, may alternatively be selected. This is not limited herein in this application.

S609: The terminal 100 generates a "thinning" control instruction based on the first operation (for example, selecting the "thinning" effect) of the user.

The "thinning" control instruction is an instruction, and the "thinning" control instruction may be used to trigger the terminal 101 to perform "thinning processing" on an image in the viewfinder frame. The "thinning" control instruction includes some "thinning" parameters (the thinning degree, the thinning part, and the like). In this way, the terminal 101 can perform image processing on the image in the viewfinder frame of the user interface of the terminal 101 based on the "thinning" parameters, and a body shape of a photographing object included in a processed image in the viewfinder frame of the user interface of the terminal 101 meets a body shape required or described by the "thinning" parameter.

For example, the "thinning" part selected by the user for the "thinning" effect is thinning the face, and the "thinning" degree selected by the user for the "thinning" effect is 30%. In this case, the "thinning" control instruction carries a "thinning" parameter, and the "thinning" parameter includes that the "thinning" part is the face and the "thinning" degree is 30%.

The terminal 101 can perform, based on the "thinning" parameter, image processing on the image in the viewfinder frame of the user interface of the terminal 101, and perform a thinning operation on the face of the photographing object included in the image in the viewfinder frame of the user interface of the terminal 101, where a thinning degree is that the face is 30% of that in the original image.

S610: The terminal 100 sends the "thinning" control instruction to the terminal 101.

S611: The terminal 101 identifies the "thinning" parameter in the "thinning" control instruction (for example, the "thinning" degree and the "thinning" part).

The terminal 101 receives the "thinning" control instruction sent by the terminal 100, and the terminal 101 identifies the "thinning" parameter in the "thinning" control instruction. The "thinning" parameter includes that the "thinning" part is the face and the "thinning" degree is 30%.

S612: The terminal 101 performs image processing on the image in the viewfinder frame of the second user interface based on the "thinning" parameter, where a body shape of a photographing object displayed in a processed image meets a "thinning" requirement corresponding to the "thinning" user operation on the terminal 100.

The terminal 101 can perform, based on the "thinning" parameter, image processing on the image in the viewfinder frame of the user interface of the terminal 101, and perform a thinning operation on the face of the photographing object included in the image in the viewfinder frame of the user interface of the terminal 101, where a thinning degree is that the face is 30% of that in the original image.

In some embodiments, the terminal 101 responds to the "thinning" control instruction, and a display result of a photographing parameter effect in the photographing parameter list 324 of the first camera app of the terminal 101 changes from original "white" to "thin".

S613: The terminal 101 sends an image (including an image obtained by performing image processing on an image in the viewfinder frame of the second user interface based on the "thinning" parameter) in the viewfinder frame of the second user interface to the terminal 100 at a fixed interval (for example, 0.01 seconds).

In some embodiments, the terminal 101 sends a photographing parameter of the second camera app to the terminal 100. This is not limited herein in this application.

S614: The terminal 100 displays the image (including the image obtained by performing image processing on the image in the viewfinder frame of the second user interface based on the "thinning" parameter) that is in the viewfinder frame of the second user interface and that is sent by the terminal 101 at the fixed interval (for example, 0.01 seconds).

The terminal 100 receives and displays, in the viewfinder frame of the second user interface of the terminal 100, the image (including the image obtained by performing image processing on the image in the viewfinder frame of the second user interface based on the "thinning" parameter) that is in the viewfinder frame of the second user interface and that is sent by the terminal 101 at the fixed interval (for example, 0.01 seconds).

In some embodiments, the terminal 100 receives the photographing parameter sent by the second camera app of the terminal 100, and the second user interface of the terminal 100 displays the photographing parameter sent by the second camera app of the terminal 100. This is not limited herein in this application.

S615: The terminal 100 receives a second operation (for example, touching a capture control) of the user.

S616: The terminal 100 generates a "capture" control instruction based on the second operation (for example, "capture") of the user.

S617: The terminal 100 sends the "capture" control instruction to the terminal 101. The capture control of the second user interface of the terminal 100 may receive a user operation (for example, tapping). In response to the user operation, the terminal 100 generates the "capture" control instruction based on the user operation, and the terminal 100 sends the "capture" control instruction to the terminal 101.

S618: The terminal 101 displays a captured image in a first area, and stores the captured image to an album in a picture format, where the first area is used to display a thumbnail of the last image captured by the second camera app.

The terminal 101 receives and responds to the "capture" control instruction sent by the terminal 100. The terminal 101 captures a viewfinder image in the viewfinder frame of the second user interface. The terminal 101 displays the captured image in the first area of the second user interface of the terminal 101, and stores the captured image to the album of the terminal 101 in a picture format. The first area is used to display the thumbnail of the last image captured by the second camera app.

S619: The terminal 101 sends the image captured by the second camera app to the terminal 100 in a picture format.

S620: The terminal 100 displays the captured image in a second area, and stores the image captured by the second camera app to an album in a picture format, where the second area is used to display a thumbnail of the last image captured by the second camera app.

The terminal 100 receives the image that is captured by the second camera app and that is sent by the terminal 100. The terminal 100 displays the captured image in the second area of the second user interface of the terminal 100, and stores the captured image to the album of the terminal 100. The second area is used to display the image that is captured by the second camera app and that is sent by the terminal 101 to the terminal 100.

S621: The terminal 101 obtains and displays an image in the viewfinder frame of the second user interface.

The second camera app of the terminal 101 obtains a viewfinder image in the viewfinder frame of the second interface at a fixed interval (for example, 0.01 seconds), and displays the viewfinder image in the viewfinder frame of the second user interface of the terminal 101.

S622: The terminal 101 sends an image in the viewfinder frame of the second user interface of the terminal 101 to the terminal 100 at a fixed interval (for example, 0.01 seconds).

S623: The terminal 100 displays the image that is in the viewfinder frame of the second user interface and that is sent by the terminal 101 at the fixed interval (for example, seconds).

The terminal 100 receives the image that is in the viewfinder frame of the second user interface of the terminal 101 and that is sent by the terminal 101 at the fixed interval (for example, 0.01 seconds), and the terminal 100 displays, in the viewfinder frame of the second user interface of the terminal 100, the image in viewfinder frame of the second user interface of the terminal 101.

S624: The terminal 100 is disconnected from the terminal 101.

After the terminal 100 is disconnected from the terminal 101, the terminal 100 displays the first user interface, where the first user interface is a user interface of the first camera app, and the viewfinder frame of the first user interface of the terminal 100 displays a viewfinder image of the terminal 100.

The terminal 101 displays the second user interface, where the second user interface is a user interface of the second camera app, and the viewfinder frame of the second user interface of the terminal 101 displays a viewfinder image of the terminal 101.

For a method for disconnecting the terminal 100 from the terminal 101, refer to any one of the three manners of disconnecting the terminal 100 from the terminal 101 that are described in the UI diagrams of Embodiment 1. Details are not described herein again.

After the terminal 100 establishes a connection to the terminal 101, the terminal 100 may display a viewfinder image of the terminal 101, and the terminal 100 may control photographing performed by the terminal 101, for example, how to perform photographing, for example, how to adjust an angle, or what filter or effect is to be enabled. According to this embodiment, two terminal devices can establish a connection simply by starting camera apps, without using any account or the Internet. The terminal 100 and the terminal 101 can quickly share real-time photographed images and perform operation control. This improves real-time performance of data transmission and facilitates interaction between people.

Embodiment 2

In Embodiment 2, a controlling entity may control a plurality of (for example, two) controlled entities to take photos. The controlling entity may be the terminal 100, and the controlled entities may be the terminal 101 and the terminal 102.

For ease of description of this embodiment, a user interface of a camera app of the terminal 100 is referred to as a first user interface, a user interface of a camera app of the terminal 101 is referred to as a second user interface, and a user interface of a camera app of the terminal 102 is referred to as a third user interface.

The terminal 100 searches for and connects to nearby devices: the terminal 101 and the terminal 102. The first user interface of the terminal 100 may display a user interface and a viewfinder image of a camera app of either the terminal 101 or the terminal 102. For example, the terminal 100 first establishes a connection to the terminal 101; the terminal 101 transmits the second user interface to the terminal 100, and transmits a viewfinder image in a viewfinder frame of the second user interface of the terminal 101 at a fixed interval (for example, 0.01 seconds); and the camera app of the terminal 100 receives and displays the second user interface and the viewfinder image in the viewfinder frame of the second user interface.

In addition, the terminal 100 may control, through switching, either the terminal 101 or the terminal 102 to perform photographing, to meet a requirement of a user for a plurality of photographing effects. For example, the terminal 100 controls the terminal 101 to use a "thinning" effect, and the terminal 100 controls the terminal 102 to perform photographing by using a window whose viewfinder frame size is "1:1".

The terminal 100 receives a first operation (for example, selecting a to-be-controlled device) of the user. The terminal 100 responds to the first operation (for example, selecting a to-be-controlled device) of the user. The terminal 100 switches a data transmission channel to a second data transmission channel that has been established to the terminal 102.

The terminal 100 receives a second operation (for example, choosing to use a window whose viewfinder frame aspect ratio is 1:1 for photographing) of the user. The terminal 100 generates a "1:1" capture control instruction based on the second operation (for example, choosing to use a window whose viewfinder frame aspect ratio is 1:1 for photographing) of the user. The terminal 100 transmits the "1:1" capture control instruction to the terminal 102. The terminal 102 receives and responds to the "1:1" capture control instruction. The terminal 102 identifies a photographing parameter (for example, the viewfinder frame aspect ratio is 1:1) in the "1:1" capture control instruction. The camera app of the terminal 102 adjusts a size of a viewfinder frame of the second user interface of the terminal 102 based on the photographing parameter, where a processed size of the viewfinder frame meets a requirement of the user of the terminal 100 for a size of a captured image. The terminal 102 sends an image in the viewfinder frame of the second user interface of the terminal 102 to the terminal 100. The camera app of the terminal 100 displays the image that is in the viewfinder frame of the second user interface and that is sent by the terminal 102.

The terminal 100 receives a third operation (for example, touching a capture control) of the user, and the terminal 100 generates a capture control instruction based on the third operation (for example, touching the capture control) of the user. The terminal 100 waits several seconds (for example, 3 seconds) and then sends the capture control instruction to the terminal 102. The terminal 102 receives and responds to the capture control instruction, and stores a captured image to an album of the terminal 102 in a picture format. The terminal 102 sends the captured image to the terminal 100. The terminal 102 stores the captured image to an album in a picture format.

In some possible embodiments, the terminal 102 may alternatively receive a second operation (for example, touching a capture control) of a user, and the terminal 102 stores a captured image to the album of the terminal 102 in a picture format. The terminal 102 sends the captured image to the terminal 100. The terminal 100 receives the captured image and stores the captured image to the album of the terminal 100 in a picture format. This is not limited herein in this application.

It can be understood that the terminal 100 is configured only to display a user interface and a viewfinder image of the terminal 101 or the terminal 102, and control the terminal 101 or the terminal 102 to perform photographing, and the terminal 100 does not perform photographing behavior. A camera hardware device of the terminal 100 may not be started, to reduce consumption. This is not limited herein in this application.

First, human-computer interaction included in Embodiment 2 is described.

For specific descriptions of displaying, by the camera app of the terminal 100, a user interface and a viewfinder image of the camera app of the terminal 100, refer to FIG. 3B in Embodiment 1. Details are not described herein again.

For specific descriptions of displaying, by the camera app of the terminal 101, a user interface and a viewfinder image of the camera app of the terminal 101, refer to FIG. 3J in Embodiment 1. Details are not described herein again.

Figure 7A:
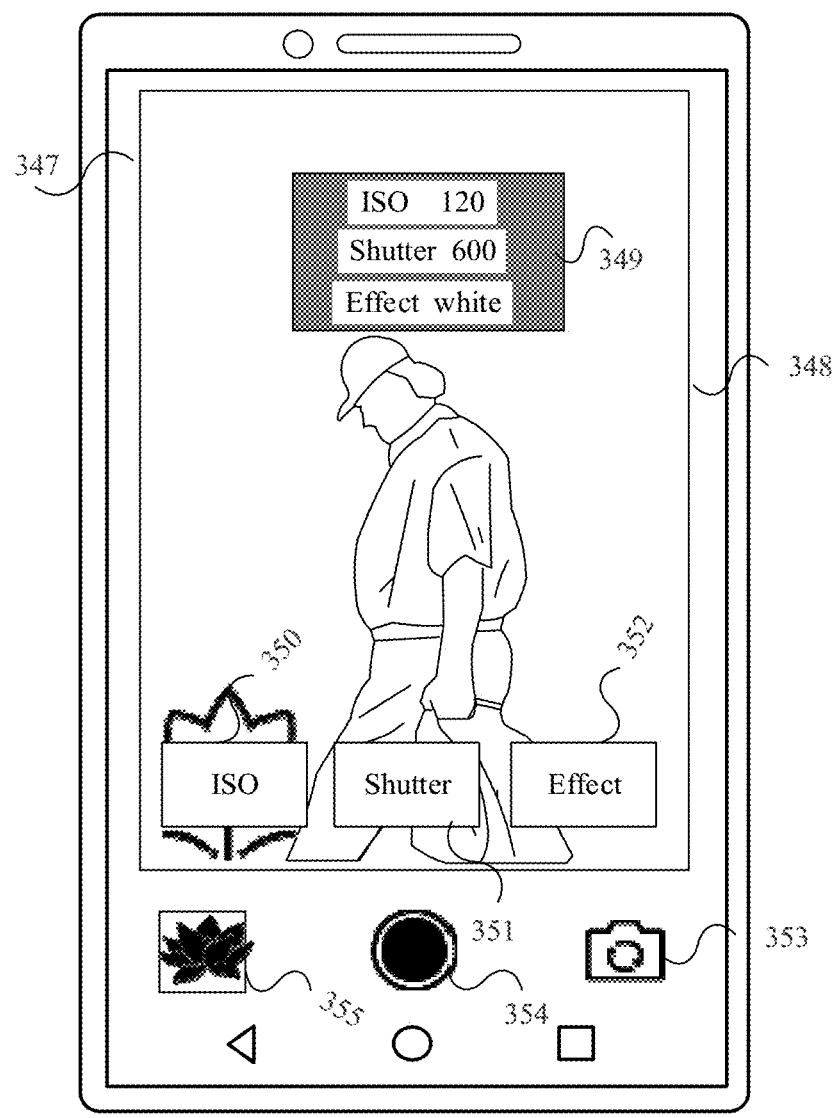
FIG. 7A to FIG. 7G are schematic diagrams of a group of UIs according to Embodiment 2 of this application.

FIG. 7A is a diagram of a UI on which the camera app of the terminal 102 displays a user interface and a viewfinder image of the camera app of the terminal 102. A camera user interface 347 shown in FIG. 7A may also be referred to as a third user interface 347. The third user interface 347 includes a viewfinder frame 348, a plurality of photographing mode options, an area 355 displaying a thumbnail of the last captured picture, a capture control 354, and a photographing direction reversing control 353.

The plurality of photographing mode options include an ISO control 350, a shutter control 351, and an effect control 352.

The viewfinder frame 348 displays a viewfinder image of the camera app of the terminal 102. It can be understood that the camera app of the terminal 102 obtains a current viewfinder image of the camera app of the terminal 102 at a fixed interval (for example, 0.01 seconds), and displays the viewfinder image in the viewfinder frame 348.

In some embodiments, as shown in FIG. 7A, the third user interface 347 further includes a photographing parameter list 349 of the camera app of the terminal 102. The photographing parameter list 349 includes: a photographing parameter ISO, where an ISO value is 120; a photographing parameter shutter, where a shutter value is 600; and a photographing parameter effect, where the effect is whitening (White). This is not limited herein in this application.

It can be understood that, if the terminal 102 receives a user operation of modifying a photographing parameter, a value of the corresponding photographing parameter in the photographing parameter list 349 is displayed as a value, of the photographing parameter, that is obtained through modification by the user operation.

First, the terminal 100 establishes connections to the terminal 101 and the terminal 102.

In this embodiment, for a method for searching for and discovering, by the terminal 100, the terminal 101 and the terminal 102, and establishing connections to the terminal 101 and the terminal 102, refer to Embodiment 1. Details are not described herein again.

If the terminal 100 establishes a first connection to the terminal 101, the terminal 100 establishes a first data transmission channel to the terminal 101, and the terminal 101 transmits the second user interface to the terminal 100, and transmits a viewfinder image on the second user interface of the terminal 101 to the terminal 100 at a fixed interval (for example, seconds). If the terminal 100 establishes a second connection to the terminal 102, the terminal 100 establishes a second data transmission channel to the terminal 102, and the terminal 102 transmits the third user interface to the terminal 100, and transmits a viewfinder image on the third user interface of the terminal 101 to the terminal 100 at a fixed interval (for example, 0.01 seconds).

The terminal 100 establishes the first connection to the terminal 101, and the terminal 101 transmits the second user interface to the terminal 100, and transmits a viewfinder image on the second user interface of the terminal 101 to the terminal 100 at the fixed interval (for example, 0.01 seconds).

The terminal 100 may control the terminal 101 to use a "thinning" effect. For details, refer to the UI diagrams FIG. 4A to FIG. 4E in Embodiment 1. Details are not described herein again.

The terminal 100 may control, through switching, the camera app of the terminal 100 to display a user interface and a viewfinder image of either the terminal 101 or the terminal 102.

Figure 7B:
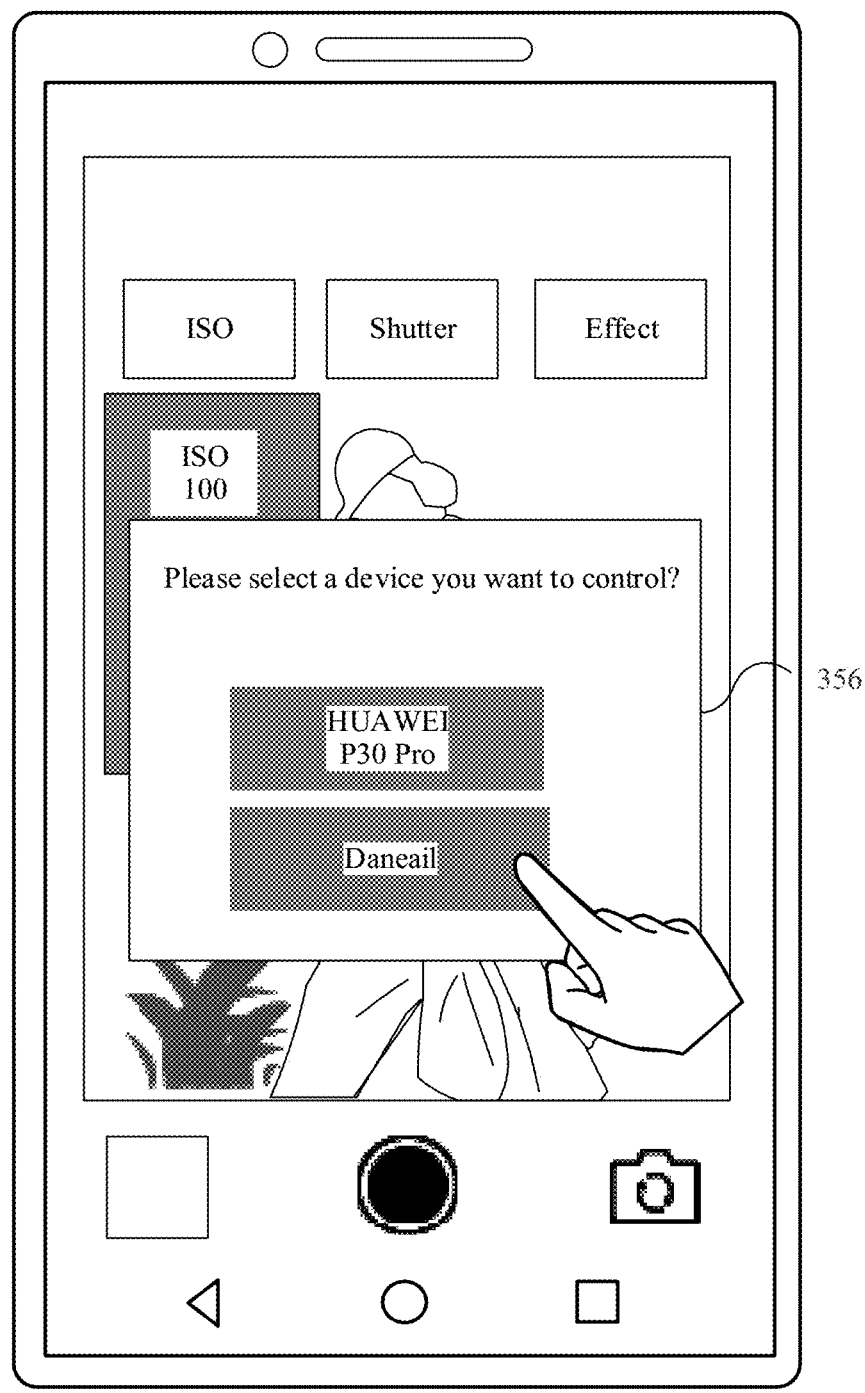
Figure 7C:
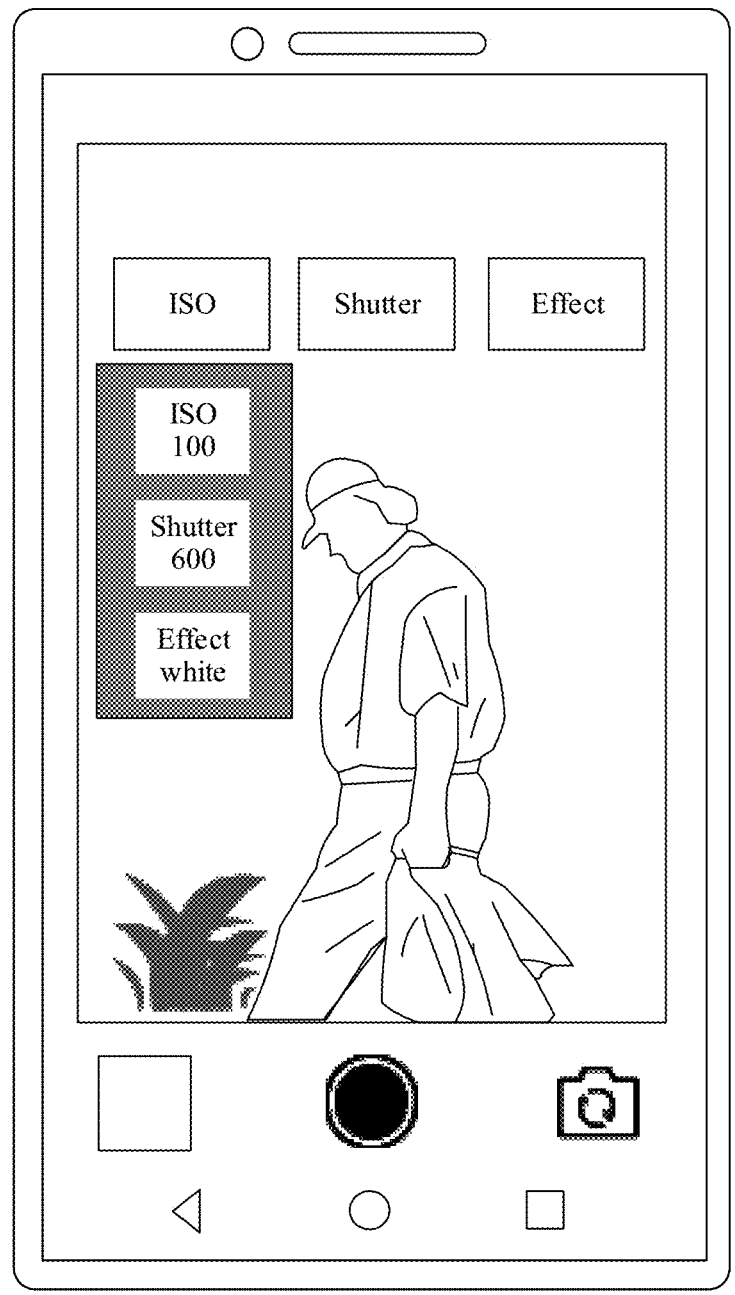
Figure 7D:
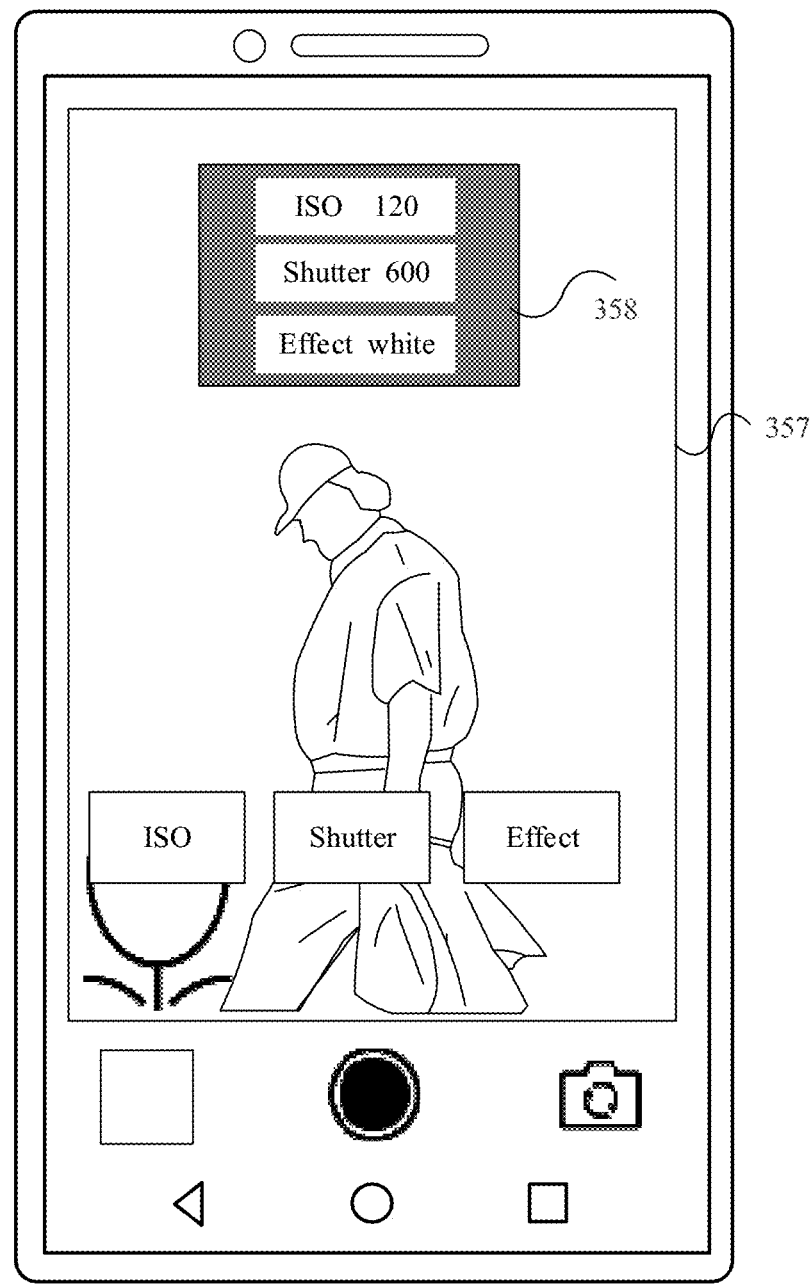

As shown in FIG. 7B to FIG. 7D, the terminal 100 receives a first operation (for example, selecting a to-be-controlled device) of a user, the terminal 100 responds to the first operation (for example, selecting a to-be-controlled device) of the user, and the terminal 100 switches from the first data transmission channel established to the terminal 101 to the second data transmission channel established to the terminal 102. The camera app of the terminal 100 displays the third user interface of the terminal 102 and a viewfinder image in a viewfinder frame of the third user interface of the terminal 102.

In response to the first operation (for example, selecting a to-be-controlled device) of the user, the first user interface of the camera app of the terminal 100 displays a selection prompt box 356 shown in FIG. 7B. The prompt box 356 includes prompt information: "Select a device that you want to control." The prompt box 356 further includes device name controls "HUAWEI P30 Pro" and "Danneil" of devices that have established connections to the terminal 100. The device name control "HUAWEI P30 Pro" or the device name control "Danneil" may receive a user operation (for example, tapping), to establish a data transmission channel to a device corresponding to a device name in the prompt box 356. For example, the device name control "HUAWEI P30 Pro" receives a user operation (for example, tapping), and the terminal 100 may establish a data transmission channel to the terminal 101 (device name: "HUAWEI P30 Pro"); or the device name control "Danneil" receives a user operation (for example, tapping), and the terminal 100 may establish a data transmission channel to the terminal 102 (device name: "Danneil"). For example, as shown in FIG. 7B, the device control name "Danneil" receives a user operation (for example, tapping), and in response to the operation, the terminal 100 (device name: "Versual") establishes a data transmission channel to the terminal 102 (device name: "Danneil").

As shown in FIG. 7C and FIG. 7D, a user interface of the camera app of the terminal 100 switches from displaying a user interface and a viewfinder image of the camera app of the terminal 101 to displaying a user interface and a viewfinder image of the camera app of the terminal 102.

The terminal 100 (device name: "Versual") establishes a data transmission channel to the terminal 102 (device name: "Danneil"). The terminal 102 transmits the third user interface to the terminal 100, and transmits a viewfinder image on a viewfinder screen of the third user interface of the terminal 102 to the terminal 100 at a fixed interval (for example, 0.01 seconds). The camera app of the terminal 100 receives and displays the third user interface and the viewfinder image that is on the viewfinder screen of the third user interface of the terminal 102 and that is transmitted by the terminal 102 to the terminal 100 at a fixed interval (for example, 0.01 seconds).

In FIG. 7C, the camera app of the terminal 100 displays the user interface and the viewfinder image of the camera app of the terminal 101. For descriptions of FIG. 7C, refer to the UI diagram FIG. 3L. Details are not described herein again.

In FIG. 7D, the camera app of the terminal 100 displays the third user interface of the camera app of the terminal 102 and the viewfinder image that is on the viewfinder screen of the third user interface of the terminal 102 and that is transmitted by the terminal 102 to the terminal 100 at the fixed interval (for example, 0.01 seconds). FIG. 7D includes a user interface 357, a viewfinder frame 358, a photographing parameter list 359, and a viewfinder image in the viewfinder frame 358.

The user interface 357 is the third user interface transmitted by the terminal 102 to the terminal 100. For descriptions of the user interface 357, refer to the descriptions of the third user interface 347 in the embodiment of the UI diagram FIG. 7A. Details are not described herein again.

The viewfinder image in the viewfinder frame 358 is the viewfinder image that is in the viewfinder frame of the third user interface of the terminal 102 and that is sent by the terminal 102 to the terminal 100 at the fixed interval (for example, 0.01 seconds).

A photographing parameter in the photographing parameter list 359 is a photographing parameter that is in a photographing parameter list of the camera app of the terminal 102 and that is transmitted by the terminal 102 to the terminal 100. For details, refer to the descriptions of the photographing parameter list 349 of the camera app of the terminal 102 in the embodiment of the UI diagram FIG. 7A. Details are not described herein again.

In some embodiments, a display of the terminal 100 and a display of the terminal 102 have different sizes. Therefore, after the terminal 102 sends the third user interface of the terminal 102 to the terminal 100, the third user interface of the terminal 102 that is displayed on the terminal 100 is zoomed in or zoomed out in proportion. This is not limited herein in this application.

In some embodiments, the terminal 100 and the terminal 102 may not be terminal devices of a same model. Therefore, shapes and display locations of the photographing parameter list 349 and the photographing parameter list 359 may be different. The shapes and the display locations of the photographing parameter list 349 and the photographing parameter list 359 are not limited herein.

In some embodiments, the first user interface of the terminal 100 may not display the photographing parameter list 359. This is not limited herein in this application.

The terminal 100 may control photographing performed by the terminal 102, and control a photographing effect of the terminal 102 to be different from that of the terminal 101, to meet a requirement of a user for a plurality of photographing effects.

For example, the terminal 100 controls the terminal 102 to perform photographing by using a window whose viewfinder frame aspect ratio is "1:1".

The terminal 102 identifies a photographing parameter (for example, the viewfinder frame aspect ratio is 1:1) in a "1:1" capture control instruction. The camera app of the terminal 102 adjusts a size of the viewfinder frame of the third user interface of the terminal 102 based on the photographing parameter (for example, the viewfinder frame aspect ratio is 1:1), where a processed size of the viewfinder frame meets a requirement of the user of the terminal 100 for a size of a captured image.

Figure 7E:
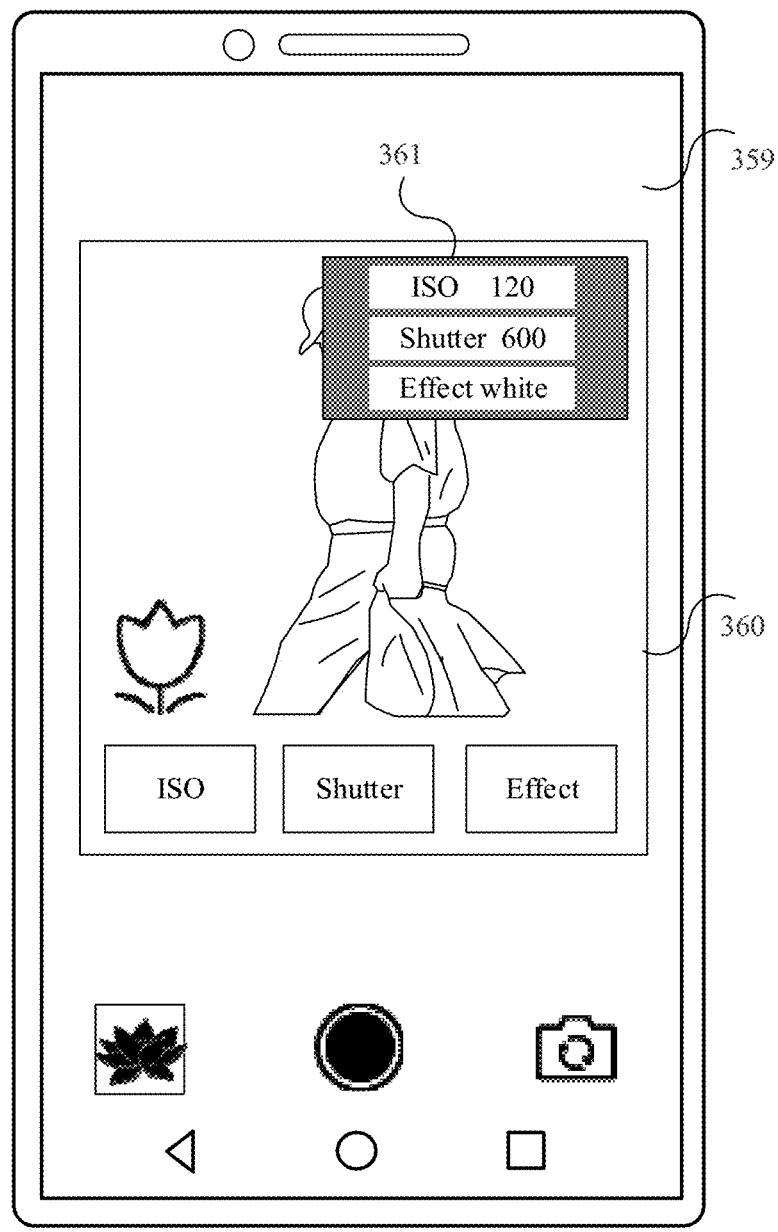

As shown in FIG. 7E, the viewfinder frame of the third user interface of the terminal 102 displays a viewfinder image obtained by the terminal 102 by adjusting the size of the viewfinder frame of the third user interface based on the photographing parameter (for example, the viewfinder frame aspect ratio is 1:1).

FIG. 7E includes a user interface 359, a photographing parameter list 361, and a viewfinder image in a viewfinder frame 360.

In response to the "1:1" capture control instruction triggered by the terminal 100, the terminal 102 adjusts a size of the viewfinder frame 360 to an aspect ratio of 1:1, and a size of the viewfinder image in the viewfinder frame 360 is adjusted along with the size of the viewfinder frame 360.

Figure 7F:
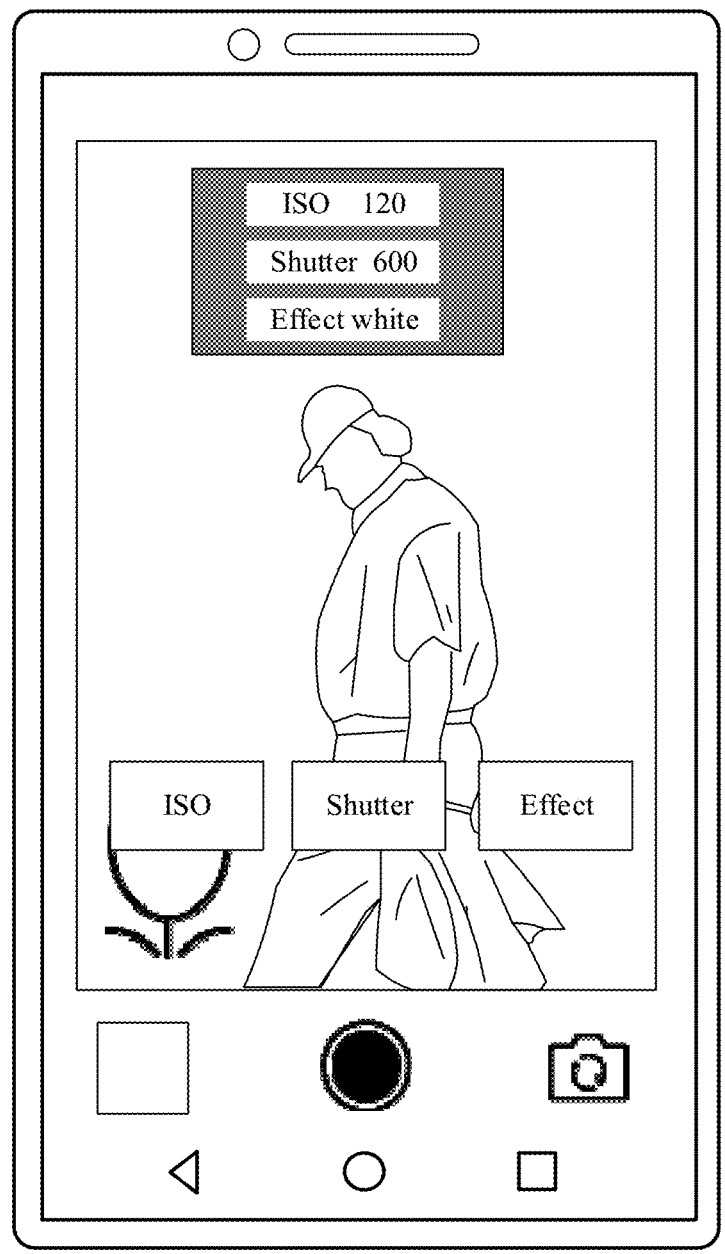
Figure 7G:
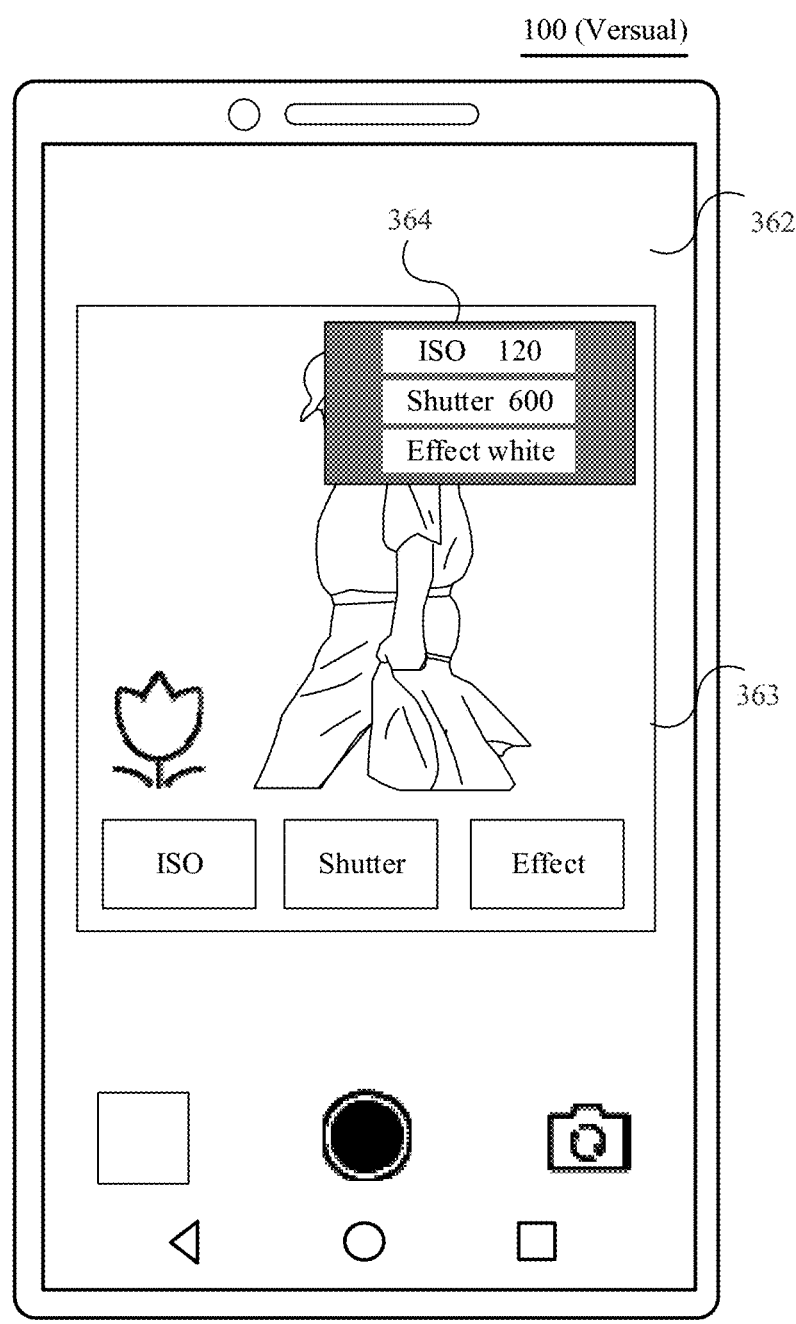
Figure 8B:
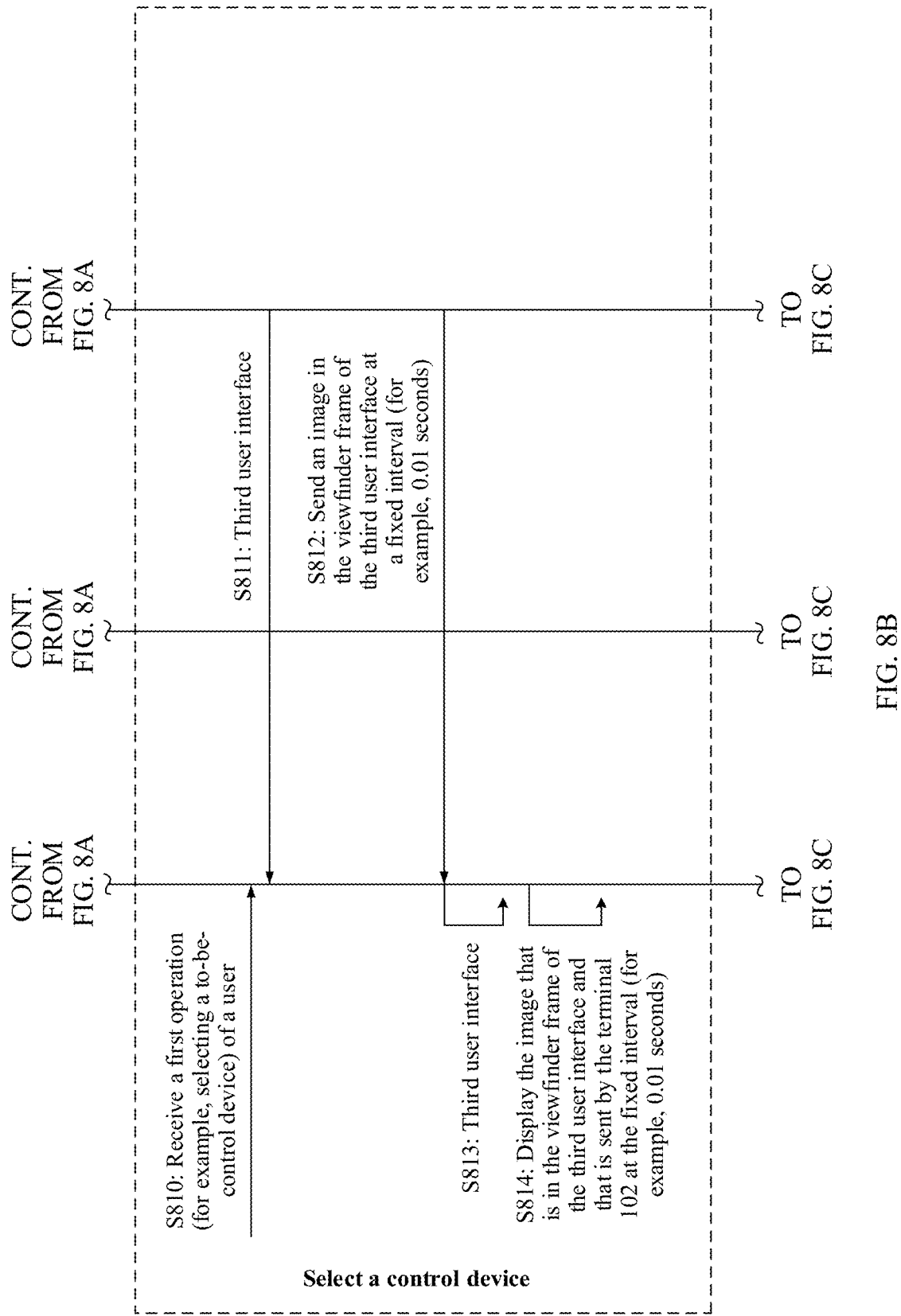

FIG. 7F and FIG. 7G are diagrams of UIs on which the camera app of the terminal 100 switches from displaying an image that is in the viewfinder frame of the third user interface and that is sent by the terminal 102 at a fixed interval (for example, 0.01 seconds) to displaying a viewfinder image that is obtained by adjusting the size of the viewfinder frame of the second third user interface and that is sent by the terminal 102 at a fixed interval (for example, 0.01 seconds).

FIG. 7F is a diagram of a UI on which the camera app of the terminal 100 displays the image that is in the viewfinder frame of the third user interface and that is sent by the terminal 102 at the fixed interval (for example, 0.01 seconds). For descriptions of the user interface, refer to the UI diagram FIG. 7D. Details are not described herein again.

FIG. 7G is a diagram of a UI on which the camera app of the terminal 100 displays the viewfinder image that is obtained by adjusting the size of the viewfinder frame of the third user interface and that is sent by the terminal 102 at the fixed interval (for example, 0.01 seconds). FIG. 7G includes a user interface 362, a photographing parameter list 364, and a viewfinder image (a viewfinder image obtained by adjusting the size of the viewfinder frame of the third user interface based on a photographing parameter (for example, the viewfinder frame aspect ratio is 1:1)) in a viewfinder frame 363.

The viewfinder image in the viewfinder frame 363 is the viewfinder image that is in the viewfinder frame 360 of the third user interface of the terminal 102 and that is sent by the terminal 102 to the terminal 100 at the fixed interval (for example, 0.01 seconds).

A photographing parameter in the photographing parameter list 364 is a photographing parameter that is in a photographing parameter list of the camera app of the terminal 102 and that is transmitted by the terminal 102 to the terminal 100. For details, refer to the descriptions of the photographing parameter list 349 of the camera app of the terminal 102 in the embodiment of the UI diagram FIG. 7A. Details are not described herein again.

The terminal 100 receives a third operation (for example, touching a capture control) of the user, and the terminal 100 generates a capture control instruction based on the third operation (for example, touching the capture control) of the user. The terminal 100 transmits the capture control instruction to the terminal 102. The terminal 102 receives and responds to the capture control instruction. The camera app of the terminal 102 displays a captured image in a third area, and stores the captured image to the album of the terminal 102 in a picture format, where the third area is used to display a thumbnail of the last image captured by the camera app of the terminal 102. The terminal 102 sends the captured image to the terminal 100. In addition, the terminal 100 displays the captured image in a second area, and stores the captured image to the album of the terminal 100 in a picture format, where the second area is used to display a thumbnail of the last image captured by the camera app of the terminal 100. Specific content is similar to that of the embodiments shown in FIG. 5A to FIG. 5D in Embodiment 1. Details are not described herein again.

A method for disconnecting the terminal 100 from the terminal 102 is similar to the method for disconnecting the terminal 100 from the terminal 101. Details are not described herein again in this application.

For conflict processing included in controlling the terminal 101 and the terminal 102 by the terminal 100, refer to the operation conflict processing method for the terminal 100 and the terminal 101 in the embodiment. Details are not described herein again in this application.

Based on the human-computer interaction in Embodiment 2, a method procedure in Embodiment 2 of this application is described.

FIG. 8A, FIG. 8B, FIG. 8C, and FIG. 8D are a flowchart of a data sharing and instruction operation control method provided in Embodiment 2. Devices included in the method flowchart include the terminal 100, the terminal 101, and the terminal 102.

As shown in FIG. 8A, FIG. 8B, FIG. 8C, and FIG. 8D, the method includes the following steps.

S801: The terminal 100 starts a first camera app, and displays a first user interface, where the first user interface is a user interface of the first camera app, the first camera app is installed on the terminal 100, and the first user interface includes a viewfinder frame, a plurality of photographing mode options, and a capture control.

The viewfinder frame of the first user interface displays a viewfinder image obtained by the first camera AP.

The plurality of photographing mode options of the first user interface include a flash control, an effect control, and a settings control.

S802: The terminal 101 starts a second camera app, and displays a second user interface, where the second user interface is a user interface of the second camera app, the second camera app is installed on the terminal 101, and the second user interface includes a viewfinder frame, a plurality of photographing mode options, and a capture control.

The viewfinder frame of the second user interface displays a viewfinder image obtained by the second camera app.

The plurality of photographing mode options of the second user interface include an ISO control 325, a shutter control 326, and an effect control 327.

S803: The terminal 102 starts a third camera app, and displays a third user interface, where the third user interface is a user interface of the third camera app, the third camera app is installed on the terminal 101, and the third user interface includes a viewfinder frame, a plurality of photographing mode options, and a capture control.

The viewfinder frame of the third user interface displays a viewfinder image obtained by the third camera app.

The plurality of photographing mode options of the third user interface include an ISO control 350, a shutter control 351, and an effect control 352.

S804: The terminal 100 establishes a connection to the terminal 101.

S805: The terminal 100 establishes a connection to the terminal 102.

Specifically, for a method and steps for establishing a connection by the terminal 100 to the terminal 101, and a method and steps for establishing a connection by the terminal 100 to the terminal 102, refer to the embodiments shown in FIG. 3B to FIG. 3I in Embodiment 1. Details are not described herein again.

S806: The terminal 101 sends the second user interface to the terminal 100.

In some embodiments, the terminal 100 first establishes a connection to the terminal 101. In this case, the terminal 100 establishes a data transmission channel to the terminal 101, and the terminal 101 transmits the second user interface to the terminal 100.

S807: The terminal 101 sends an image in the viewfinder frame of the second user interface to the terminal 100 at a fixed interval (for example, 0.01 seconds).

S808: The terminal 100 responds to the second user interface sent by the terminal 101, and the terminal 100 displays the second user interface.

S809: The terminal 100 responds to the image that is in the viewfinder frame of the second user interface and that is sent by the terminal 101 at the fixed interval (for example, seconds), and the terminal 100 displays the image that is in the viewfinder frame of the second user interface and that is sent by the terminal 101 at the fixed interval (for example, seconds).

For descriptions of S806, S807, S808, and S809 in the method procedure in Embodiment 2, refer to S604, S605, S606, and S607 in the method procedure in Embodiment 1. Details are not described herein again in this application.

S810: The terminal 100 receives a first operation (for example, selecting a to-be-controlled device) of a user.

The terminal 100 responds to the first operation (for example, selecting a to-be-controlled device) of the user, and the first user interface of the camera app of the terminal 100 displays the selection prompt box 356 shown in FIG. 7B. The prompt box 356 includes prompt information: "Select a device that you want to control." The prompt box 356 further includes device name controls "HUAWEI P30 Pro" and "Danneil" of devices that have established connections to the terminal 100. The device name control "HUAWEI P30 Pro" or the device name control "Danneil" may receive a user operation (for example, tapping), to establish a data transmission channel to a device corresponding to a device name in the prompt box 356.

For example, the device control name "Danneil" receives a user operation (for example, tapping), and in response to the operation, the terminal 100 (device name: "Versual") establishes a data transmission channel to the terminal 102 (device name: "Danneil").

S811: The terminal 102 sends the third user interface to the terminal 100.

In some embodiments, the terminal 102 needs to perform the operation of transmitting the third user interface to the terminal 100 only once.

In some embodiments, the second user interface of the terminal 102 further includes the photographing parameter list 349 of the camera app of the terminal 102. The photographing parameter list 349 includes: a photographing parameter ISO, where an ISO value is 120; a photographing parameter shutter, where a shutter value is 600; and a photographing parameter effect, where the effect is whitening (White). The terminal 102 sends a photographing parameter and a photographing parameter value in the photographing parameter list 349 to the terminal 100.

S812: The terminal 102 sends an image in the viewfinder frame of the third user interface of the terminal 102 to the terminal 100 at a fixed interval (for example, 0.01 seconds).

The third camera app of the terminal 102 obtains a viewfinder image in the viewfinder frame of the third user interface at a fixed interval (for example, 0.01 seconds), and displays the viewfinder image in the viewfinder frame of the third user interface.

S813: The terminal 100 responds to the third user interface sent by the terminal 102, and the terminal 100 displays the third user interface.

The terminal 100 receives and displays the third user interface. To be specific, the first camera app of the terminal 100 displays the third user interface.

In some embodiments, a display of the terminal 100 and a display of the terminal 102 have different sizes. Therefore, after the terminal 102 sends the second user interface of the terminal 102 to the terminal 100, the third user interface of the terminal 102 that is displayed in the first camera app of the terminal 100 is zoomed in or zoomed out in proportion. This is not limited herein in this application.

In some embodiments, the terminal 100 receives and displays the photographing parameter and the photographing parameter value that are in the photographing parameter list 49 and that are sent by the terminal 102. This is not limited herein in this application.

S814: The terminal 100 responds to the image that is in the viewfinder frame of the third user interface and that is sent by the terminal 102 at the fixed interval (for example, 0.01 seconds), and the terminal 100 displays the image that is in the viewfinder frame of the third user interface and that is sent by the terminal 102 at the fixed interval (for example, 0.01 seconds).

The terminal 100 receives the image that is in the viewfinder frame of the third user interface and that is sent by the terminal 102 at the fixed interval (for example, 0.01 seconds), and displays the image in the viewfinder frame of the third user interface of the terminal 100.

S815: The terminal 100 receives a second operation (for example, choosing to use a window whose viewfinder frame aspect ratio is 1:1 for photographing) of the user.

S816: The terminal 100 generates a "1:1" capture control instruction based on the second operation (for example, choosing to use a window whose viewfinder frame aspect ratio is 1:1 for photographing) of the user.

S817: The terminal 100 sends the "1:1" capture control instruction to the terminal 102.

S818: The terminal 102 identifies a photographing parameter in the "1:1" capture control instruction (for example, the viewfinder frame aspect ratio is 1:1).

S819: The terminal 102 adjusts a size of the viewfinder frame of the third user interface based on the photographing parameter, where an adjusted size of the viewfinder frame meets a requirement of the user of the terminal 100 for a size of a captured image.

S820: The terminal 102 sends an image (including a viewfinder image obtained by adjusting the size of the viewfinder frame of the third user interface based on the photographing parameter) in the viewfinder frame of the third user interface to the terminal 100 at a fixed interval (for example, 0.01 seconds).

S821: The terminal 100 displays the image (including the viewfinder image obtained by adjusting the size of the viewfinder frame of the third user interface based on the photographing parameter) that is in the viewfinder frame of the third user interface and that is sent at the fixed interval (for example, 0.01 seconds).

For detailed descriptions of S815, S816, S817, S818, S819, S820, and S821 in the method procedure in Embodiment 2, refer to the embodiments of the UI diagrams FIG. 7E to FIG. 7G. Details are not described herein again.

S822: The terminal 100 receives a third operation (for example, capture) of the user.

S823: The terminal 100 generates a "capture" control instruction based on the third operation (for example, "capture") of the user.

S824: The terminal 100 sends the "capture" control instruction to the terminal 102.

S825: The terminal 102 displays a captured image in a third area, and stores the captured image to an album in a picture format, where the third area is used to display a thumbnail of the last image captured by the third camera app.

S826: The terminal 102 sends the image captured by the second camera app to the terminal 100.

S827: The terminal 100 displays the captured image in a second area, and stores the captured image to an album, where the second area is used to display a thumbnail of the last image captured by the first camera app.

S828: The terminal 102 obtains and displays an image in the viewfinder frame of the third user interface.

S829: The terminal 102 sends an image in the viewfinder frame of the third user interface to the terminal 100 at a fixed interval (for example, 0.01 seconds).

S830: The terminal 100 displays the image that is in the viewfinder frame of the third user interface and that is sent by the terminal 102 at the fixed interval (for example, 0.01 seconds).

S831: The terminal 100 is disconnected from the terminal 102.

After the terminal 100 is disconnected from the terminal 102, the terminal 100 displays the first user interface, where the first user interface is a user interface of the first camera app, and the viewfinder frame of the first user interface of the terminal 100 displays a viewfinder image of the terminal 100.

The terminal 102 displays the third user interface, where the third user interface is a user interface of the third camera app, and the viewfinder frame of the third user interface of the terminal 102 displays a viewfinder image of the terminal 102.

S832: The terminal 100 is disconnected from the terminal 101.

After the terminal 100 is disconnected from the terminal 101, the terminal 100 displays the first user interface, where the first user interface is a user interface of the first camera app, and the viewfinder frame of the first user interface of the terminal 100 displays a viewfinder image of the terminal 100.

The terminal 101 displays the second user interface, where the second user interface is a user interface of the second camera app, and the viewfinder frame of the second user interface of the terminal 101 displays a viewfinder image of the terminal 101.

For descriptions of S822, S823, S824, S825, S826, S827, S828, S829, S830, S831, and S832 in the method procedure in Embodiment 2, refer to S615, S616, S617, S618, S619, S620, S621, S622, S623, and S624 in the method procedure in Embodiment 1. Details are not described herein again in this application.

According to this embodiment of this application, the terminal 100 may search for and discover nearby devices (for example, the terminal 101 and the terminal 102), the terminal 100 may establish connections to the terminal 101 and the terminal 102, the terminal 100 may view a viewfinder image of the terminal 101 or the terminal 102, and the terminal 100 may control, through switching, the terminal 101 or the terminal 102 to perform photographing, to meet a requirement of a user for a plurality of photographing effects.

Based on a cross-process capability of a system native mechanism, this application provides a method for quickly establishing a connection at a short distance and performing capability sharing and instruction operation control between devices.

In a photographing application scenario, after a connection is established between two devices (for example, the terminal 100 and the terminal 101) that are both equipped with camera apparatuses and that have a short distance (for example, within 15 meters), the terminal 100 and the terminal 101 may perform capability sharing and operation control, to implement short-range cross-device communication.

The camera app of the terminal 100 may display a viewfinder image of the camera app of the terminal 101, and the camera app of the terminal 100 may also control the camera app of the terminal 101 to perform photographing (for example, perform operations such as view finding, zooming, capturing, and using an effect). The terminal 100 sends a control instruction to the terminal 101. The terminal 101 receives and responds to the control instruction. The terminal 100 sends, to the terminal 100, a viewfinder image obtained through controlling in response to the control instruction. The terminal 100 receives and displays the viewfinder image that is obtained through controlling by the control instruction and that is sent by the terminal 101.

That the terminal 100 and the terminal 101 can perform data sharing and operation control depends on a near-field cross-device communication technology.

The following describes an architecture of short-range cross-device communication in this application.

Figure 9A:
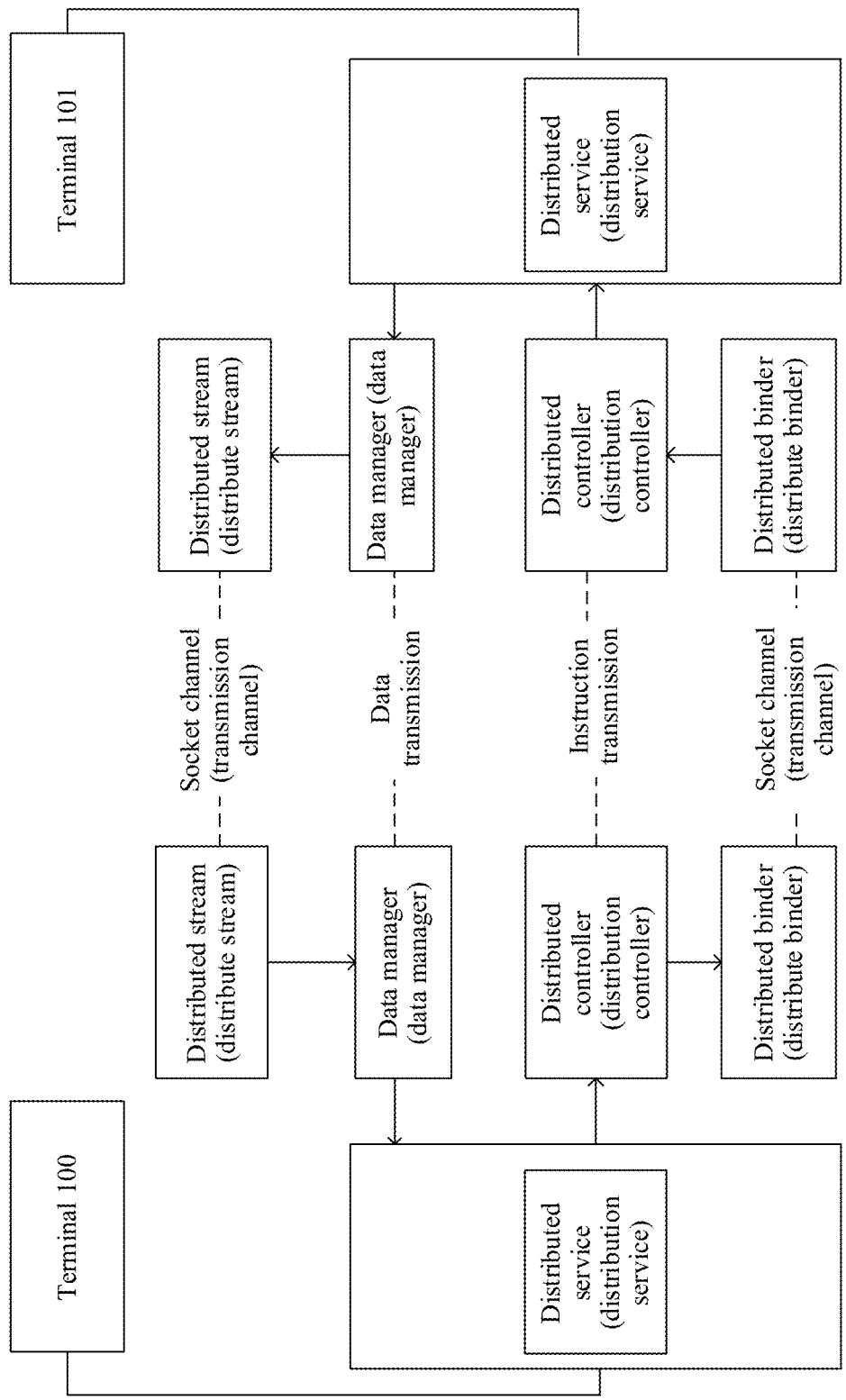
FIG. 9A is a schematic diagram of short-range cross-device communication according to an embodiment of this application.

FIG. 9A is a diagram of an architecture of short-range cross-device communication provided in this application. The architecture includes a distributed service, a data manager, a distributed controller, a distributed binder, and a distributed stream.

The distributed service is configured to parse a capability of application behavior. When a terminal device (for example, the terminal 100) needs to initiate near-field device communication (for example, data transmission and instruction control), the distributed service takes over current service processing.

The data manager and the distributed controller are two components of the distributed service.

The data manager is configured to manage data transmission. A cross-process data transmission channel is not modified in this application. Instead, a proxy, scheduling, caching, and distribution are performed on this basis. Finally, the data manager encapsulates interprocess communication data on the terminal 100 into a distributed stream, and transmits the distributed stream to another terminal device (for example, the terminal 101) through a socket channel (a transmission channel).

The distributed controller is a near-field distributed scheduling instruction control center. When a terminal device (for example, the terminal 100) initiates cross-device instruction control, the distributed service transmits a related request to the distributed controller, and the distributed controller takes over a current capability, and packages an instruction into a distributed binder. The distributed binder is transmitted to a peer device (for example, the terminal 101) through a socket channel.

The distributed binder is a layer of encapsulation of a native binder, to be specific, a binder processing method generated based on a native binder mechanism of a system. An original cross-process binder may be converted into a cross-device binder, and the cross-device binder is successfully parsed into a local binder on a peer device. The local binder is responsible for carrying local binder information, for example, a service ID and authorization information, in a data stream structure of socket communication. The distributed binder is described in detail in FIG. 10.

The distributed stream is a layer of encapsulation of interprocess communication data. The distributed stream is described in detail in FIG. 10.

Figure 9B:
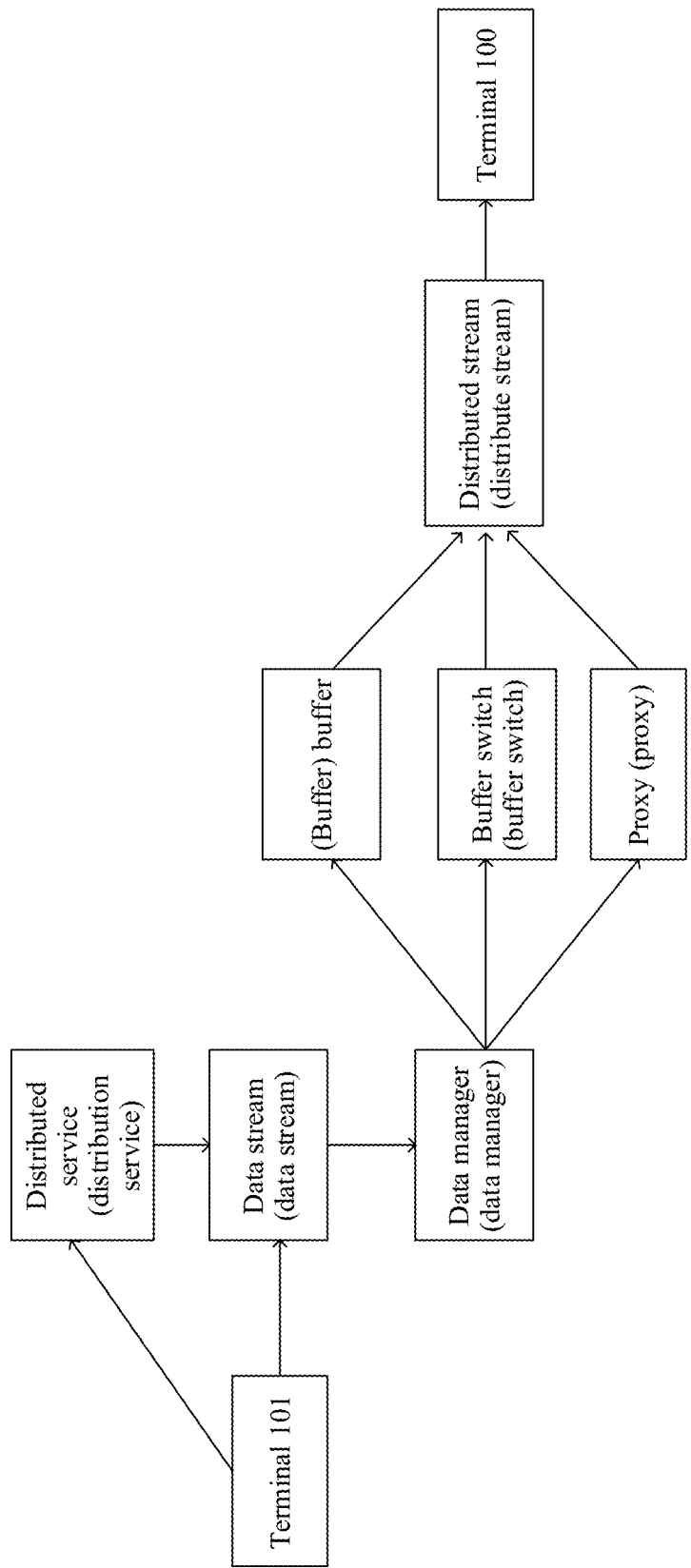
FIG. 9B is a schematic diagram of cross-device transmission of control data according to an embodiment of this application.

FIG. 9B is a schematic diagram of controlling cross-device data transmission by the data manager.

The data manager includes three important modules: a buffer, a buffer switch, and a proxy.

Buffer: A rate of network transmission is usually unstable, and the rate has a bottleneck depending on different specific physical links. As a result, transmission of stream data cannot meet a local cross-process performance indicator. Therefore, the buffer is added to the data manager in the present invention. For example, a size of the buffer may be limited to N×1024×1024×16 (N is a quantity of queues).

Buffer switch: When there are many buffers, data may need to be scheduled. Therefore, the buffer switch is added to the data manager in the present invention. A function of the buffer switch is to perform scheduling based on priorities of data streams of different services. The priorities come from priorities assigned by a camera app when the camera app transmits data. If the camera app sets no priorities, an automatic sorting method is used (for example, a priority of a queue that is being transmitted>a priority of a queue that is interrupted unexpectedly>a priority of a queue that is waiting).

The proxy is a proxy for connecting a camera app to a socket of a transmission channel. Because the camera app does not need to directly operate a socket object, the proxy performs this action in place of the application in the present invention.

When the camera app of the terminal 101 performs a view finding operation, the terminal 101 converts a viewfinder image of the camera app of the terminal 101 into a data stream, and a distributed service of the terminal 101 forwards the data stream to a data manager for processing.

The data manager sends the data stream to a buffer queue for queuing. In addition, the data manager is split into several subunits, where each subunit includes a flag bit. In this case, a buffer switch determines whether byte array data that is currently split into several subunits can be invoked. If the byte array data can be invoked, the data manager sends the byte array data that is split into the several subunits to a proxy. If the byte array data cannot be invoked, the byte array data continues to wait for scheduling by a switch. After receiving the data, the proxy performs, on the data, basic data encapsulation for a socket, and the data manager encapsulates the data into a distributed stream, and transmits the distributed stream to the terminal 100 through a socket channel.

A capability is a basic service of a camera app. For example, focus zooming, capturing, effects, preview, and zooming of a camera are a series of basic capabilities.

Figure 9C:
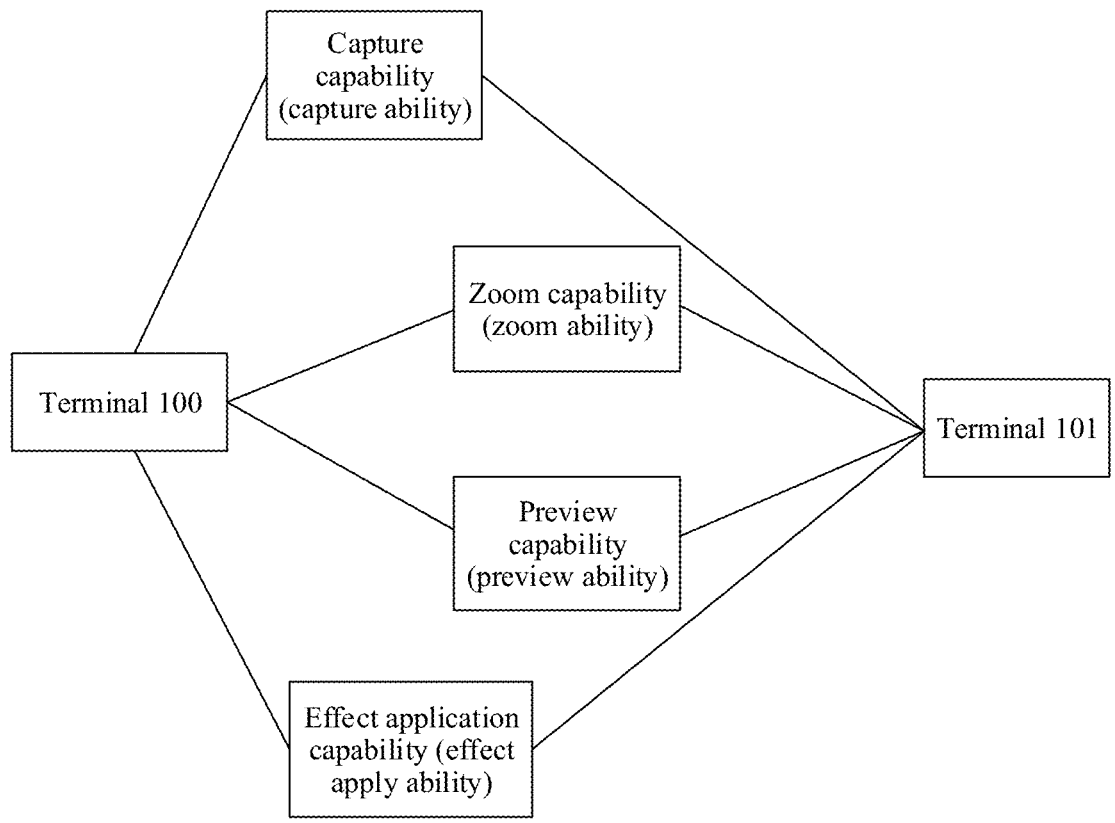
FIG. 9C is a schematic diagram of capabilities of a camera app according to an embodiment of this application.

As shown in FIG. 9C, capabilities of the camera app include a capture capability (Capture ability), a zoom capability (Zoom ability), a preview capability (Preview exchange), an effect application capability (Effect apply ability), and the like. The camera app can respond to the capabilities.

The following describes how the terminal 101 sends a camera user interface of the camera app of the terminal 101 and a viewfinder image of the camera app of the terminal 101 to the terminal 100 in this embodiment of this application.

Figure 10:
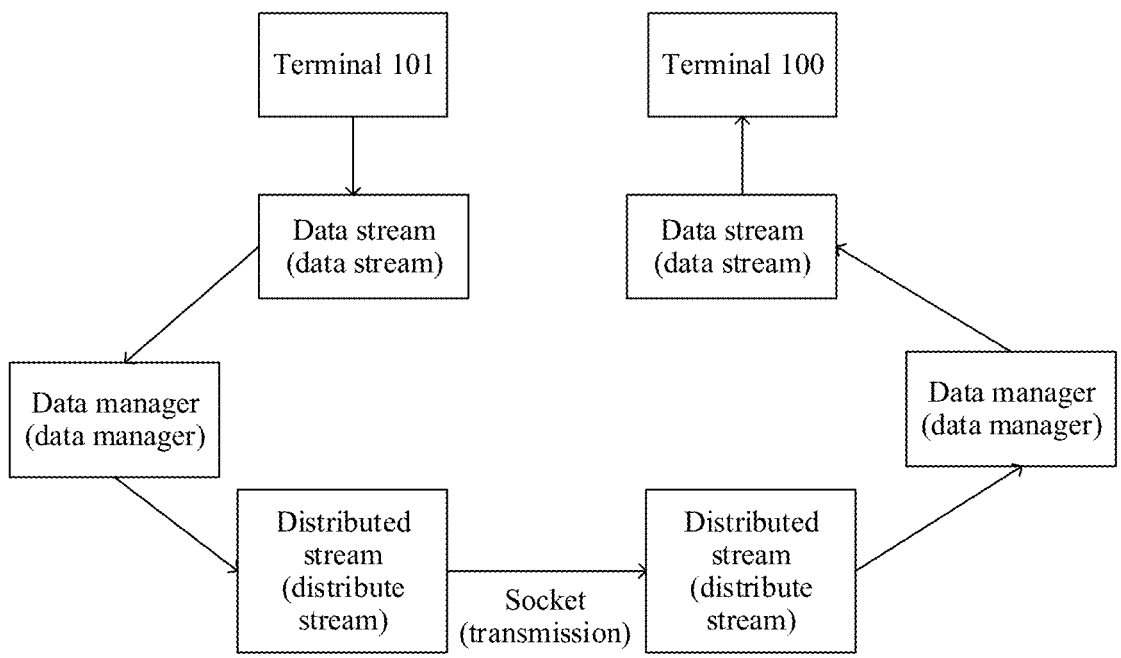
FIG. 10 is a schematic diagram of inter-device remote data transmission according to an embodiment of this application.

FIG. 10 is a schematic diagram of inter-device remote data transmission provided in this application.

A module included in FIG. 10 is a component of a distributed service: a data manager. First, the camera app of the terminal 101 receives a data transmission request, converts data into a data stream, encapsulates the data stream into a distributed stream by using a data manager, and sends the distributed stream to the terminal 100.

In addition, after the terminal 100 receives the distributed stream sent by the terminal 101, the terminal 100 restores the distributed stream to the original data by using a data manager of the terminal 100, to achieve an objective of communication between the two terminal devices.

For details, refer to the following steps.

Step 1: The terminal 101 starts a camera app, and a user interface of the camera app of the terminal 101 displays a viewfinder image of a camera. The terminal 100 also needs to start a same camera app. To establish a connection between the two devices, the terminal 100 initiates a connection establishment request to the terminal 101. The terminal 101 may choose to agree or disagree. If the terminal 101 agrees, a connection is established; otherwise, no connection is established.

Step 2: The terminal 101 starts to perform view finding by using the camera, obtains each frame of preview image from preview data as a frame of real-time data, and converts the frame of real-time data into byte array data.

Step 3: The terminal 101 transmits the byte array data to an internal distributed service (Distribution service) of the terminal 101, and the distributed service (Distribution service) forwards the data to an internal data manager for processing. Then the data enters a buffer queue for queuing. In addition, the byte array data is split into several subunits, where each subunit includes a flag bit. In this case, a buffer switch determines whether the byte array data that is currently split into the several subunits can be invoked. If the byte array data can be invoked, the byte array data that is split into the several subunits enters a proxy. If the byte array data cannot be invoked, the byte array data continues to wait for scheduling by the buffer switch. After receiving the data, the proxy performs, on the data, basic data encapsulation for a socket, to encapsulate the data into a distributed stream (Distribute stream).

Step 4: The data manager directly sends the distributed stream (Distribute stream) to the terminal 100 through a socket channel between the two devices.

Step 5: A distributed service (Distribution service) of the terminal 100 listens to a socket port, and finds that data is input. In this case, the distributed service reads the data, and forwards the data to a data manager for processing.

Step 6: The data manager of the terminal 100 parses the data, and the data manager restores the data to the original byte array data based on the byte array data that is split into the several subunits and the flag bit of each subunit, and determines, based on a flag bit, whether restoration of a current frame of data is completed. If the restoration is not completed, the data manager continues to wait. If the restoration is completed, the procedure continues.

Step 7: A frame of restored data may be sent to the camera app of the terminal 100 for the camera app to use. In this case, the camera app of the terminal 100 may display the viewfinder image of the terminal 101.

The following describes how the camera app of the terminal 100 controls the camera app of the terminal 101 to perform operations such as view finding, zooming, using an effect, and capturing in this embodiment of this application.

Figure 11:
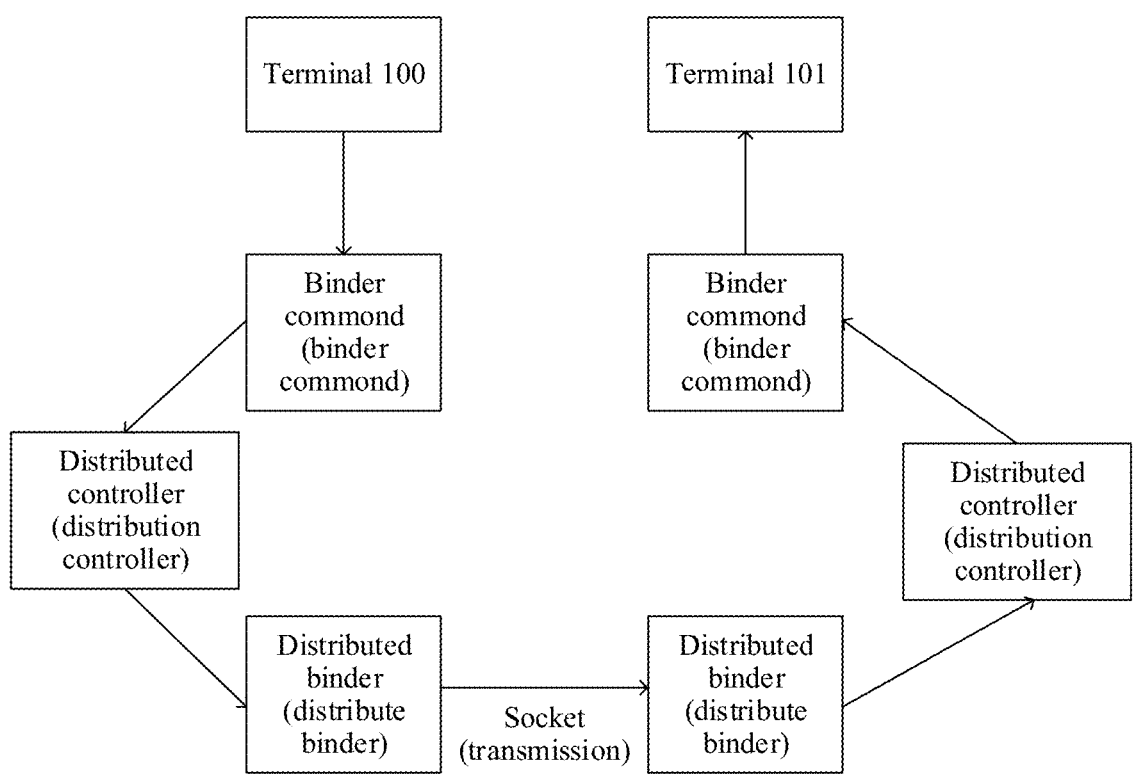
FIG. 11 shows an inter-device remote control method according to an embodiment of this application.

FIG. 11 shows an inter-device remote control method provided in this application. Inter-device remote control is essentially a process of a remote binder invoking between two devices.

FIG. 11 mainly depicts a process of a remote binder invoking between two devices. Included modules are a distributed controller (Distribution controller) and a distributed binder (Distribute binder). First, a camera app of a terminal device converts a cross-device invoking request into a binder command, and encapsulates the binder command into a distributed binder (Distribute binder) by using a distributed controller (Distribution Controller) process in the present invention, and sends the distributed binder (Distribute binder) to a peer terminal device. After the peer terminal device receives the distributed binder (Distribute binder), a controller of the peer terminal device restores the distributed binder to the original binder command, thereby implementing remote control between the devices.

For details, refer to the following steps.

Step 1: The terminal 101 starts a camera app, and a user interface of the camera app of the terminal 101 displays a viewfinder image of a camera. The terminal 100 also needs to start a same camera app. To establish a connection between the two devices, the terminal 100 initiates a connection establishment request to the terminal 101. The terminal 101 may choose to agree or disagree. If the terminal 101 agrees, a connection is established; otherwise, no connection is established.

Step 2: The camera app of the terminal 100 displays the viewfinder image of the camera app of the terminal 101.

Step 3: The camera app of the terminal 100 initiates a control operation (for example, selecting a "thinning" effect), and the terminal 100 encapsulates the effect instruction operation into AIDL interface data.

Step 4: A component of a distributed service (Distribution service) of the terminal 100, namely, a distributed controller (Distribution controller), takes over an instruction invoking process. In a native binder invoking process, the distributed controller (Distribution controller) takes actual operation rights from a native procedure based on a user request and a flag bit.

Step 5: The distributed controller (Distribution controller) of the terminal 100 performs secondary encapsulation on the effect operation instruction, to encapsulate the effect operation instruction into a distributed binder (Distribute binder) object; and sends the encapsulated distributed binder (Distribute binder) object to the terminal 101 through a socket channel.

Step 6: A distributed service (Distribution service) of the terminal 101 listens to a socket port, and finds that data is input. In this case, the distributed service reads the data, and forwards, based on a type, the data to a distributed controller (Distribution controller) for processing. The distributed controller (Distribution controller) of the terminal 101 restores, based on a distributed binder (Distribute binder) data structure, the data to an original binder data structure, namely, the effect operation instruction.

Step 7: The distributed service (Distribution service) of the terminal 101 actively initiates binder invoking once, and instructs a capability of the camera app of the terminal 101 to respond. After receiving an invoking instruction, the capability of the camera app of the terminal 101 immediately performs an effect (for example, thinning) instruction operation.

Step 8: After completing this action, the capability (for example, thinning) of the camera app also performs steps 3 to 6 to send a returned result of this operation to the terminal 100.

Step 9: The terminal 100 may confirm the result. In addition, the camera app of the terminal 101 obtains a viewfinder image of the camera app of the terminal 101 at a fixed interval (for example, 0.01 seconds), and the terminal 101 further needs to send, to the terminal 100, the viewfinder image that is of the camera app of the terminal 101 and that is obtained by the camera app of the terminal 101 at the fixed interval (for example, 0.01 seconds).

This application provides a data sharing and instruction operation control method and a system. Based on a cross-process capability of a system native mechanism, this application provides a method for quickly establishing a connection between devices at a short distance and performing data sharing and instruction operation control without using any account or the Internet. The method improves security and real-time performance of data transmission, and facilitates interaction between people.

In conclusion, the foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. A data sharing and instruction operation control method applied to a system comprising a first terminal and a second terminal, the method comprising:
    displaying, by the first terminal, a first user interface of a first application, wherein the first user interface comprises a first operation option;
    sending, by the first terminal, a connection request to the second terminal in response to tapping on the first operation option;
    starting, by the second terminal, an instance of a second application, wherein the first and second applications are the same or different applications;
    receiving, by the second terminal, the connection request, and establishing, by the second terminal, a communication connection to the first terminal;
    displaying, by the second terminal, a second user interface of the instance of the second application, wherein the second user interface comprises a second operation option;
    sending, by the second terminal, the second user interface to the first terminal;
    displaying, by the first terminal, the second user interface;
    sending, by the first terminal, a control instruction to the second terminal in response to tapping on the second operation option on the second user interface displayed on the first terminal; and
    receiving, by the second terminal, the control instruction sent by the first terminal, and displaying, by the second terminal, a third user interface of the instance of the second application.

2. The method according to claim 1, further comprises:
    sending, by the second terminal, the third user interface to the first terminal, and displaying, by the first terminal, the third user interface.

3. The method according to claim 1, wherein receiving, by the second terminal, the connection request, and establishing, by the second terminal, the communication connection to the first terminal comprises:
    receiving, by the second terminal, the connection request;
    displaying, by the second terminal, a verification code input box in response to the received connection request; and
    establishing, by the second terminal, the communication connection to the first terminal in response to a verification code entered in the verification code input box being the same as a verification code preset on the first terminal.

4. The method according to claim 1 further comprising:
    displaying, by the second terminal, first prompt information in response to tapping on the second operation option on the second user interface displayed on the first terminal.

5. The method according to claim 1, wherein each of the first and second applications is a camera application; and
    the second operation option comprises a photographing parameter adjustment option and a capture option.

6. The method according to claim 5, wherein the photographing parameter adjustment option comprises a flash adjustment option, a focal length adjustment option, or a shutter speed adjustment option.

7. The method according to claim 5, wherein sending, by the first terminal, the control instruction to the second terminal in response to tapping on the second operation option on the second user interface displayed on the first terminal comprises:
    sending, by the first terminal, a capture instruction to the second terminal in response to tapping on the capture option, wherein the capture instruction carries first time information;
    receiving, by the second terminal, the capture instruction; and
    performing, by the second terminal, a capture operation at a predetermined moment based on the first time information, to obtain a first photo.

8. The method according to claim 7, further comprising:
sending, by the second terminal, the first photo to the first terminal; and
receiving, by the first terminal, the first photo, and storing the first photo to a first folder, wherein a name of the first folder comprises an identifier of the second terminal.

9. The method according to claim 1, further comprising:
within a preset time, receiving, by the first terminal, a first operation of a user;
receiving, by the second terminal, a second operation of a user; and
responding, by the first terminal, to the first operation.

10. The method according to claim 1, wherein sending, by the second terminal, the second user interface to the first terminal, and displaying, by the first terminal, the second user interface further comprises:
converting, by the second terminal, the second user interface into a data stream;
encapsulating, by the second terminal, the data stream into a distributed stream;
sending, by the second terminal, the distributed stream to the first terminal through a socket channel;
restoring, by the first terminal, the distributed stream to the data stream;
converting, by the first terminal, the data stream into the second user interface; and
displaying, by the first terminal, the second user interface.

11. The method according to claim 1, wherein sending, by the first terminal, the control instruction to the second terminal, and receiving, by the second terminal, the control instruction sent by the first terminal further comprises:
converting, by the first terminal, the control instruction into a binder command;
encapsulating, by the first terminal, the binder command into a distributed binder;
sending, by the first terminal, the distributed binder to the second terminal through a socket channel;
restoring, by the second terminal, the distributed binder to the binder command;
converting, by the second terminal, the binder command into the control instruction; and
receiving, by the second terminal, the control instruction sent by the first terminal.

12. The method according to claim 1, further comprising: disconnecting, by the first terminal, from the second terminal in response to the first terminal closing the instance of the first application.

13. A system comprising a first terminal and a second terminal, wherein the first terminal is configured to:
display, at the first terminal, a first user interface of an instance of a first application, wherein the first user interface comprises a first operation option; and
send a connection request to a second terminal in response to tapping on the first operation option;
wherein the second terminal is configured to:
start an instance of a second application, wherein the first and second applications are the same or different applications;
receive the connection request, and establish a communication connection to the first terminal;
display a second user interface of the instance of the second application, wherein the second user interface comprises a second operation option; and
send the second user interface to the first terminal;
wherein the first terminal is further configured to:
display the second user interface; and
send a control instruction to the second terminal in response to tapping on the second operation option on the second user interface displayed on the first terminal; and
wherein the second terminal is further configured to:
receive the control instruction sent by the first terminal, and display a third user interface of the instance of the second application.

14. The system according to claim 13, wherein the second terminal is further configured to send the third user interface to the first terminal, and the first terminal is further configured to display the third user interface.

15. The system according to claim 13, wherein the second terminal is further configured to receive the connection request;
the second terminal is further configured to display a verification code input box in response to the received connection request; and
the second terminal is further configured to establish a communication connection to the first terminal in response to a verification code entered in the verification code input box being the same as a verification code preset on the first terminal.

16. The system according to claim 13, wherein the second terminal is further configured to display first prompt information in response to tapping on the second operation option on the second user interface displayed on the first terminal.

17. The system according to claim 13, wherein each of the first and second applications is a camera application, and the second operation option comprises a photographing parameter adjustment option and a capture option.

18. The system according to claim 17, wherein the photographing parameter adjustment option comprises a flash adjustment option, a focal length adjustment option, or a shutter speed adjustment option.

19. The system according to claim 17, wherein
the first terminal is further configured to send a capture instruction to the second terminal in response to tapping on the capture option, wherein the capture instruction carries first time information; and
the second terminal is further configured to receive the capture instruction, and perform a capture operation at a predetermined moment based on the first time information to obtain a first photo.

20. A first terminal comprising:
a processor; and
a non-transitory computer readable medium which contains computer-executable instructions;
the processor is configured to execute the computer-executable instructions to enable the terminal to perform operations comprising:
displaying a first user interface of a first application, wherein the first user interface comprises a first operation option;
sending a connection request to a second terminal in response to tapping on the first operation option to establish a communication connection with the second terminal;
receiving a second user interface from the second terminal, wherein the second user interface is a user interface of a second application started by the second terminal, wherein the first and second applications are the same or different applications, and the second user interface comprises a second operation option;

displaying the second user interface; and sending a control instruction to the second terminal in response to tapping on the second operation option on the second user interface displayed on the first terminal, wherein the control instruction instructs the second terminal to display a third user interface of the second application.

\* \* \* \* \*